Sept. 28, 1954

A. E. JOEL, JR

AUTOMATIC SWITCHING SYSTEM FOR RADIO BROADCASTING NETWORKS 2,690,548

Filed Dec. 7, 1949

15 Sheets-Sheet 1

INVENTOR
A. E. JOEL, JR.
BY
R. C. Perry
ATTORNEY

Sept. 28, 1954

A. E. JOEL, JR
AUTOMATIC SWITCHING SYSTEM FOR
RADIO BROADCASTING NETWORKS 2,690,548

Filed Dec. 7, 1949

15 Sheets-Sheet 2

INVENTOR
A.E. JOEL, JR.
BY
R. C. Terry
ATTORNEY

SWITCHING CENTER CONTROL CCT.
SWITCHING CENTER C

INVENTOR
A. E. JOEL, JR.
BY R.C. Terry
ATTORNEY

Sept. 28, 1954 A. E. JOEL, JR 2,690,548

AUTOMATIC SWITCHING SYSTEM FOR RADIO BROADCASTING NETWORKS

Filed Dec. 7, 1949 15 Sheets-Sheet 4

INVENTOR
A.E. JOEL, JR.
BY R. C. Terry
ATTORNEY

Sept. 28, 1954 A. E. JOEL, JR 2,690,548

AUTOMATIC SWITCHING SYSTEM FOR RADIO BROADCASTING NETWORKS

Filed Dec. 7, 1949 15 Sheets-Sheet 5

INVENTOR
A. E. JOEL, JR.
BY R. C. Terry
ATTORNEY

Sept. 28, 1954 A. E. JOEL, JR 2,690,548

AUTOMATIC SWITCHING SYSTEM FOR RADIO BROADCASTING NETWORKS

Filed Dec. 7, 1949 15 Sheets-Sheet 6

INVENTOR
A.E. JOEL, JR.
BY R. C. Perry.
ATTORNEY

Sept. 28, 1954 A. E. JOEL, JR 2,690,548

AUTOMATIC SWITCHING SYSTEM FOR RADIO BROADCASTING NETWORKS

Filed Dec. 7, 1949 15 Sheets-Sheet 7

NO. 1 PERMUTATION LINK SWITCHING CENTER C

INVENTOR
A.E. JOEL, JR.
BY R C Terry
ATTORNEY

INVENTOR
A.E. JOEL, JR.
BY R.C. Terry
ATTORNEY

NO. 2 PERMUTATION LINK SWITCHING CENTER C

INVENTOR
A.E. JOEL, JR.
BY R.C. Perry
ATTORNEY

INVENTOR
A.E. JOEL, JR.
BY R.C. Terry
ATTORNEY

Sept. 28, 1954 A. E. JOEL, JR 2,690,548

AUTOMATIC SWITCHING SYSTEM FOR RADIO BROADCASTING NETWORKS

Filed Dec. 7, 1949 15 Sheets-Sheet 11

INVENTOR
A. E. JOEL, JR.
BY R. C. Terry
ATTORNEY

SWITCHING CENTER C
NETWORK DIRECTION CONTROL RELAY CCT.

INVENTOR
A.E. JOEL, JR.
BY R.C. Perry
ATTORNEY

INVENTOR
A.E. JOEL, JR.
BY
R.C. Terry
ATTORNEY

Sept. 28, 1954

A. E. JOEL, JR

AUTOMATIC SWITCHING SYSTEM FOR RADIO BROADCASTING NETWORKS 2,690,548

Filed Dec. 7, 1949

15 Sheets-Sheet 14

INVENTOR
A.E. JOEL, JR.
BY R.C. Terry
ATTORNEY

INVENTOR
A.E. JOEL, JR.
BY R.C. Terry
ATTORNEY

Patented Sept. 28, 1954 2,690,548

UNITED STATES PATENT OFFICE 2,690,548

AUTOMATIC SWITCHING SYSTEM FOR RADIO BROADCASTING NETWORKS

Amos E. Joel, Jr., New York, N. Y., assignor to Bell Telephone Laboratories, Incorporated, New York, N. Y., a corporation of New York Application December 7, 1949, Serial No. 131,667

17 Claims. (Cl. 340—163)

This invention relates to program switching for radio broadcasting systems and more particularly to arrangements for switching transmission lines over which programs are transmitted. It is well known that a great many of the popular programs, simultaneously broadcast by radio stations throughout the country, originate in a single studio, such as one located in a radio broadcasting station, or at some "pick-up" point outside of, but locally connected to the station. Such pick-up points may be respectively connected to transmitting circuits at each of the various radio broadcasting stations locally connected to each of a large number of switching centers through which the stations and pick-up points may be connected to a considerably lesser number of radio wire networks.

At each of the switching centers there will be a number of program circuits. Some of these will be lines to local broadcasting stations and the others will be to program-trunks running over the various telephone line routes or lines in all directions. For each program, certain of these lines and trunks will be connected together as part of the same network. There are a number of such networks, some of them cover the entire country, and others may be less extensive in scope. At any one time all or certain stations associated with any one network may be broadcasting the same program, but the network is not a permanent structure. For the next program the network may include a different set of stations. The basic problem of program switching thus consists in the rearrangement of all the trunks and lines of each switching center into the desired network, for each program. Furthermore, it may be desired to establish additional networks, each of which requires a plurality of lines, some or all of which may, or may not, be connected to other networks at the time. Since time is of the essence, both from the standpoint of continuity of the broadcasting and from the standpoint of the sponsor of the program, the above rearrangements or switching operations must be made as nearly instantaneous as possible.

Originally, switching of the above character was manually effected through the medium of jacks and plug-ended cords having a color scheme to correspond to the respective radio wire networks in existence at that time. For example, one network was assigned red cords, another was assigned blue cords, etc. Later on, the switching was accomplished by means of manually operated keys as disclosed in United States Patent 1,871,310 granted to F. S. Entz et al. on August 9, 1932.

This patented arrangement greatly improved and shortened the time of making the switching transfers, yet as the volume of broadcasting has increased and the number of lines required to transfer the programs have increased in proportion, it has been necessary to further improve such facilities whereby still greater speed and flexibility is attained. Still later on, switching methods were further improved by providing, as described in United States Patent 2,269,034 granted to P. B. Murphy on January 6, 1942, means for preselecting any one or more lines of a group for future transfer from the network to which they may be connected at the time to other networks, a master switch corresponding to each network for initiating such transfers, and further preselecting means for rendering said master switches effective to control these transfers either singly or jointly.

However, in the two above-mentioned patented arrangements, the transfers were performed with manually operated switches located at a switching center and therefore in establishing broadcasting network rearrangements, it was necessary to transmit from a teletypewriter at a central dispatcher's office or directly from the radio wire network companies, instructions as to the desired combination of program wire lines, or networks, and outlet stations. The attendant at the switching center, upon receiving these instructions, manually preset the new network arrangement in advance of the required time of change. These preset changes were carefully checked after which the attendant listening to the network determined when the proper cue signal was transmitted, at which time he operated a master key, thereby instantaneously changing the arrangement of program circuits and station outlets, and/or pick-up points to the preset combinations when all conditions for the change had been satisfied.

In accordance with the present invention the presetting of connections at switching centers and the final completion of such connections when the time for changing the programs arrives, are performed automatically in response to code signals transmitted over a dispatcher's teletypewriter control circuit from a send and receive teletypewriter at the dispatcher's office which is located at some central point in a nationwide system of radio wire networks, or trunks, to a large number of switching centers respectively located at centers of large populations and other strategic points throughout the nation. Each of the switching centers may be individually selected by means of a start-stop six-unit code signal referred to herein as a calling cue signal and transmitted from the dispatcher's teletypewriter and the connections desired between a plurality of locally connected radio broadcast stations comprising studios and pick-up points and the radio wire networks at each of the switching centers are preset by means of other start-stop signals transmitted immediately following each calling cue signal. In response to each of these signals incoming at a switching center, its identical signal is automatically transmitted back to the dispatcher's teletypewriter immediately, as a verification, or check, signal to indicate by the recordation of its signal character on the teletypewriter tape that the functions of the signal have been satisfactorily performed at the switching center. When the preselected connections at all the desired switching centers have been preset, or conditioned, and checked, the dispatcher awaits the time for changing the programs and when that time arrives, he transmits a common master cue signal to all the switching centers to simultaneously complete the preset connections at the selected switching centers to effect the desired changes in the programs. When the connections at each switching center are finally completed, each switching center automatically transmits back to the dispatcher's teletypewriter its own calling cue, or identifying, signal which at each center is delayed in transmission for an interval different from the interval of each of the other switching centers. The connections established at a switching center during any one interval of time may, in most cases, control more than one program incoming to or outgoing from the stations locally connected to the switching center. These programs simultaneously transmitted and/or received at a switching center are referred to herein as a group of programs. In a nationwide system there may be required at the central point two or more dispatchers' teletypewriters respectively connected to control circuits radiating to separate regional areas, each control circuit being arranged to operate independently of the others.

An object of the invention is to selectively prepare automatically switching operations at one or more switching centers in response to code signals transmitted to them from a remote control station.

Another object of the invention is to automatically effectuate the prepared switching operations in response to another code signal transmitted to the switching centers from the control station.

Another object of the invention is to verify at the control station the proper preparation and effectuation of the switching operations by the automatic transmission of verification signals from the switching centers to the control station.

A feature of the invention resides in the provision of apparatus at each switching center, which is automatically and selectively responsive to start-stop six-unit code signals transmitted from the teletypewriter at a dispatcher's office to, first, select a particular switching center; secondly, in response to other signals, preset connections at the selected switching center; and thirdly, in response to a common master cue signal, complete the preset connections at the time when a change in the programs is desired. The preset connections at each of the desired switching centers are conditioned for completion, one switching center after the other, and the preset connections of all the selected switching centers are simultaneously completed when the time of changing the programs arrives.

Another feature is the provision of apparatus at each switching center for automatically transmitting back to the dispatcher's teletypewriter a vertification signal after each signal is transmitted from the dispatcher's teletypewriter, to inform the dispatcher that the proper selection, proper presetting or proper completion of the desired connection is accomplished.

Another feature is the provision of a novel set of switching relays capable of making the selection desired to establish several connections simultaneously and the relay selector sets provided for this purpose are referred to herein as permutation link circuits.

Another feature is the provision at each of the switching centers of apparatus adapted to receive from and automatically transmit back to the dispatcher's teletypewriter, signals of the start-stop code required for establishing the desired connections for program broadcasting.

Another feature is the provision of apparatus at each switching center for automatically establishing connections between one or more of a plurality of stations local to the switching center and one of the broadcast wire networks.

Another feature is the provision of apparatus at each switching center for automatically establishing in response to signals incoming from the dispatcher's teletypewriter, connections between a plurality of stations local to one switching center and a plurality of stations local to one or more of the other of the switching centers over one or more of the wire networks.

Another feature is the provision at each switching center of certain apparatus arranged to be successively selected and preset for establishing connections for broadcasting programs, the selection and presetting being effected at one switching center at a time, and other apparatus thereat arranged to be responsive to a master cue signal of start-stop code transmitted from said dispatcher's office to all the switching centers simultaneously when all the desired connections at all the selected switching centers are satisfactorily preset, to complete at the desired time the changing to the programs of the preset connections.

Another feature is the provision at each switching center of means automatically operative at the expiration of a program interval, in response to an incoming signal, for changing the programs at certain of a plurality of locally connected stations and maintaining unchanged the programs at the remaining locally connected stations.

Another feature is the provision at each of the switching centers of means automatically operative at the expiration of a program interval, in response to an incoming signal, for changing the programs at all the locally connected stations simultaneously.

Another feature is the provision at each of the switching centers of means automatically operative in response to a signal incoming at any time during the selecting or the presetting of connections for the next change of programs, for restoring the selected or preset connections to normal, the signal being effective to restore to normal the selected or preset connections at all switching centers simultaneously.

Another feature is the provision at each of a plurality of selected switching centers of means responsive to an incoming master cue signal common to all the switching centers connected to a control line, for automatically transmitting back to the transmitting point a signal distinctive of each of the selected switching centers and at an interval of time after the receipt of the master cue signal, different from the corresponding time interval assigned to each of the other selected switching centers.

Other objects and features of the invention will appear from a study of the following specification, claims and appended drawings of which:

Fig. 1 shows in schematic form the dispatcher's office connected by means of a control circuit to a plurality of switching centers. Two of the switching centers A and B, are shown in schematic form;

Fig. 2 shows in its upper left-hand corner the dispatcher's control circuit extending to switching center C. The remaining parts of Fig. 2 together with Figs. 3 to 15 inclusive, show switching center C in detail. The dispatcher's teletypewriter control circuit, by means of dotted lines, is represented as extending to other switching centers. Figs. 2 and 3 show the switching center control circuit apparatus including a rotary distributor for receiving and sending teletypewriter code signals which control and check the selection of the desired switching center, control and check the operation of the permutation link control circuit shown in Figs. 4 and 5, and control and check the operation of the two permutation link circuits one of which is shown in Figs. 6 and 7 and the other in Figs. 8 and 9. The two permutation link circuits shown in Figs. 6–7 and 8–9 are selected alternately in establishing connections between radio broadcast stations and/or pick-up points Nos. 1 to 6 locally connected to the switching center C and the radio wire networks Nos. 1 to 4 that are to be used in the transmission of programs to radio broadcasting stations connected to other switching centers. The radio broadcasting station No. 1, represented in schematic form in Fig. 10, and stations Nos. 2 to 6, inclusive, represented in block form in Fig. 11, are connected to switching center C through their respective service line direction control relay sets. One set is shown in detail in Fig. 10 and the other five are shown in block form in Fig. 11. The radio wire networks Nos. 1 to 4 which extend through each of the switching centers are selected through their respective radio wire network transmission direction control bridging arrangements, one of which is shown in detail in Figs. 12 and 13 and the other three are shown in block form in Figs. 14 and 15;

Fig. 16 shows the relative arrangement of Figs. 1 to 15; and

Fig. 17 represents a section of printed tape removed from the dispatcher's teletypewriter which shows the recordations thereon of the signal characters representative of the signals transmitted to switching centers A, B and C and the signals transmitted back to the dispatcher's control circuit from each of switching centers A, B and C, in turn, to which are respectively assigned the calling numbers 1, 2 and 3, in completing a change in programs at each of the selected switching centers.

GENERAL DESCRIPTION

The use of reference characters on the drawings follows a definite plan. In Figs. 2 to 9, inclusive, all relays shown have reference characters consisting of numerals and letters, the numerals shown as prefixes corresponding to the number of the figure in which the particular relay is located. All other parts of the system shown in Figs. 2 to 9 as well as all parts shown in Figs. 1 and 10 to 15 inclusive, are designated by numerals only, for instance, those parts in Fig. 1 are designated with numerals between 100 and 199, those in Fig. 2 are designated with numerals between 200 and 299, etc., wherein the first, or hundreds, digit designates the figure in which the particular part is found.

The dispatcher's teletypewriter is designed to send and receive start-stop signals of a six-unit code. The additional character selecting element required in the six-unit code over and above that normally found in a five-unit code follows the start impulse and precedes the first selecting element, the additional element being referred to in this description as the zero selecting impulse. When signals are transmitted for the purpose of selecting a switching center, this additional, or zero selecting impulse is always marking and when they are transmitted for the purpose of presetting connections for changes in the radio programs the zero impulse is always spacing. When all the necessary connections have been preset and the time for actually making the change in programs arrives, a master cue signal is transmitted from the dispatcher's office to complete the preset connections and thereby establish the change in programs. The six selecting impulses of the master cue signal are marking.

The dispatcher at any time prior to the start or the next change of programs may preset at each of the switching centers involved in the next change of station connection arrangement the connections required to effect the start or change by sending, (1) a single start-stop signal to effect the selection of the particular switching center, and (2) two start-stop signals to select and preset connections between the local broadcasting stations and predetermined wire networks, it being possible to connect various combinations of the radio stations with various combinations of the wire networks. The signals assigned to select the switching centers are individual to the particular centers and herein each of these signals has for its zero selecting impulse, as hereinbefore stated, a marking element. For example, it will be assumed that the figure 3 is assigned to automatically select switching center C and to the ordinary five-unit code signal for the figure 3 is prefixed a zero selecting impulse of marking nature to obtain the six-unit code combination. The two selecting signals that preset the desired connections at the selected switching center have as their respective zero selecting impulses spacing elements and the next five selecting impulses of each signal vary in accordance with the character which the signal represents in the five-unit code. The characters of the signals used for presetting the connections at each selected switching center involved in a change of programs may be different from those at each of the other selected switching centers so involved. Each pair of preset signals prepares predetermined connections between the stations locally connected to a switching center and the wire networks as prescribed in the schedule of programs in the hands of the dispatcher. Following each of the signals transmitted by the dispatcher, namely the calling cue signal, and the two preset signals, the apparatus at the selected switching center automatically transmits back to the dispatcher's office respectively identical signals indicating that the dispatcher's signals have performed their respective functions satisfactorily and these return signals are referred to herein as verification, or check, signals.

Two or more switching centers are usually involved in each change in radio broadcast programs and the preset connections at each of the selected switching centers are prepared in turn and then when the time for changing the programs arrives the master cue signal which is common to all switching centers is transmitted to all selected switching centers to instantaneously complete such preset connections whereby all the desired changes in programs are made at the one moment. All connections previously established for program transmission and reception at each of the switching centers just selected, are automatically released when the new, preset connections are completed in response to the master cue signal. Programs that are to be continued into the next program interval are automatically transferred to the connections established at the alternate permutation link circuit. Immediately following the reception of the master cue signal at the selected switching centers, each of such centers automatically transmits, in turn, back to the dispatcher's office a signal identical with its individual calling cue signal but at a different timed interval from the intervals of the other selected centers. These check, or verification, signals appear on the dispatcher's teletypewriter as typed characters immediately following the preset signal characters for the switching center that was last to be selected. The check signals for the master cue signal are recorded on the tape as a continuous series of individual calling cue signals. A typical section of printed tape removed from a dispatcher's teletypewriter shows in Fig. 17 the signal characters respectively representative of the calling cue, two preset signals and the verification signal for each signal recorded for each of three selected switching centers A, B and C. The recordation of the first three groups of six signals each, are made successively. For each of switching centers A, B and C three pairs of identical characters are recorded; the first pair are numerals which respectively represent the calling cue signal and its verification, the second pair are letters which respectively represent the first preset signal and its verification, and the third pair, also letters, respectively represent the second preset signal and its verification. Following the nine pairs of characters for the three selected switching centers is a blank space indicative of the master cue signal (six marking selecting impulses) which is transmitted from the dispatcher's teletypewriter at the time for network switching following the presetting of the connections at the three selected switching centers, each in turn. Immediately following the blank space appear the numerals 1, 2 and 3 which are the calling cue signals for switching centers A, B and C, respectively, and represent the verification signals successively received from the three switching centers at different predetermined intervals of time.

For illustration purposes switching center C will be herein assumed to be the center selected for describing in detail the connections to be established between the local stations thereat and the desired wire networks. As hereinbefore stated, switching center C has locally connected thereto six radio stations and/or pick-up points Nos. 1 to 6 respectively connected to six service line transmission direction control circuits, 1000-1, 1000-2, 1100-3, 1100-4, 1100-5 and 1100-6. Inasmuch as four radio wire networks Nos. 1 to 4 are shown, four stations are shown normally arranged for connection to two networks, that is, two stations to each of two networks and the other two stations are respectively assigned to the other two wire networks. Each of the six radio broadcasting stations are normally arranged in their receiving condition as shown in station No. 1, Fig. 10, wherein the broadcasting circuit 1001 is prepared for reception by the normally operated condition of relay 1002. The transmitting, or microphone, circuit 1003 at station No. 1 is arranged for connection to its wire network under the control of key 1004. Microphone circuit 1003 may be any one of a plurality of such microphone circuits provided either within station No. 1 or outside of such stations at such points referred to herein as pick-up points, each circuit being under control of its respective key such as key 1004. When it is desired to transmit from station No. 1 directly to its one or more connected wire networks, key 1004 is operated. In like manner, service line transmission direction control circuits 1000-2, 1100-3, 1100-4, 1100-5 and 1100-6 control the direction of transmission at stations Nos. 2 to 6 respectively. For a detailed description of the operation of the service line transmission direction control circuits reference may be had to Patent 2,198,326 granted to A. E. Bachelet on April 23, 1940, the disclosure of which is hereby made a part of this application as if fully set forth herein. The operation of relays 1002, 1007, 1005, 1006 and 1008 may be readily understood by referring to the description of the operation of their corresponding relays 1305, 1306, 1316, 1318 and 1315, respectively, contained in the specification of Bachelet Patent 2,198,326.

Network transmission direction control bridging arrangements provided at each switching center serve to control the direction of transmission from any one of the switching centers connected to the dispatcher's control circuit to any or all of the other of the switching centers connected thereto. Each of the bridging arrangements comprise two parts, one wherein a pair of relays are provided for each of the locally connected radio broadcasting stations and the other wherein two groups of relays referred to herein as bridging devices are provided for each network connected to the switching center. The first-mentioned part may include an additional pair of relays for each additional locally connected station that may be normally arranged for connection to a single network.

At switching center C two pairs of relays, namely, relays 1201 and 1203 and relays 1202 and 1204, are respectively provided for any two stations arranged for connection to radio wire network No. 1. Likewise, two pairs of relays, namely, relays 1401 and 1403 and relays 1402 and 1404, are respectively provided for any two stations arranged for connection to radio wire network No. 2. For radio wire networks Nos. 3 and 4, however, only one pair of relays are provided for each network, namely, relays 1405 and 1406 for network No. 3 and relays 1407 and 1408 for network No. 4.

With respect to the six radio stations directly connected to switching center C, stations Nos. 2 and 6 are normally assigned to radio wire network No. 1, stations Nos. 1 and 5 are normally assigned to network radio wire No. 2, station No.

4 is normally assigned to radio wire network No. 3 and station No. 3 is normally assigned to radio wire network No. 4. These connections may be permanently or temporarily established, as desired, through the radio wire network transmission direction control bridging arrangements respectively shown in Figs. 12–13 and 14–15. Either of relays 1201 and 1202 when operated by a connection established by the dispatcher through switching center C, may at the will of the dispatcher, also connect network No. 1 to any of stations Nos. 1 to 6. Either of relays 1401 and 1402 when operated by the dispatcher may also connect network No. 2 to any of the local stations. Relay 1405 when operated by the dispatcher may connect network No. 3 to any of the stations and relay 1407 when operated may connect network No. 4 to any of the stations. The stations selected for connections to the respective networks depend on the connections preset at the relays of either of permutation link circuits Nos. 1 and 2 shown in Figs. 6–7 and 8–9.

The second-mentioned part of each bridging arrangement includes two groups of relays for each radio wire network, as hereinbefore stated, and each of these two groups or devices, control the direction of transmission over opposite channels of a single network, for example, one device has control over the channel of one network on one side of a switching center and the other device has control over the channel of the same network on the other side of the switching center. At switching center C devices 1300–1A and 1300–1B are provided for network No. 1, devices 1500–1A and 1500–1B, devices 1500–2A and 1500–2B and devices 1500–3A and 1500–3B are respectively provided for networks Nos. 2, 3 and 4. Devices 1300–1A and 1300–1B only are shown in detail. Device 1300–1A controls the direction of transmission incoming over channel 1301 of network No. 1 and device 1300–1B controls the direction of transmission incoming over channel 1302 of network No. 1. Device 1500–1A controls the direction of transmission incoming over channel 1303 of network No. 2 and device 1500–1B controls the direction of transmission incoming over channel 1501 of network No. 2. In like manner, devices 1500–2A and 1500–2B respectively control channels 1502 and 1503 of network No. 3, and devices 1500–3A and 1500–3B respectively control channels 1504 and 1505 of network No. 4.

Device 1300–1A comprises relays 1308 and 1309. Relay 1308 serves to direct the transmission of programs incoming over channel 1301 of radio wire network No. 1 to the stations locally connected to switching center C, and to channel 1302 of network No. 1 extending to other switching centers, not shown, but connected to the dispatcher's control circuit. Relay 1309 operates in response to the operation of a microphone circuit key, such as key 1004, whereby programs originating at a station locally connected to switching center C are directed over network No. 1, by means of channel 1301 to switching centers A and B.

Device 1300–1B comprises relays 1310 and 1311. Relay 1310 serves to direct programs incoming over channel 1302 of network No. 1 to stations locally connected to switching center C, and to channel 1301 of radio wire network No. 1 to switching centers A and B. Relay 1311 also operates in response to the operation of a microphone circuit key, such as key 1004, whereby the programs originating at a station locally connected to switching center C are directed for transmission over network No. 1 by means of channel 1302 to other switching centers, not shown.

Each of relay devices 1500–1A, 1500–1B, 1500–2A, 1500–2B, 1500–3A and 1500–3B comprise two relays like those described above for devices 1300–1A and 1300–1B for controlling the direction of program transmission from one or more of the local stations over their respectively associated networks 2, 3 and 4.

For a complete description of the operation, in detail, of the radio wire network transmission direction control arrangements shown in Figs. 12–13 and 14–15, reference may be had to Bachelet Patent 2,198,326, supra. Relays 1201, 1203, 1308, 1309, 1312, 1313, 1314, 1315 and 1316 of the network transmission direction control arrangement shown in Figs. 12 and 13, operate in a manner similar to their corresponding relays, such as relays 302, 301, 412, 413, 403, 414, 411, 304 and 303, respectively, shown in Figs. 3 and 4 of Bachelet Patent 2,198,326, supra.

If a station locally connected to any one switching center is transmitting a program over one of its microphone circuits, that program may be broadcast from the same station over its associated radio broadcasting circuit by an arrangement of relays such as shown in Figs. 2, 5, 8 and 9 of Patent 2,110,284 granted to A. E. Bachelet et al. on March 8, 1938, the disclosure of which may also be made a part of this application as if fully set forth herein. Also available for providing at each switching center are well known means for transmitting a program originating in a microphone circuit in one of a plurality of stations locally connected to a switching center to the radio broadcasting circuit at one or more of the other locally connected stations. However, these means form no part of the present invention and thereby such means are not disclosed herein.

*Switching center control circuit*

This circuit is controlled by the dispatcher's teletypewriter control circuit which connects, in series, a plurality of switching centers to a dispatcher's office, there being included in the dispatcher's teletypewriter control circuit a line-receive and a line-send relay at each switching center whereby automatic remote control is had of the program switching operations at each of the switching centers by a dispatcher at the distant office. Figs. 2 and 3 which show the rotary distributor and the control relay arrangement at switching center C, is representative of that at each of the other switching centers. Each switching center has in its control relay arrangement three pairs of W and Z relays provided to operate in response to each teletypewriter code signal incoming from the dispatcher's teletypewriter. The second pair is operated, one relay after the other, by the first pair as a result of the second, third and fourth incoming signals. The third pair is operated, one relay after the other, by the first two pairs also as a result of the second, third and fourth incoming signals. In response to the selecting, or calling cue, signal, the desired switching center is selected and the W relay of the first pair at all switching centers becomes operated. Also in response to this signal a group of six pulse relays P and a group of six locking relays L at each switching center operate in accordance with the code combination of the calling cue signal. At the desired switching center only, the operated combination of locking relays L closes a locking circuit for the operated locking relays, for the operated pulse relays and the operated W and Z relays of the first pair, the Z relay of the first pair having operated immediately following the receipt of the last impulse of the signal. At each of the other switching centers the operated W relay of the first pair, the operated pulse relays P and the operated locking relays L release immediately following the receipt of the last impulse of the signal, in order to prevent the preset signals subsequently transmitted to the desired switching center from affecting any other switching center but the one that is desired. Relay Z of the first pair at the desired switching center upon being locked operated causes a verification signal identical with the calling cue signal of the desired switching center to be automatically transmitted by means of the rotary distributor and the line-send relay at the desired switching center, back over the teletypewriter control circuit to the dispatcher's teletypewriter. The verification signal is recorded as a character immediately following the character for the calling cue signal which has already been recorded on the tape. When the transmission of the verification is completed the W and Z of the first pair, the locked-operated pulse and the locked-operated locking relays return to normal but a start relay STT which operated when the Z relay of the first pair became operated, now remains operated due to its locking circuit. Relay STT remains in a locked-operated position just until the verification signal for the second preset signal is transmitted back to the dispatcher's teletypewriter and then releases. However, during this interval of time relay STT in its locked-operated position, prevents any incoming calling cue signal from interfering with connections already established at this selected switching center.

The selected switching center is now ready to receive from the dispatcher the first preset signal which when received, operates the W and Z relays of the first pair a second time, the groups of pulse and locking relays in respectively distinctive combinations in that corresponding relays of the two groups are in oppositely related condition, and a group of five translating relays T of the permutation link control circuit. The operated code combination of T relays corresponds to the operated code combination of the locking relays, both combinations being at this time identical with that of the first preset signal. The translating T relays in their operated combination cause to be locked-operated certain PR relays of a group of six in an idle permutation link circuit. As soon as the functions of the first preset signal are satisfactorily completed the combination of locked-operated pulse relays P in cooperation with the rotary distributor causes to be automatically transmitted by the line-send relay LS to the dispatcher's teletypewriter a second verification signal, the signal being of a combination identical with that of the first preset signal. After the transmission of the second verification signal to the dispatcher's office, the operated pulse relays P, locking relays L and translating relays T are released in preparation for the second preset signal. The start relay STT and certain other relays controlled thereby remain operated.

In response to the second preset signal incoming from the dispatcher the W and Z relays of the first pair operate a third time and the group of six pulse relays P and the group of six locking relays L are again operated in oppositely related condition. The operated code combination of locking relays at this time corresponds to the combination of the second preset signal, the locking relays, so operated, causing the translating relays to be again operated in a combination also corresponding at this time to that of the second preset signal. The translating relays T upon operating in response to the second preset signal, operate a second group of five PR relays in the idle permutation link circuit, the second group being operated in a combination determined by the second preset signal. The pulse relays having been locked in the combination corresponding to that of the second preset signal, now cause to be transmitted to the dispatcher's teletypewriter the third verification signal which is identical with the second preset signal. The dispatcher now presets the necessary connections at other desired switching centers.

If it should be noted after transmitting either of the preset signals that the prepared connection is in error, the dispatcher may wipe out the connections so far established by transmitting a special release signal. However, should the preset connections be satisfactorily conditioned for completion, the AMC relay operates because the W and Z relays of the second and third pairs are operated and remain operated until the time for changing the program arrives. When this time arrives the dispatcher sends the master cue signal which is common to all the switching centers connected to the dispatcher's control circuit. Inasmuch as the six selecting impulses of the master cue signal are all marking, the pulse relays P remain released since each operated in response to a space only, and all the locking relays L operate and lock. In response to the master cue signal the W and Z relays of the first pair operate for the fourth time. When the last of the locking relays L operates the master cue relay MC operates over the operated No. 5 armature of the AMC relay. The MC and AMC relays are in the switching center control circuit. During the reception of the master cue signal an ASZ relay in the permutation link control circuit operates or releases to close the operating circuit for an SW relay in the idle one of the two permutation link circuits and the SW relay of the idle circuit operates to complete the connection preset by the combination prepared at the two groups of PR relays in the idle circuit. When the AMC relay operates, ground is removed from the upper winding of the time measuring TM relay and a second ground substituted at the No. 3 armature of the Z relay of the above-mentioned first pair while such Z relay was in a released position. However, at the end of the reception of the master cue signal, the Z relay of the hereinbefore-mentioned first pair when operated for the fourth time removes the substitute ground and a condenser connected to the upper winding of the TM relay begins charging. The TM and Z relays and the condenser are in the switching center control circuit. The TM relay at each switching center is controlled by a different setting of a potentiometer in the timing circuit which includes the upper winding of such relay and a condenser in series connection, so that the timed interval for operating the relay is different at each switching center. At the end of the interval required to completely charge a condenser, the relatively strong current in the upper winding of the TM relay ceases and thereby allows the weaker current flowing through the lower winding to operate the relay to its closed position which causes the verification signal for the master cue signal to be transmitted back to the dispatcher's teletypewriter. However, in this case the verification signal is not identical with the master cue signal in that each switching center automatically transmits a verification signal which is identical with the calling cue signal for the particular switching center, the selection of the final verification signal of the switching center being under the control of an SC relay operated by the operation, for the fourth time, of the Z relay of the first pair. The SC relay is in the switching center control circuit. The fourth operation of the Z relay of the first pair immediately follows the reception of the master cue signal. Therefore, in providing at each switching center a timing circuit having a resistance of a distinctive value predetermined by the setting of the potentiometer, verification signals from two or more selected switching centers where preset connections have been completed, are transmitted to the dispatcher's teletypewriter at different intervals of time following the reception of the common master cue signal.

The switching center control circuit is arranged to allow for thirty-two switching center selections, although it is obvious that the selections are not limited to this number as will be hereinafter noted. Each of the switching center control circuits is different from the others in that each has in response to its calling cue signal a distinctive combination of operated and unoperated locking relays L for completing a circuit for lock-operating relay Z of the first pair of W and Z relays for the duration of transmission of the verification signal for the calling cue signal back to the dispatcher's office. A relay Z of the first pair at the selected switching center upon operating, causes a start relay STT in the permutation link control circuit to operate whereby the selected switching center is prepared to receive the preset signals intended for that center. In response to the calling cue signal for the desired switching center, the W relay only of the first pair at each of the other switching centers also operates but then releases immediately following the reception of the calling cue signal, and consequently its associated Z relay of the first pair does not operate to permit the start relay STT at each of the the other switching centers to operate. In this manner, only one switching center is prepared to receive the preset signals immediately following the reception of a calling cue signal.

The rotary distributor of the switching control circuit is of the start-stop type and comprises two full rings, one solid and the other divided into segments, namely, start, selecting segments 0, 1, 2, 3, 4, 5 and stop, or rest, segment, and two partial rings each consisting of a segment of the same angular length as the rest segment of the full segmented ring. The rotary distributor in its normal, or rest, position holds a DN relay in a normally operated position by means of a brush interconnecting the rest segments of the two partial rings, the DN relay also being in the switching center control circuit.

Connected to each of the selecting segments of the full segmented ring is a pulse relay P arranged to operate in response to its corresponding space impulse of each signal combination incoming over the teletypewriter control circuit and received by the line-receive relay LR. Under the control of each relay is a locking relay L which, upon operating as hereinafter described, remains operated only when its corresponding P relay does not operate during the revolution of the distributor brush arm over the selecting segments. All of the L relays operate as soon as the DN relay operates at the beginning of rotation of the distributor brush arm but as the brush arm rotates over the selecting segments certain of these L relays release, depending on the code combination of the switching center calling cue signal. In other words, a pulse relay P operates in response to each spacing impulse of the selecting impulses of the calling cue signal and should any of the P relays remain unoperated due to its corresponding selecting impulse being marking, then the L relay corresponding to such unoperated P relay, remains operated and the remaining L relays release as their corresponding P relays operate in response to the space impulses of the calling cue signal combination during the rotation of the brush arm. The combination of operated and unoperated L relays in response to its particular calling cue signal directly corresponds to the combination of marking and spacing impulses of such incoming calling cue signal which is distinctive in its combination to the switching center for which it is intended. This distinctive combination is cross-connected on the contacts of the L relays. However, the operated P and L relays at all switching centers other than that which is desired, are restored to normal when the DN relay reoperates at the end of the first revolution of the distributor brush arm. The L relays at the selected switching center, in response to their own calling cue signal, close a path over their respective left-hand armatures which is effective to hold locked the operated P and L relays of their respective groups for the duration of the second revolution of the rotary distributor brush arm to provide for the transmission of a verification signal.

The L relays when operated in response to the master cue signal close at their respective innermost right-hand armatures a path for causing the completion of the network connections preset by the preset signals and in response to the release signal whereof the zero and fifth impulse only of the selecting impulses are marking, close at their respective outermost right-hand armatures a path for wiping-out any preset connections made in response to any of the first three incoming signals in the event that an error is discovered in the switching center selection or either of the preset connections, before the common master cue signal is transmitted. The five middle right-hand armatures of the L relays arranged to respond to selecting impulses 1, 2, 3, 4, and 5, respectively, of an incoming signal are provided to operate their respectively corresponding five translating relays T in the permutation link control circuit. It will be noted that no translating relay T is provided to respond to the selecting impulse 0 which for the preset signals is always spacing and therefore no T relay would ever be operated by it.

The combination set up by the operated T relays is translated by the permutation link control circuit for the purpose of controlling the preset PR relays in the first group of the idle one of the two permutation link circuits. In response to the first preset signal following the selection of the desired switching center when the T relays are operated in a combination corresponding to the code of the first preset signal, a circuit is closed by the release of a normally operated TSR relay to operate the C6B relay of the permutation link control circuit, which upon operating, completes a series of paths to operate the PR relays of the first group, such as those shown in Fig. 6 or 8, depending on which of the two permutation link circuits is idle at the time. With the C6B relay operated a ground connection furnished at the No. 1 armature and back contact of an LC relay, is applied to a series of parallel circuit paths completed by combinations of operated and unoperated T relays. The T relays in response to the first preset signal assume either of two positions, namely, operated or unoperated depending on the code combination of the first preset signal and thereby cause a corresponding combination of W1 to W6 conductors to be energized for operating certain or all of the PR relays of the first group required to condition the desired connections. The positions of the T relays in response to the first preset signal of the first group and the corresponding W1 to W6 conductors energized thereby are indicated in the following table wherein O represents the operated positions, the unoperated positions not being indicated, and X represents the energized conductors of conductors W1 to W6:

| Signal Characters | T Relays | | | | | W1 to W6 Conductors | | | | | |
|---|---|---|---|---|---|---|---|---|---|---|---|
| | T1 | T2 | T3 | T4 | T5 | W1 | W2 | W3 | W4 | W5 | W6 |
| Blank | | | | | | | | | X | | |
| Carriage Return | | | | O | | | | | X | | |
| T | | | | | O | | | | | X | |
| A | O | O | | | | | | | | | X |
| J | O | O | | O | | | | | X | | X |
| E | O | | | | | X | | | | | |
| D | O | | | O | | X | | | X | | |
| Z | O | | | | O | X | | | | X | |
| B | O | | | O | O | X | | | | | X |
| Figures Shift | O | O | | O | O | X | | | X | | X |
| Line Feed | | O | | | | | X | | | | |
| R | | O | | O | | | X | | X | | |
| L | | O | | | O | | X | | | X | |
| G | | O | | O | O | | X | | | | X |
| O | | | | O | O | | X | | X | | X |
| Space | | | O | | | | | X | | | |
| N | | | O | O | | | | X | X | | |
| H | | | O | | O | | | X | | X | |
| U | O | O | O | | | | | X | | | X |
| K | O | O | O | O | | | | X | X | | X |
| S | O | | O | | | X | | X | | | |
| F | O | | O | O | | X | | X | X | | |
| Y | O | | O | | O | X | | X | | X | |
| X | O | | O | O | O | X | | X | | | X |
| M | | | O | O | O | X | | X | X | | X |
| I | | O | O | | | | X | X | | | |
| C | | O | O | O | | | X | X | X | | |
| P | | O | O | | O | | X | X | | X | |
| V | | O | O | O | O | | X | X | | | X |
| Letters Shift | O | O | O | O | O | | X | X | X | | X |

Letters Q and W are not shown in the above list because they are redundant in that the selection of desired radio wire networks obtained by the use of their respective signal combinations may also be had by using a certain two of the other characters listed above.

The ground on the W1 to W6 conductors completes the circuits which operate the desired PR relays of the first group in the permutation link circuit which is available at the time. When these PR relays operate a CK1 relay operates to thereby operate the LC relay from the last armature of the series-connected armatures of the C6B relay.

If no T relays are operated no PR relays are operated and therefore the CK1 relay will not operate. However, a circuit from ground extends over the inner right-hand armatures of the T relays, in series, when in released positions, to operate the LC relay directly inasmuch as a CCK relay in the permutation link control circuit is operated at the time.

In response to the second preset signal the T relays are again operated in a combination but this time the combination corresponds to the code of the second preset signal and the operation of the T relays is followed by the operation of a C7A relay also of the permutation link control circuit. With the C7A relay operated the ground connection furnished at the No. 1 armature and back contact of the LC relay, is applied to a series of parallel circuit paths completed by combinations of operated and unoperated T relays and extended by the armatures thereof over combinations of W7 to W11 conductors to operate the desired PR relays of the second group such as either of those shown in Fig. 7 or 9, required to further condition the desired connections. The T relays in response to the second preset signal again assume either of two positions, namely, operated or unoperated, depending on the code combinations of the second preset signal. The positions of the T relays in response to the second preset signal and the corresponding W7 to W11 conductors energized thereby, are indicated in the following table wherein O represents the operated positions, the unoperated positions not being indicated, and X represents the energized conductors of conductors W7 to W11.

| Signal Characters | T Relays | | | | | W7 to W11 Conductors | | | | |
|---|---|---|---|---|---|---|---|---|---|---|
| | T1 | T2 | T3 | T4 | T5 | W7 | W8 | W9 | W10 | W11 |
| Blank | | | | | | | | | | |
| Carriage Return | | | | O | | | | | X | |
| T | | | | | O | | | | | X |
| A | O | O | | | | X | X | | | |
| J | O | O | | O | | X | X | | X | |
| E | O | | | | | X | | | | |
| D | O | | | O | | X | | | X | |
| Z | O | | | | O | X | | | | X |
| B | O | | | O | O | X | | | X | X |
| Figures Shift | O | O | | O | O | X | X | | X | X |
| Line Feed | | O | | | | | X | | | |
| R | | O | | O | | | X | | X | |
| L | | O | | | O | | X | | | X |
| O | | | | O | O | | | | X | X |
| Space | | | O | | | | | X | | |
| H | | | O | | O | | | X | | X |
| U | O | O | O | | | X | X | X | | |
| S | O | | O | | | X | | X | | |
| Y | O | | O | | O | X | | X | | X |
| X | O | | O | O | O | X | | X | X | X |
| I | | O | O | | | | X | X | | |
| P | | O | O | | O | | X | X | | X |
| Q | O | O | O | | O | X | X | X | | X |
| W | O | O | | | O | X | X | | | X |

Letters G, N, K, F, M, C, V and "Letters Shift" are not shown in the above list because they also are redundant in that the selection of desired radio wire networks obtained by the use of their respective signal combinations may be had by using certain of the other characters listed above.

The ground on the W7 to W11 conductors operates the desired PR relays of the second group in the available permutation link circuit. When these PR relays operate a CK2 relay operates to thereby operate the LC relay from the last armature of the series-connected armatures of the C7A relay. If all the T relays are released no W7 to W11 conductors are connected to ground and therefore the CK2 relay will not operate. A series contact chain through the right-hand armatures of the T relays in released positions closes a circuit for operating the LC relay directly.

Therefore, the PR relays in both groups are operated in combinations determined by the code combinations of the two preset signals, respectively, and each of the operated PR relays is locked operated at its inner left-hand armature for the duration of the network connection. Each PR relay controls four groups of armatures on its right-hand side, the groups being identified herein as tip, ring, sleeve and sleeve prime, all of which operate simultaneously with the operation of their respective relays. In Figs. 10 and 11, six groups of conductors respectively connect the six service line direction control relay sets to the six armatures of each of the four groups, tip, ring, sleeve and sleeve prime of the switching relay SW which serves, when operated, to complete the preset network connections. The tip conductor of each group of conductors extending from a service line direction control relay set is connected to one of the six tip armatures of the SW relay. Likewise, the ring, the sleeve and the sleeve prime conductor in each of the six groups of conductors are connected to their respectively corresponding armatures in each of the four groups of armatures of the SW relay.

By a process of permutations the six locally connected stations may be connected to any of the four networks, two of the networks at all times, according to the arrangement shown herein, being arranged for connection to two stations each. It is obvious as disclosed in the Bachelet patents, supra, that the arrangement used herein at switching center C is not limited to six locally connected stations and four wire networks. Furthermore, three or more stations may be arranged for connection to a single network. The arrangement shown provides for 720 combinations in each permutation link circuit.

The wiring of each PR relay represents a rotation of a number of conductors, or groups of conductors, of six or less. The following table shows the number of relays associated with each group of conductors of six or less than the rotation produced by its operation. The object of the complete wiring of eleven PR relays in each permutation link circuit is to produce any one of the 720 permutations ($6\times5\times4\times3\times2\times1=720$) of six input conductors, or groups, such as those respectively connecting the six locally connected stations Nos. 1 to 6, with respect to six output conductors, or groups, connected to the four wire networks Nos. 1 to 4. By increasing the number of rotational PR relays in each of the two sets, each of the two permutation links may be devised to accommodate a larger number of stations and/or networks.

Six conductors, or groups, are connected through the armatures of three PR relays to a conductor, for example, in permutation line circuit No. 1 these six conductors, or groups, are connected through the armatures of relays 6PR-1, 6PR-2 and 6PR-3 to conductor 606. In like manner, also with respect to permutation link circuit No. 1, five conductors, or groups, are connected through the armatures of relays 6PR-4, 6PR-5 and 6PR-6 to conductor 604; four conductors, or groups, are connected through the armatures of relays 7PR-7 and 7PR-8 to conductor 707; three conductors, or groups, are connected through the armatures of relays 7PR-9 and 7PR-10, to conductor 705; two conductors, or groups, are connected through the armatures of relay 7PR-11 to conductor 703; and two conductors, or groups, are also connected through the armatures of relay 7PR-11 to conductor 701. The rotations described in this paragraph are indicated in the following table:

| No. of conductors, or groups | 6 | 6 | 6 | 5 | 5 | 5 | 4 | 4 | 3 | 3 | 2 |
|---|---|---|---|---|---|---|---|---|---|---|---|
| Relay designations | PR-1 | PR-2 | PR-3 | PR-4 | PR-5 | PR-6 | PR-7 | PR-8 | PR-9 | PR-10 | PR-11 |
| No. of rotations | 1 | 2 | 3 | 1 | 2 | 3 | 1 | 2 | 1 | 2 | 1 |

By the operation of combinations of these PR relays rotations less than the number of conductors being rotated may be obtained as given in the following table:

DESIGNATION OF PR RELAYS OPERATED TO GIVE A SPECIFIC NUMBER OF ROTATIONS

| No. of Conductors or Groups Being Rotated | Total No. of Rotations | | | | | |
|---|---|---|---|---|---|---|
| | 0 | 1 | 2 | 3 | 4 | 5 |
| | Relays | | | | | |
| 6 | ------ | PR-1 | PR-2 | PR-3 | PR-1<br>PR-3 | PR-2<br>PR-3 |
| 5 | ------ | PR-4 | PR-5 | PR-6 | PR-4<br>PR-6 | -------- |
| 4 | ------ | PR-7 | PR-8 | PR-7<br>PR-8 | -------- | -------- |
| 3 | ------ | PR-9 | PR-10 | -------- | -------- | -------- |
| 2 | ------ | PR-11 | -------- | -------- | -------- | -------- |

The two permutation link circuits at switching center C are such as those respectively shown in Figs. 6-7 and Figs. 8-9 and one or the other is always in an operated position, leaving one always available to preset connections for the next group of programs. Assuming that permutation link circuit shown in Figs. 8-9 is in an operated position, then relay 8SW of the permutation link control circuit is operated in a circuit traceable from grounded battery, through the winding of relay 8SW, conductor 5SW-2, back contact and armature No. 4 of relay 5ASZ to ground. The locking circuit for the operated relays of the 8PR and 9PR relay groups is closed in a path traceable over the front contact and armature No. 2 of each of the operated relays, conductor 5L-2, normally closed lower make-before-break contacts of relay 5ASZ, to ground. The operated 8PR and 9PR relays in cooperation with the operated relay 8SW maintain closed the connections previously established for the group of programs still being broadcast and continue to maintain closed such connections until the dispatcher transmits the master code signal to effect a change of programs. All other relays, except relay 5TSR which is normally operated, are in a released condition at this time.

*Detailed description of operation*

Figure 8:
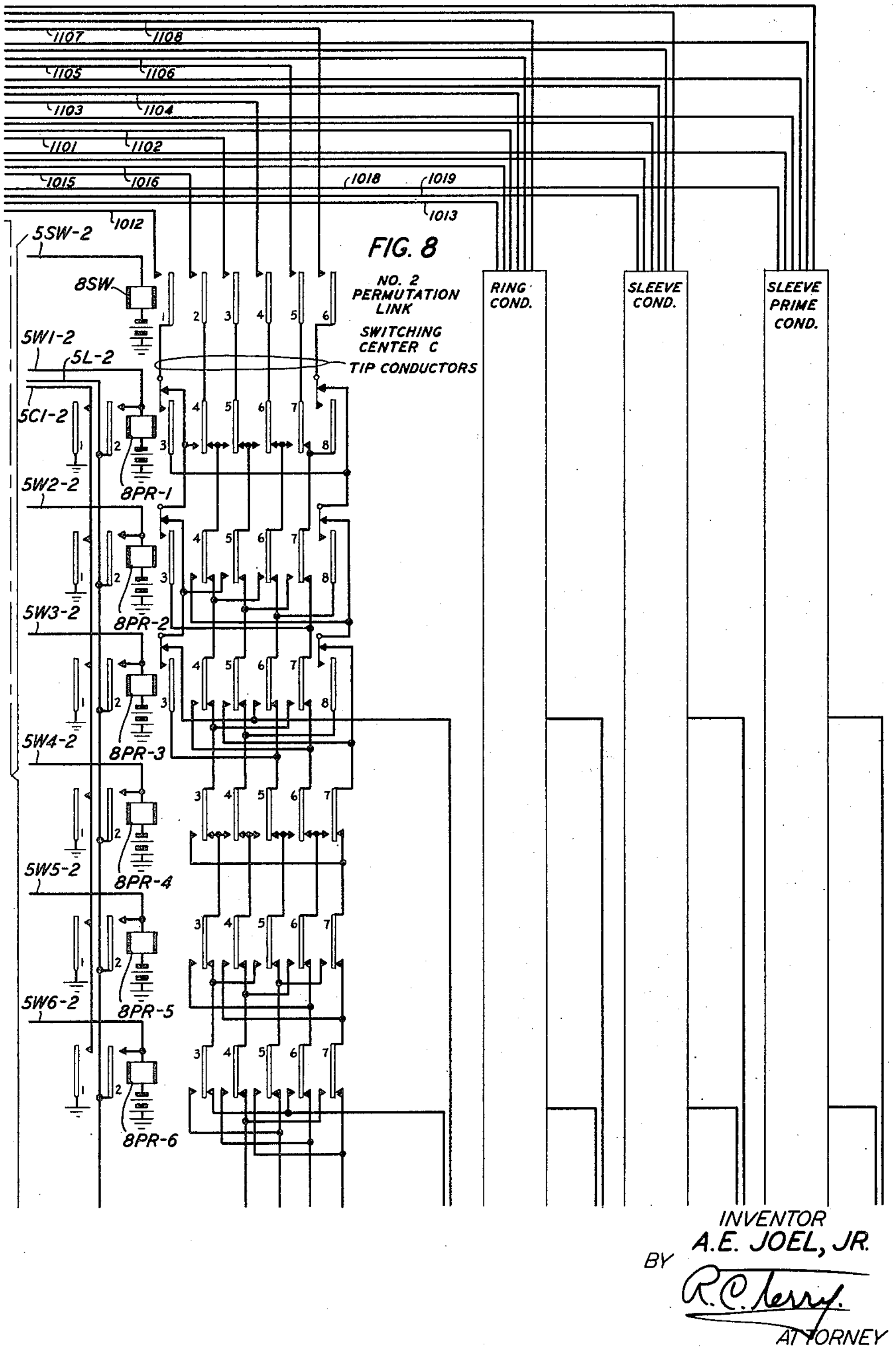
Figure 9:
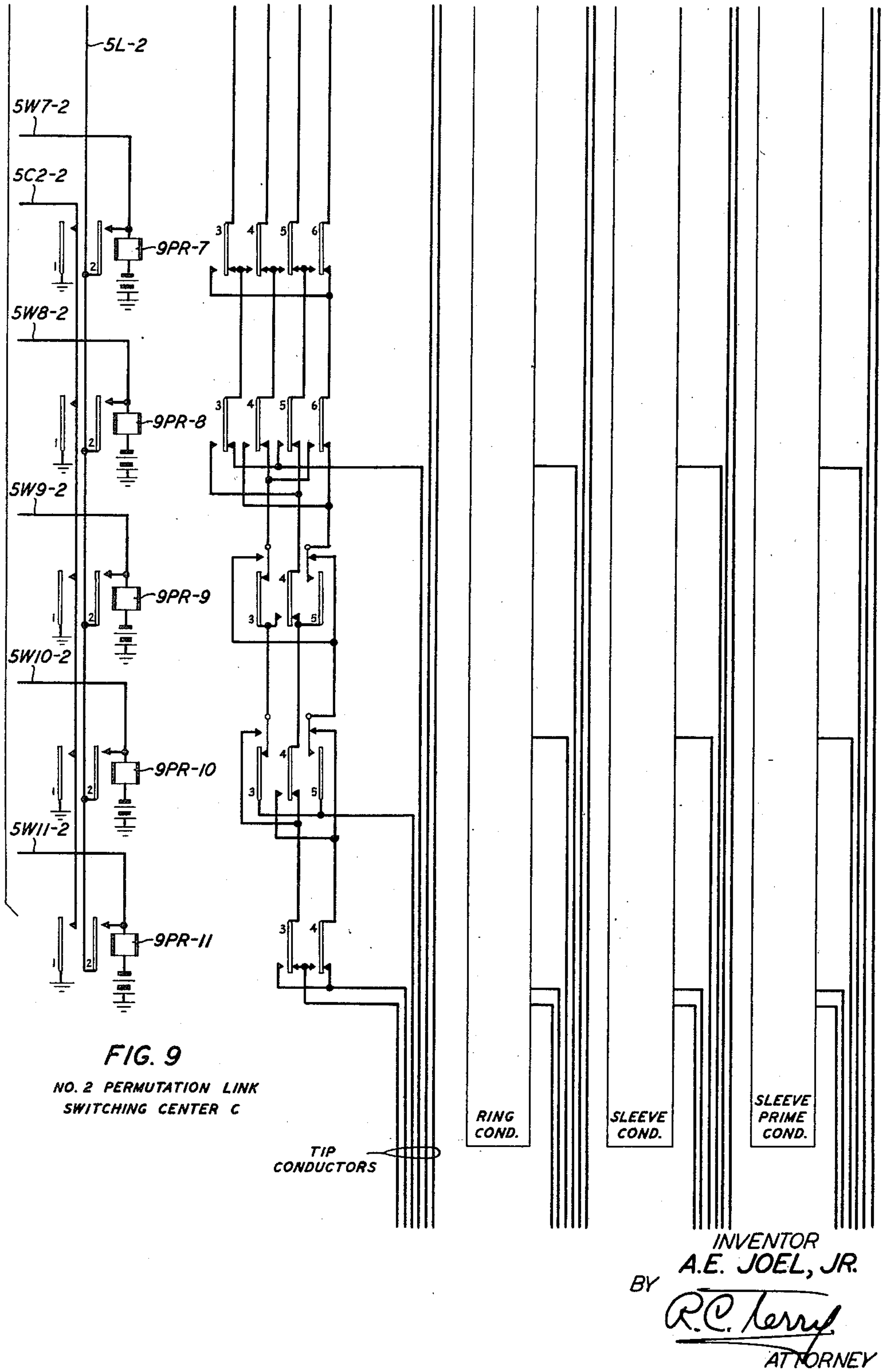
Figure 10:
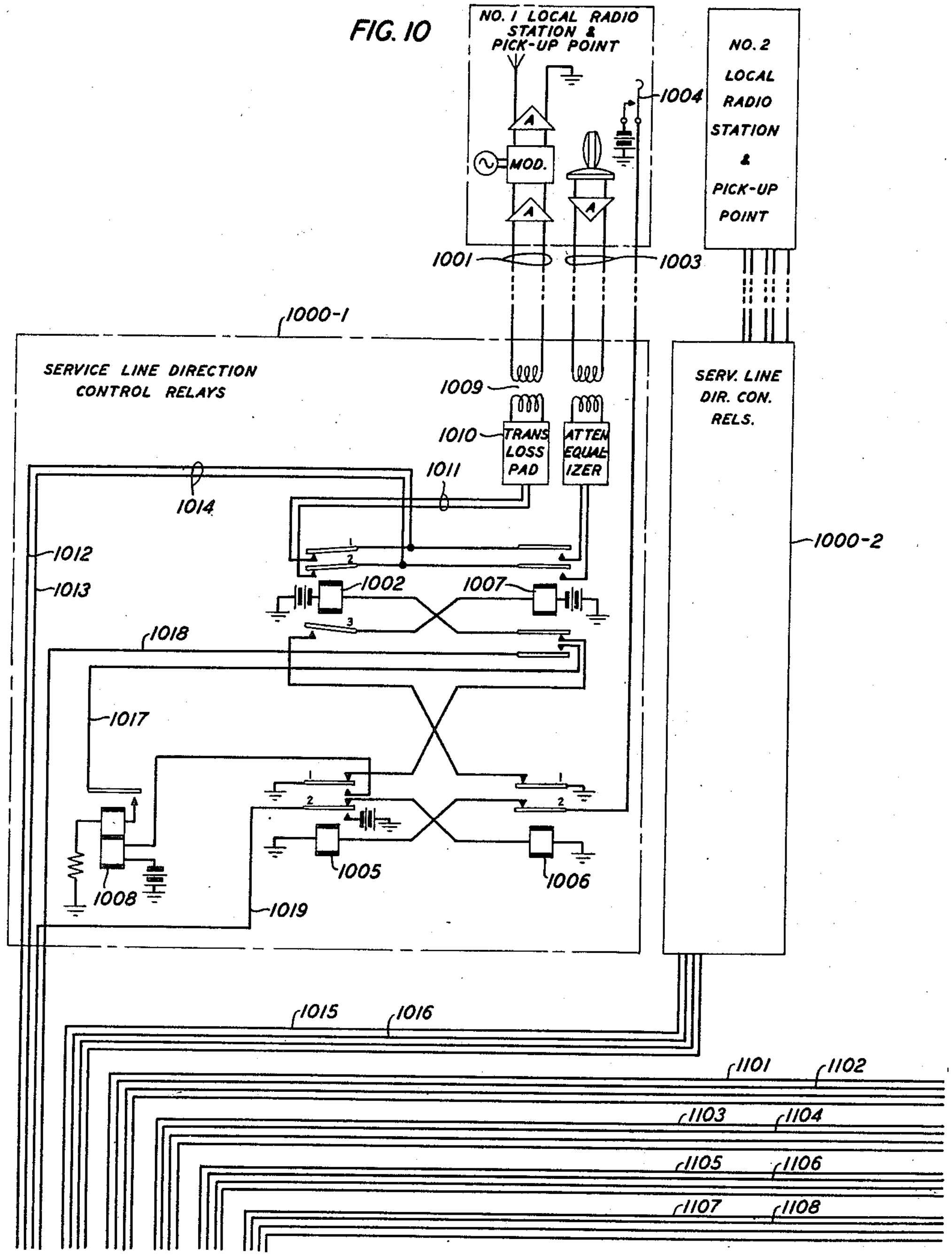
Figure 11:
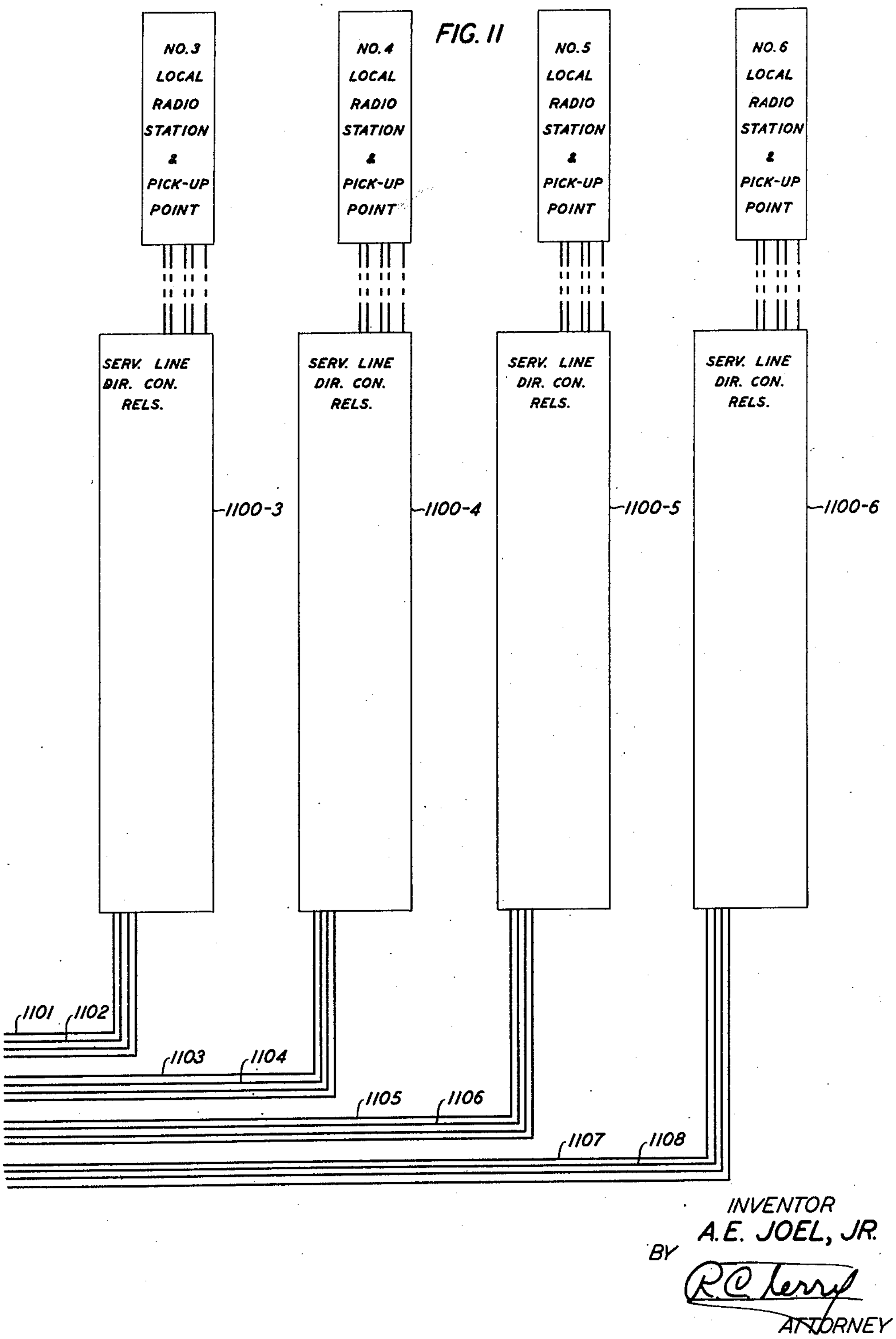

As hereinbefore stated, one or the other of the two permutation link circuits is in an operated condition at all times and in order to describe in detail the method of making a change in program transmission over radio wire-networks it will be herein assumed that transmission start switch 104 is in a closed position and permutation link circuit No. 2 which is shown in Figs. 8 and 9 is in its operated condition in that its switch-over relay 8SW is operated to maintain transmission of the programs to and/or from stations Nos. 1 6. Relay 8SW in its operated position, holds closed until the next change in programs the program transmitting circuit connections which were previously established by the operation of certain of the 8PR and 9PR relays. The operated 8PR and 9PR are held locked operated in a circuit traceable over conductor 5L2, to ground at the normally closed lower make-before-break contacts of relay 5ASZ. Relay 5TSR which is normally operated, is operated at this time.

It will now be further assumed that the dispatcher wishes to prepare for a change in programs at switching center C to which is assigned the six unit code signal for No. 3 as its calling cue signal and that the connections desired between the locally connected stations and networks Nos. 1 to 4, may be had by the preset signals KB. The dispatcher transmits the calling cue signal for switching center C, the code signal for which is start, or space, mark, mark, space, space, space, space, and stop, or mark. In response to the start, or space, signal the dispatcher's teletypewriter control circuit extending from the dispatcher's officer is opened thereby releasing at each of the switching centers included in the teletypewriter control circuit a normally operated line-receive relay, for example, relay 2LR at switching center C. The operation of the line-receive relay at any one of the switching centers produces the same results as at each of the other centers. The results produced at switching center C will be described in detail in order to give an illustration. Relay 2LR in response to the start, or space impulse releases to its left-hand contact to close a circuit extending from ground, armature and contact of relay 2LR, conductor 201, back contact and armature No. 1 of relay 2Z, conductor 202, solid ring 301 and rest segment R of rotary distributor 3RD, conductors 303 and 304, through the winding of start or clutch magnet 3CL, to grounded battery and the start magnet momentarily operates to start the rotatable brush arm 305 rotating through its first revolution.

*First revolution of distributor brush arm upon receipt of calling cue signal for selecting desired switching center C*

As the outer brush on arm 305 moves off its segments R1 and R2, normally operated relay 3DN releases to open the normally closed connection at its armature No. 1 and to connect ground to each of its armatures Nos. 2, 3 and 4. The ground connected to armature No. 2 completes a circuit extending over conductor 319, normally closed make-before-break contacts of relay 2W, through the winding of relay 2W, resistor 214, to grounded battery 216, and relay 2W operates. Relay 2W locks operated in a path extending over its front contact and No. 3 armature, conductor 204, to ground at the back contact and No. 3 armature of relay 3DN.

When the rotating brush arm 305 engages the selecting segments Nos. 0, 1, 2, 3, 4 and 5, in turn, the puse relays respectively connected to these segments and corresponding in time to the space impulses of the incoming calling cue signal repeated by relay 2LR, operate. The second, third, fourth and fifth impulses of the calling signal for No. 3 are spacing, and therefore relays 3P2, 3P3, 3P4 and 3P5 operate and lock in their operated positions in a circuit traceable to ground at the No. 4 armature of relay 3DN.

When relay 3DN released, the ground connected to the back contact and armature No. 4 thereof causes all the locking relays, that is relays 3L0, 3L1, 3L2, 3L3, 3L4, 3L5 to operate simultaneously, but inasmuch as the operating winding of each is connected to the back contact and armature of its corresponding pulse relay, only those locking relays respectively corresponding to the unoperated pusle relays remain operated. For example, since relay 3P–0 and 3P–1 are unoperated, relays 3L–0 and 3L–1 only, remain operated and relays 3L–2, 3L–3, 3L–4 and 3L–5 release. Therefore, at the end of the first revolution of rotatable brush 305, relays 3P–2 to 3P–5 and relays 3L–0 and 3L–1 are operated. When brush arm 305 returns to its normal, or rest, position relay 3DN reoperates. Relay 3DN, upon reoperating, closes the normally closed connection at its armature No. 1 and removes ground at its Nos. 2, 3 and 4 armatures but the operated pulse and locking relays do not release at this time because they are held operated in a circuit hereinafter described. When relay 3DN reoperates the ground connected to its No. 3 armature and front contact was removed from the locking circuit of relay 2W, but a substitute ground is furnished in the circuit now extending over conductor 320, back contact and armature No. 1 of each of relays 3L–5, 3L–4, 3L–3 and 3L–2, front contact and armature No. 1 of relay 3L–1, front contact and armature No. 1 of relay 3L–0, conductors 318 and 322, armature No. 4 and front contact of relay 2W, to ground. The ground at armature No. 4 and front contact of relay 2W serves to maintain locked operated at this time the desired pulse and locking relays, the circuit extending from the grounded battery connected to each of the windings of such relays, contacts and armatures of the pulse relays 3P, conductors 318 and 322, to the No. 4 armature of relay 2W. Also, when relay 3DN reoperated and ground was removed at its No. 2 armature from a closed circuit path extending from grounded battery 252, over the back contact and armature No. 8 of relay 2Z, conductor 319, and since this path formerly served to shunt the winding of relay 2Z, the latter relay is now allowed to operate in a circuit extending over conductor 206, front contact and armature No. 3 of relay 2W, conductors 204 and 320, and the remaining part of the substitute locking circuit for relay 2W. It will be noted at this time that the path extending over the left-hand armatures of relays 3L–0 to 3L–5 at switch center C only is entirely closed. The corresponding path closed by the locking 3L relays at each of the other switching centers does not close entirely in response to the calling cue signal for No. 3. Relay 2Z upon operating, (1) disconnects at its back contact and No. 1 armature the contact of relay 2LR and substitutes therefor the winding of line-send relay 2LS, and (2) closes at its No. 4 armature and front contact a circuit extending from ground, over conductors 207, 208 and 209, armature and back contact of master cue relay 2MC, conductors 236 and 501, armature and back contact of check relay 5CK–1, conductors 502 and 503, back contact and armature No. 1 of relay 5–UL, conductor 504, through the winding of start relay 5–STT, to grounded battery and relay 5–STT operates.

When permutation link circuit No. 1 is available, that is, capable of responding to the next signals incoming at switching center C, certain PR relays of each of the two groups contained in permutation link circuit No. 1 are still held locked operated since the previous change in programs. Relay 5ASW is locked operated to ground at armature No. 4 and back contact of relay 2RLS. An understanding of the operation of relays 5ASW and 5ASZ may be had from a description hereinafter given under a caption "Preparing connections in permutation link circuit No. 2 for program reception."

The normally operated relay 5TSR is at this time operated. Relay 5STT upon operating, closes at its No. 1 armature and front contact a circuit extending from ground, conductor 505, back contact and armature No. 11 of relay 4C6B, conductor 402, armature No. 7 and back contact of relay 4C7A, conductor 403, back contact and No. 2 armature of relay 5CCK, conductor 506, upper normally closed make-before-break contacts of relay 5CCX, conductor 507, normally closed make-before-break contacts and through the winding of relay 5CCW, to grounded battery and relay 5CCW operates. The circuit just traced also extends in a path traceable over armature No. 3 and back contact of relay 5CCZ, resistor 549, to grounded battery 550 and this parallel path serves to shunt the winding of relay 5CCZ which at this time is prevented from operating. Relay 5CCW, upon operating, closes at its No. 1 armature and front contact a second but different operating circuit for start magnet 3CL, the second circuit extending from ground at the No. 1 armature and front contact of relay 5CCW, conductors 508 and 509, back contact and No. 5 armature of relay 5CCZ, conductor 510, front contact and armature No. 1 of relay 3DN, conductor 323, armature No. 6 and front contact of relay 2W, conductor 210, armature No. 7 and front contact of relay 2A, conductor 211, armature No. 1 and back contact of relay 2Z-2, conductor 304, through the winding of start magnet 3CL, to grounded battery, and start magnet 3CL momentarily operates for the second time to start the distributor brush arm 305 on its second revolution to transmit over the teletypewriter control circuit a verification signal which is identical with the calling signal for No. 3 assigned to switching center C as will hereinafter be described. When brush arm 305 starts to rotate at this time it opens at rest segments R1 and R2 the operating circuit for relay 3DN which releases for the second time.

Figure 6:
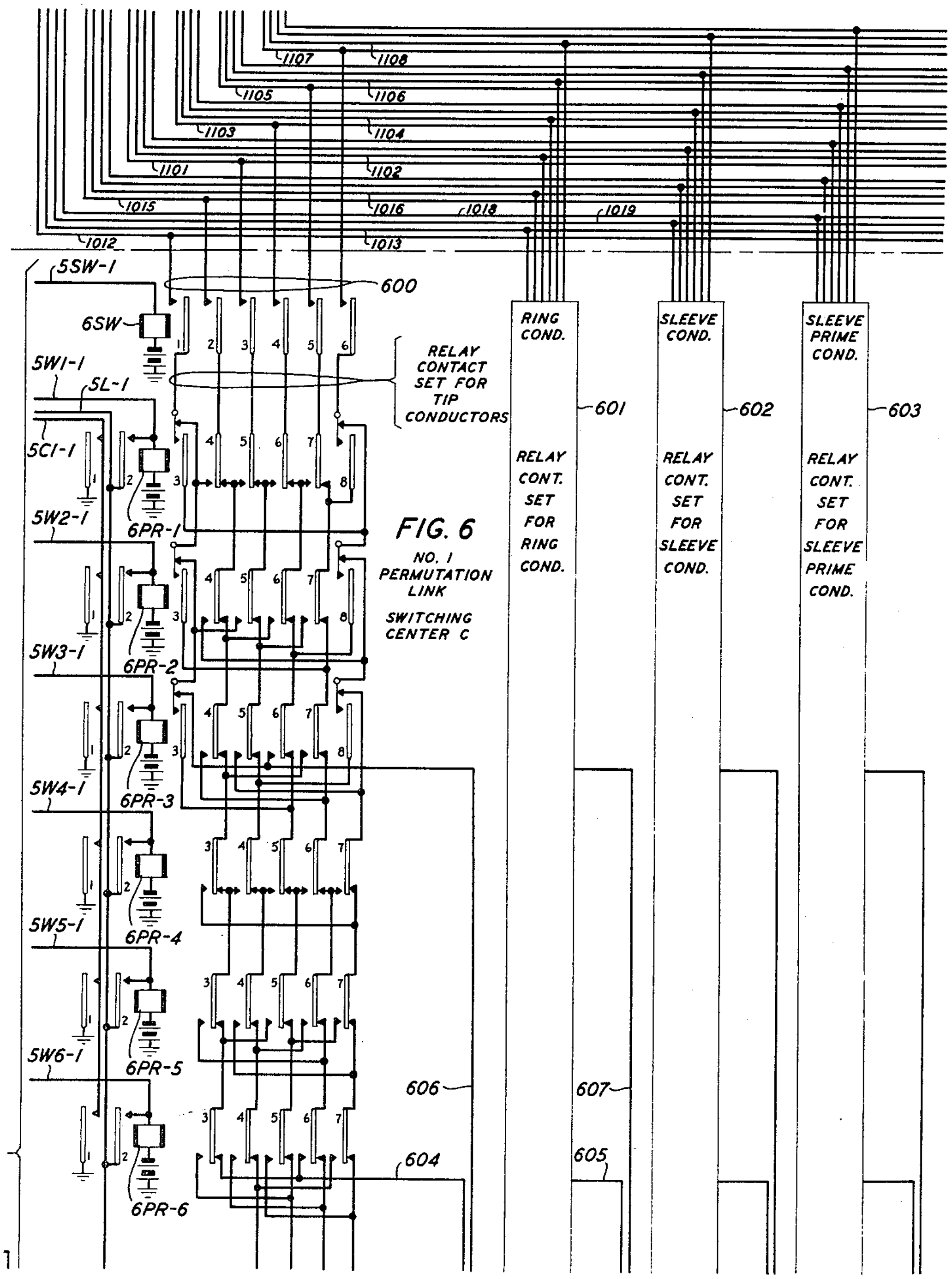
Figure 7:
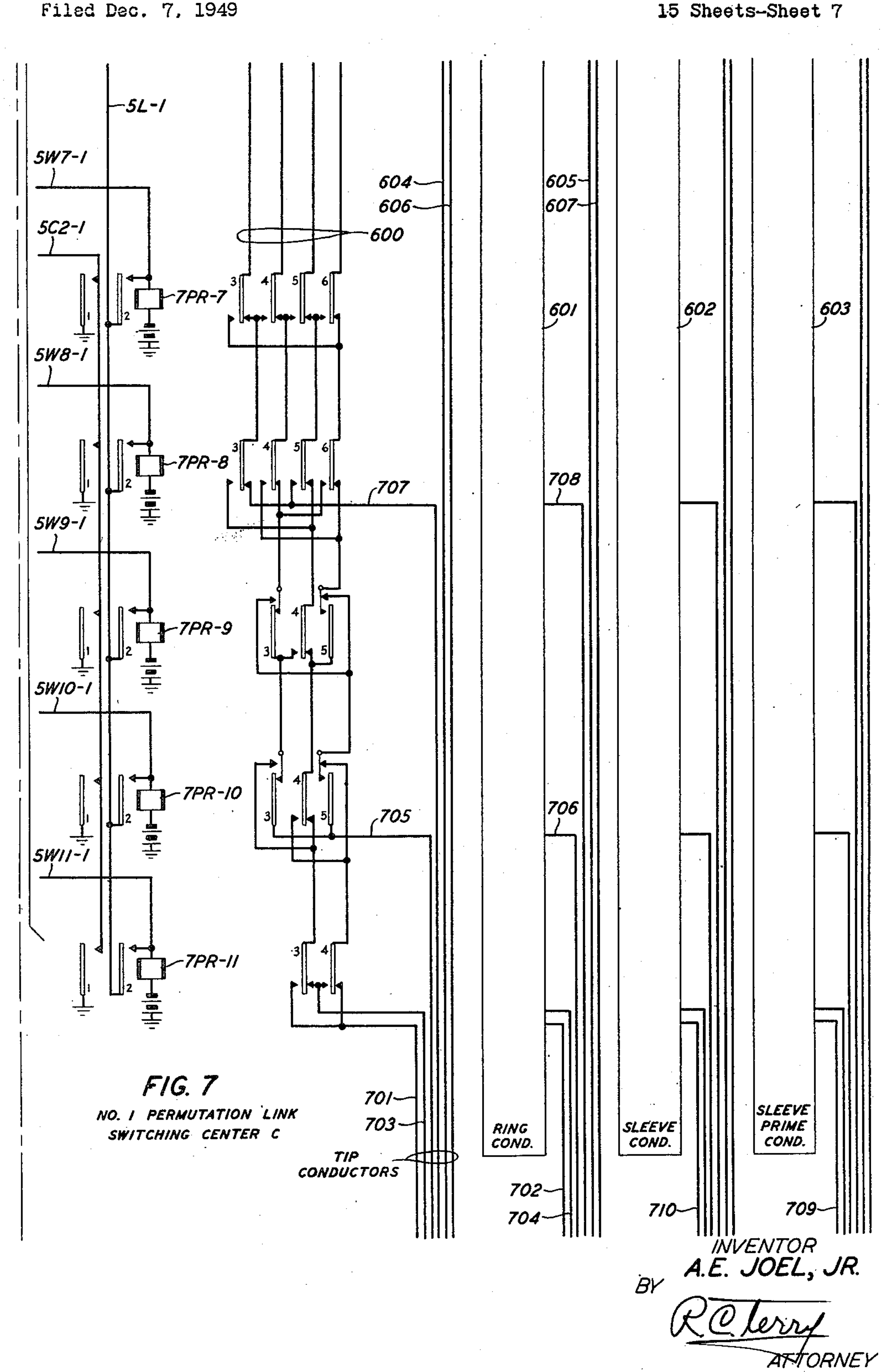

Also when the operating circuit for relay 5STT was closed, a path parallel therewith extended over armature No. 7 and back contact of relay 5ASZ, conductor 521, armature No. 1 and back contact of relay 5CI-2, through the winding of relay 5CI-1, to grounded battery and relay 5CI-1 operates to prepare a gateway to the idle permutation link circuit No. 1 available at this time and shown in Figs. 6-7. Also relay 5STT upon operating, closes at its No. 3 armature and front contact a locking circuit for itself to conductor 236 and prepares at its No. 2 armature an operating circuit for relay 5ASW which is already locked operated from a previous change in program, as hereinbefore described. The locking ground is furnished at the back contact and armature No. 4 of release relay 2RLS.

*Second revolution of distributor brush arm to automatically transmit to the dispatcher the first verification signal*

During the second revolution of brush arm 305 when relay 3DN is released and verification signal is transmitted to the dispatcher's office, as hereinbefore stated, the code combination set up by the pulse relays 3P whereof relays 3P-0 and 3P-1 are in unoperated positions and relays 3P-2 to 3P-5 inclusive, are in operated positions, the operated positions of relays 3P-2 to 3P-5 are effective to transmit current each time the inner brush on brush arm 305 engages one of the selecting segments Nos. 2, 3, 4 and 5 of ring 302 in a circuit traceable from ground at armature No. 4 and back contact of relay 3DN, to conductor 202, then over armature No. 1 and front contact of relay 2Z which at this time is in an operated position, conductor 213, through the winding of line-send relay 2LS, to grounded negative battery. Therefore the inner brush on brush arm 305, upon passing over the segments of ring 302 transmits to the dispatcher's office the verification signal consisting of start, or space, mark, mark, space, space, space, space and stop, or mark, to represent the signal for No. 3, each of the operated relays 3P-2, 3P-3, 3P-4 and 3P-5 causing to be transmitted to the dispatcher's office by means of line-send relay 2LS a spacing impulse.

The teletypewriter at the dispatcher's office, upon receiving this No. 3 signal, records it as a verification of the satisfactory performance of the calling cue signal at switching center C.

When relay 3DN released for the second time as hereinbefore described, it provided at its No. 2 armature and back contact a ground for shunting relay 2W, and relay 2W releases, the shunting circuit being traceable from grounded negative battery 216, resistor 215, conductor 214, front contact and armature No. 8 of relay 2Z, conductor 319, back contact and No. 2 armature of relay 3DN, to ground. At this time, when relay 2W releases, relay 2Z is held operated by ground on armature No. 2 of relay 3DN, the holding circuit for relay 2Z being traceable from grounded negative battery, through the winding of relay 2Z, conductor 206, normally closed make-before-break contacts of relay 2W, conductor 319, to ground at the No. 2 armature and back contact of relay 3DN. The operated relays 3L-0 and 3L-1 as well as the operated relays 3P-2, 3P-3, 3P-4 and 3P-5 are held operated by the circuit traceable over conductor 318, to ground at the No. 4 armature and back contact of relay 3DN, it being noted that the operated relays 3L-0 and 3L-1 correspond to the marking impulses of the signal for No. 3 and the operated relays 3P-2, 3P-3, 3P-4 and 3P-5 correspond to the spacing impulses.

When relay 2W releases a circuit is closed from grounded battery 226, resistor 227, through the winding and over the normally closed make-before-break contacts of relay 2W-1, conductor 217, armature No. 2 and back contact of relay 2W, conductor 218, armature No. 6 and front contact of relay 2Z, to ground and relay 2W-1 operates and then locks, the locking circuit being traceable over its No. 3 armature and front contact of relay 2W-1, conductors 249 and 250, back contact and armature No. 3 of release relay 2RLS, to ground. At the completion of the second revolution, the outer brush of arm 305 reengages the rest segments R1 and R2 to close the operating circuit for relay 3DN and relay 3DN becomes operated for the third time. When relay 3DN reoperates, ground is removed from its No. 2 armature to open the operating circuit of relay 2Z and relay 2Z releases. When relay 2Z releases, it removes ground (1) at its No. 4 armature and front contact but a substitute ground is now had at the front contact and armature No. 5 of operated relay 2W-1 to maintain closed the operating and locking circuits for relays 5STT and 5CI–1 and (2) at its No. 10 armature and front contact to open the holding circuit of the operated 3P and 3L relays and relays 3P–2, 3P–3, 3P–4, 3P–5, 3L–0 and 3L–1 release. Also when relay 2Z releases, it opens at its No. 6 armature and front contact a shunting path for relay 2Z–1 and relay 2Z–1 operates, the shunting path being traceable from ground at armature No. 6 and front contact of relay 2Z, conductor 218, back contact and No. 2 armature of relay 2W, conductors 217 and 219, No. 2 armature and back contact of relay 2Z–1, to grounded battery 220.

Figures 1, 16, 17:
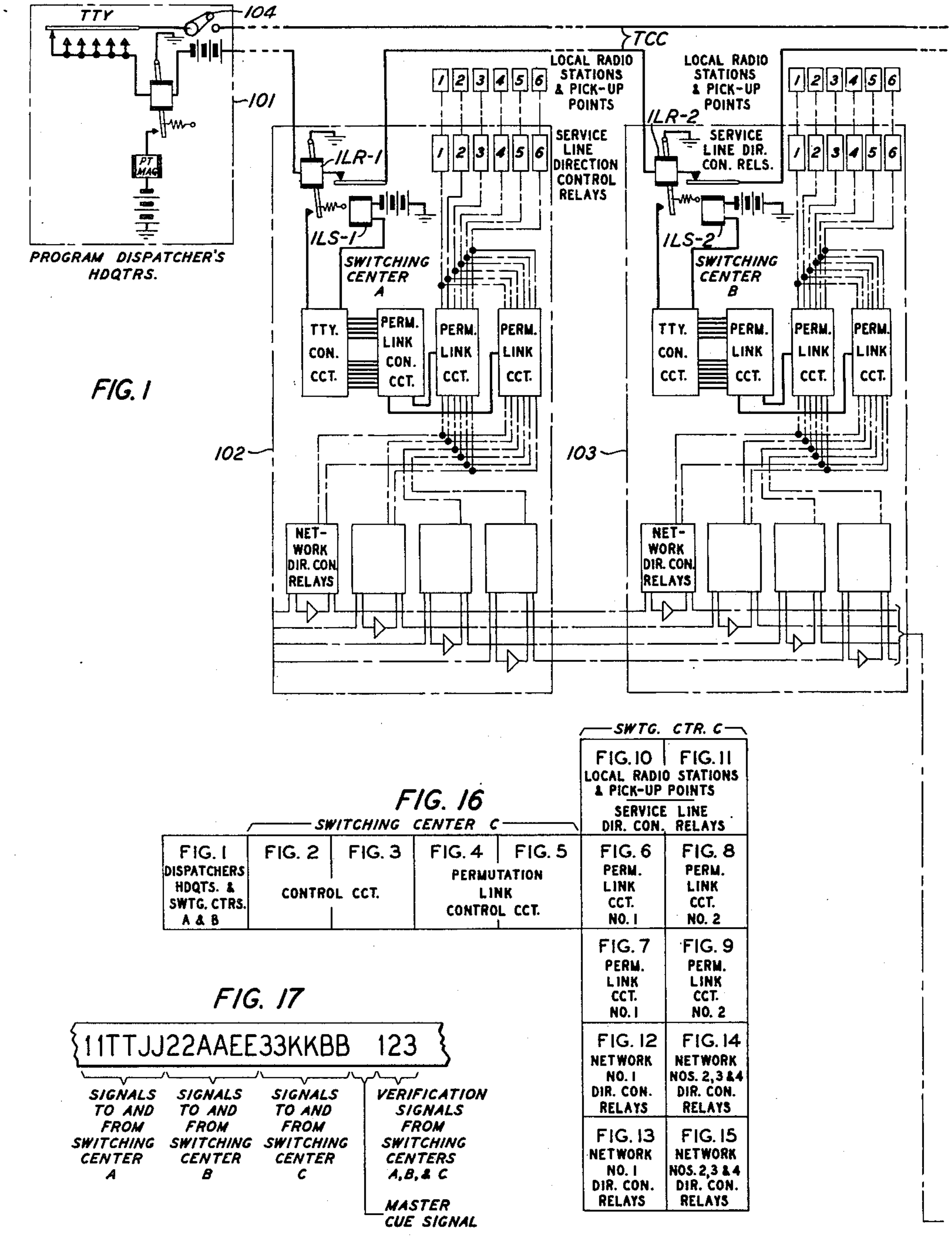
Figure 2:
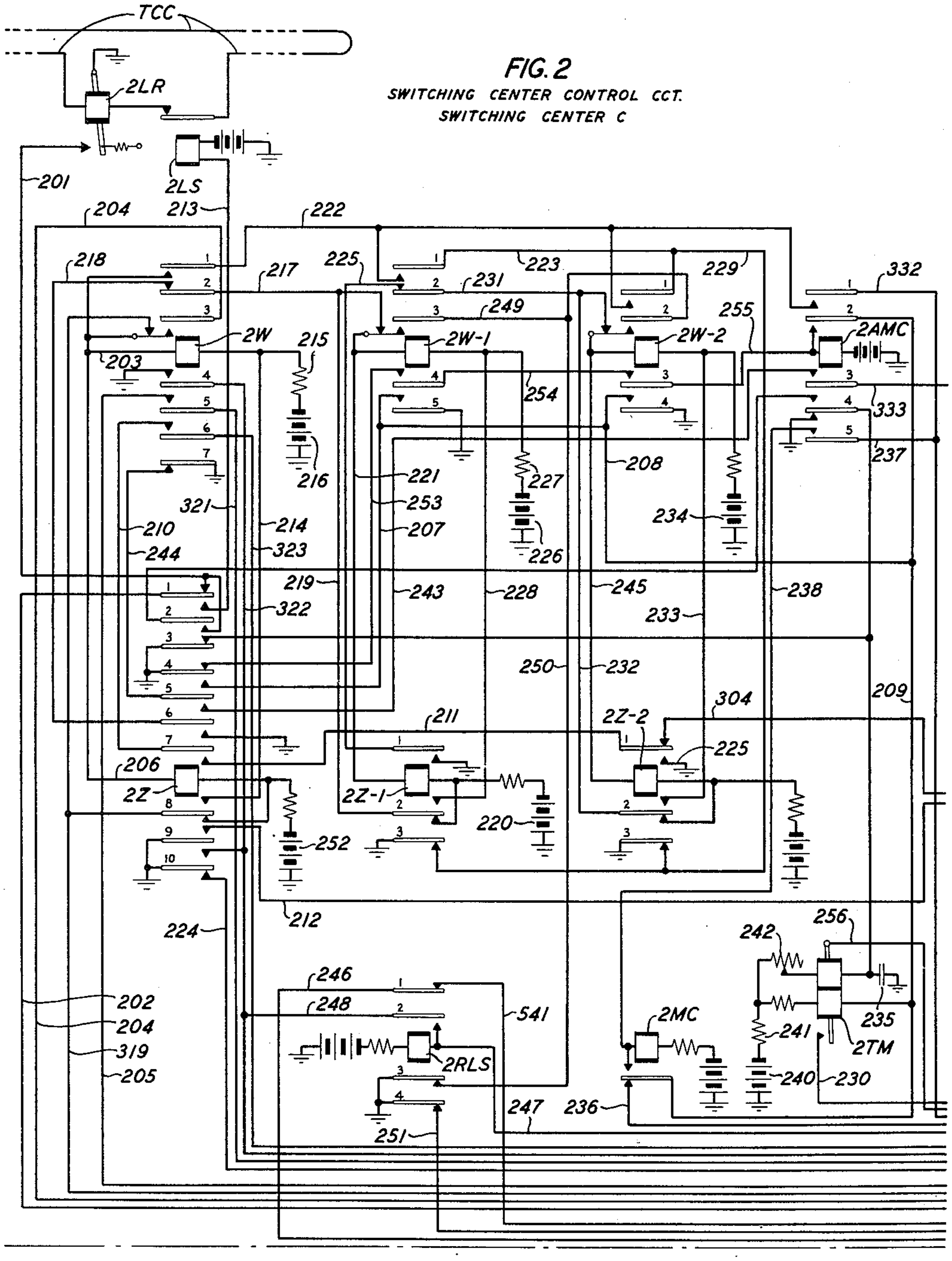
Figure 3:
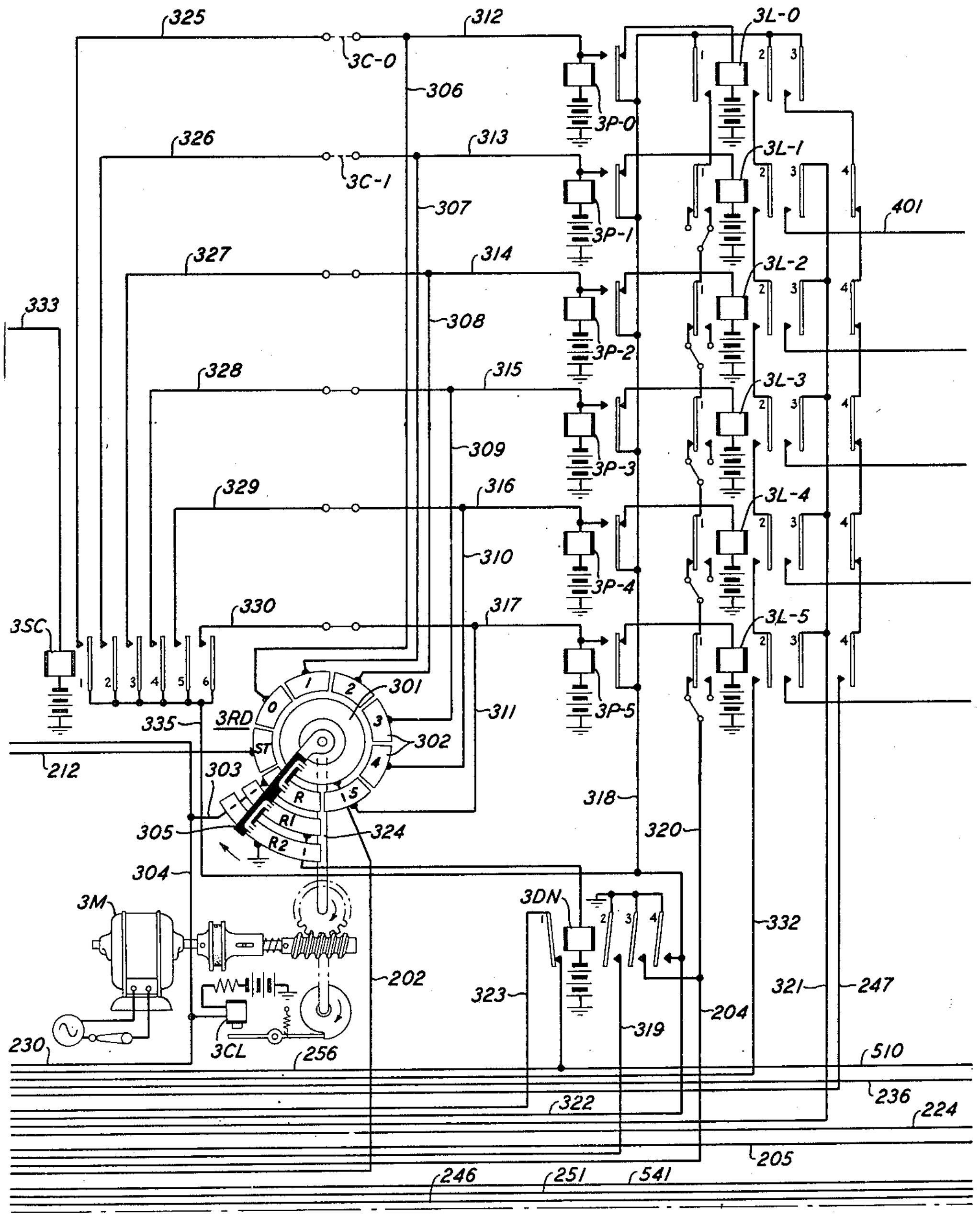
Figure 4:
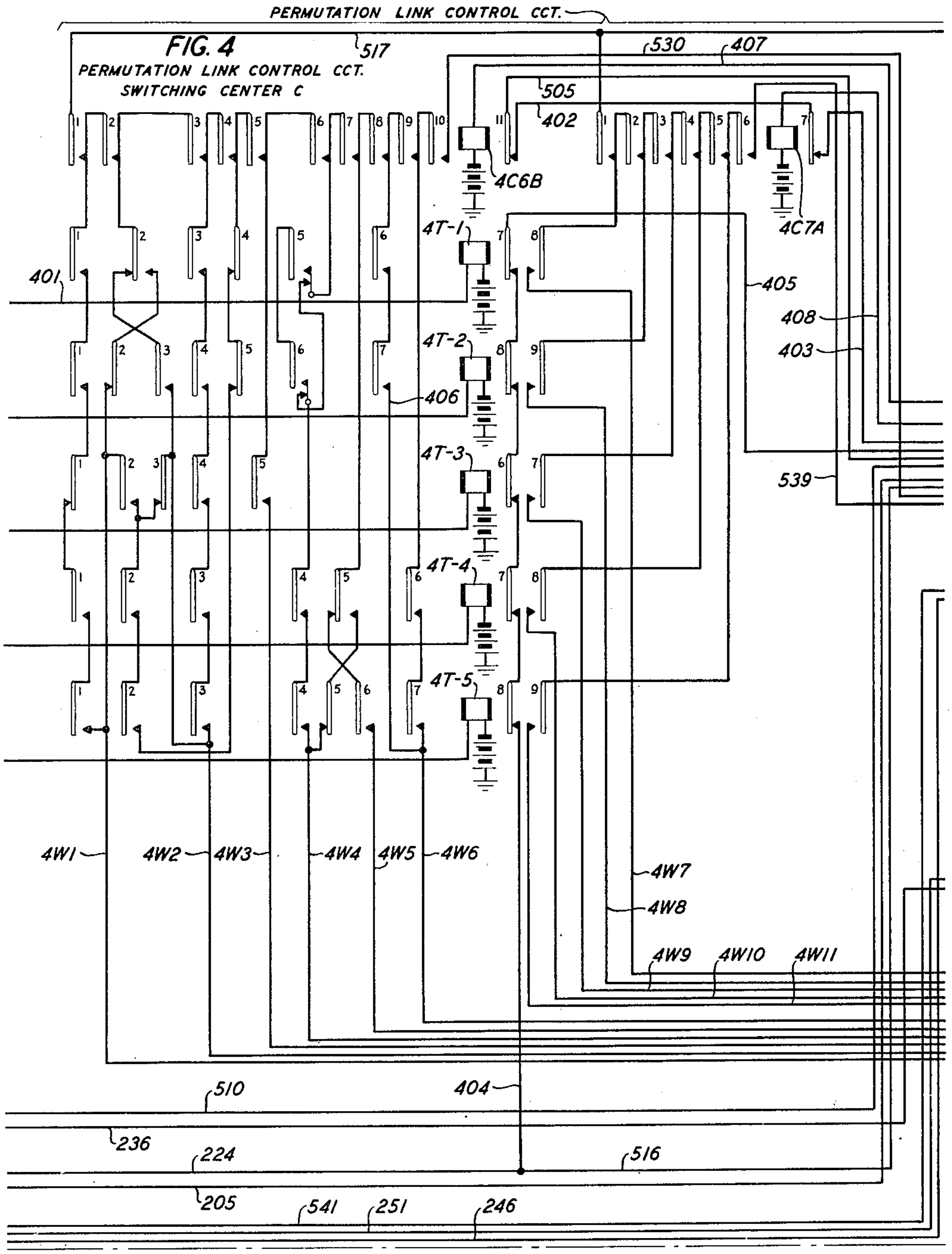
Figure 5:
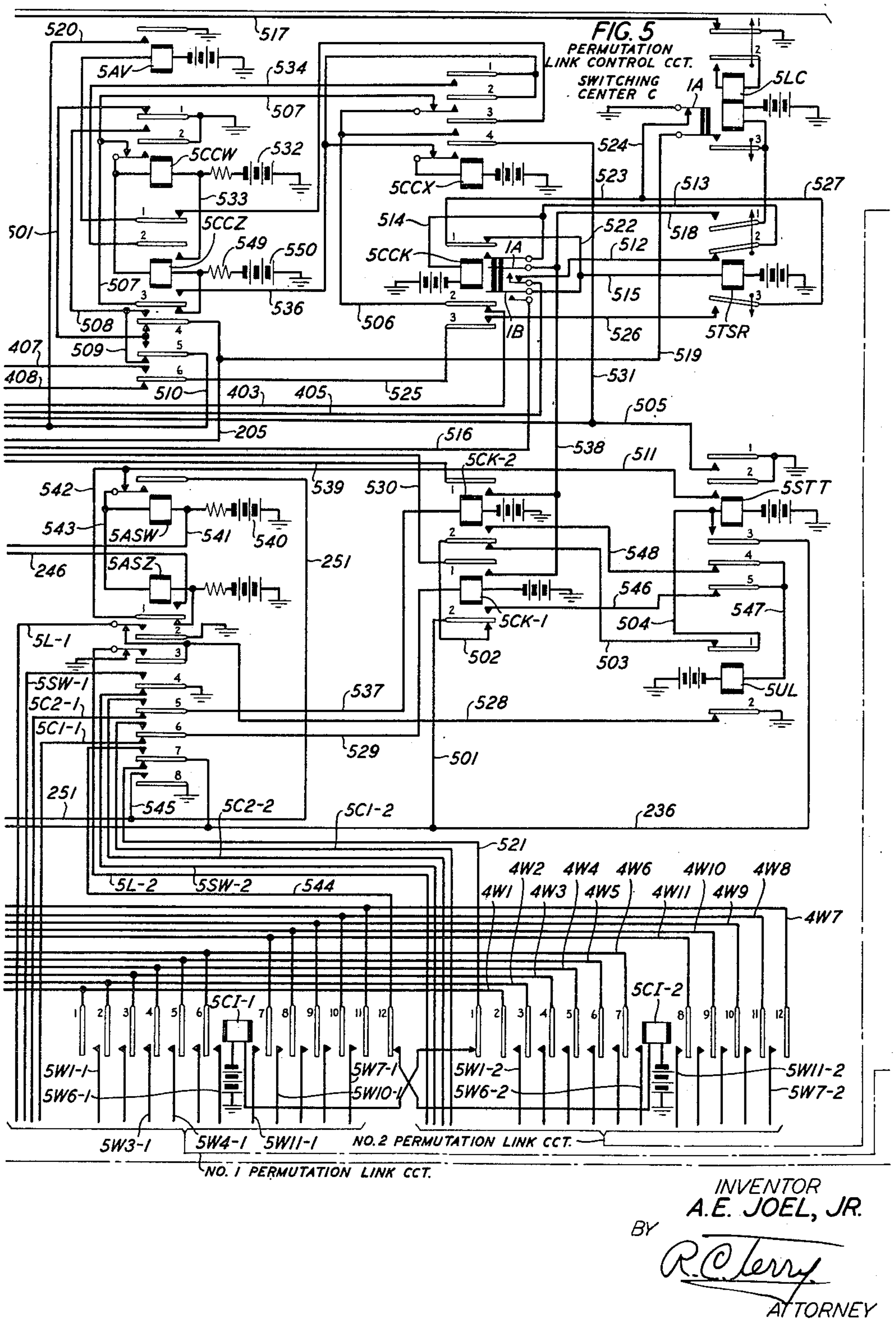

Relay 2Z–1 operates in the locking circuit for relay 2W–1, which is traceable over the No. 3 armature and front contact of relay 2W–1, conductors 249 and 250, back contact and armature No. 3 of relay 2RLS, to ground. Also, when relay 2Z released, it closed at its No. 10 armature and back contact an operating circuit for relay 5CCK, the circuit being traceable from grounded battery, through the winding of relay 5CCK, conductors 514 and 513, No. 2 armature and front contact of normally operated relay 5TSR, normally closed make-before-break contact 1A of relay 5CCK, conductor 405, No. 7 armature and contact of relay 4T–1, No. 8 armature and contact of relay 4T–2, No. 6 armature and contact of relay 4T–3, No. 7 armature and contact of relay 4T–4, No. 8 armature and contact of relay 4T–5, conductors 404 and 224, back contact and armature No. 10 of relay 2Z, to ground. Relay 5CCK operates. Relay 5TSR is normally held operated to a circuit traceable from grounded battery, through the winding of relay 5TSR, conductor 515, back contact and armature No. 1 of relay 5CCK, auxiliary contact 1A of relay 5LC, to ground. Relay 5CCK, upon operating, locks in a circuit traceable over its front contact and armature No. 1, conductors 523 and 524 to ground at the auxiliary contact 1A of relay 5LC and normally operated relay 5TSR is now held operated in a circuit traceable over conductor 515, auxiliary contact 1B of relay 5CCK, conductors 516 and 224, to ground at the back contact and armature No. 10 of relay 2Z. Also, relay 5CCK, upon operating, opens at its No. 2 armature and back contact, the shunting path around the winding of relay 5CCZ and relay 5CCZ operates in the locking circuit for relay 5CCW. The shunting path around the winding of relay 5CCZ before being opened was traceable from grounded battery, back contact and armature No. 3 of relay 5CCZ, conductor 507, upper normally closed make-before-break contacts of relay 5CCX, conductor 506, No. 2 armature and back contact of relay 5CCK, conductor 403, back contact and armature No. 7 of relay 4C7A, conductor 402, back contact and armature No. 11 of relay 4C6B, conductor 505 to ground at the front contact and armature No. 1 of relay 5STT, relay 5STT being held operated after 2Z releases by a circuit hereinbefore traced over conductor 236, back contact and armature of relay 2MC, conductors 209 and 208, to ground at the front contact and armature No. 5 of relay 2W–1. The switching center control circuit shown in Figs. 2 and 3 and the permutation link control circuit shown in Figs. 4 and 5 are now ready to receive from the dispatcher the first preset signal.

The relays in operated condition in the switching center control and permutation link control circuits at switching center C at this time are: 5TSR, 5ASW, 3DN, 5STT, 5CI–1, 5CCW, 2W–1, 2Z–1, 5CCK and 5CCZ.

*Third revolution of the distributor brush arm upon receipt of the first preset signal from the dispatcher*

The dispatcher, upon wishing to establish at switching center C desired connections between the six stations locally connected thereto and the four networks, transmits a code combination signal for letter K which is the first of the two preset signals for the two letters KB which herein represent the signals necessary to prepare the connections desired for the six stations at the next change of programs. The signal combination for the letter K consists of start, or space, space, mark, mark, mark, mark, space and stop, or mark. In response to the start, or space, impulse received by the line receive relay of each of the switching centers operates such relays to their respective left-hand positions. The functions of the LR relay at switching center C only will be described inasmuch as the operation of the LR relays at the other switching centers in response to the first preset signal has no effect on the permutation link control circuit at such other switching centers. In response to the first impulse of the signal for letter K relay 2LR releases to its left-hand position and closes an operating circuit for start magnet 3CL, which circuit is the same as hereinbefore described when the switching center calling cue signal for No. 3 was received by relay 2LR. Magnet 3CL, upon operating momentarily for the third time, permits brush arm 305 to begin rotating and as the outer brush on brush arm 305 moves off rest segments R1 and R2, relay 3DN releases. Relay 3DN, upon releasing a third time, connects ground at its No. 2 armature and back contact to conductor 319 for again operating relay 2W. Relay 2W, upon operating, for the second time, now locks in a circuit traceable over its No. 1 armature and front contact, conductor 222, front contact and No. 1 armature of relay 2W–1, conductor 223, conductor 229, to ground at the back contact and No. 3 armature of relay 2Z–2. As brush arm 305 rotates over selecting segments 0, 1, 2, 3, 4 and 5 in timed relation with the impulses of the incoming signal received by relay 2LR, relays 3P–0 and 3P–5 operate in response to the zero and No. 5 selecting impulses of the K signal, both impulses of which are spacing. Relays 3P–0 and 3P–5 upon operating, lock to ground on armature No. 4 of relay 3DN, now released. Accordingly, relays 3L–1, 3L–2, 3L–3 and 3L–4 operate because of the unoperated condition of their corresponding 3P relays and also lock to ground on armature No. 4 of relay 3DN. It will be noted that in response to the first preset signal, no effective path is closed at the left-hand armatures of the 3L relays because in response to the preset signals, relay 3L–0 is always unoperated inasmuch as the zero selecting impulse of a preset signal is always spacing.

At this time when relay 2W is operated and relay 3DN is released, the operated relays 3L–1, 3L–2, 3L–3, and 3L–4 close respective operating paths for translating relays 4T–1, 4T–2, 4T–3 and 4T–4 which now operate in parallel paths traceable from grounded battery connected to the winding of each of the translating relays, the No. 3 armature and front contact of each of relays 3L–1, 3L–2, 3L–3 and 3L–4, to a common circuit extending over conductor 321, armature No. 5 and front contact of relay 2W, conductor 205, armature No. 4 and front contact of relay 5CCZ, conductor 508, front contact and armature No. 1 of relay 5CCW, to ground. Translating relays 4T–1, 4T–2, 4T–3 and 4T–4, upon operating, prepare the first stage of the desired connections between the six locally connected broadcasting stations and the four networks.

At the end of the third revolution of brush arm 305 the outer brush thereon reengages rest segments R1 and R2 to close the operating circuit for relay 3DN and relay 3DN reoperates (operates for the fourth time) to remove ground at its No. 2 armature and back contact from the shunting path around the winding of relay 2Z and relay 2Z operates a second time, the shunting path before being opened being traceable from grounded battery 252, back contact and armature No. 8 of relay 2Z, conductor 319, to the back contact and armature No. 2 of relay 3DN. The operating circuit for relay 2Z is traceable over conductor 206, front contact and armature No. 1 of relay 2W, conductor 222, front contact and armature No. 1 of relay 2W–1, grounded conductors 223 and 229, to ground at the back contact and armature No. 3 of relay 2Z–2. Relay 2W remains locked operated at this time over its No. 1 armature and front contact, to grounded conductors 223 and 229, to the back contact and No. 3 armature of relay 2Z–2 inasmuch as its shunt path which extends over armature No. 8 and front contact of relay 2Z is opened at this time at armature No. 2 of relay 3DN which has reoperated. Relay 3DN, upon becoming operated for the fourth time, removes at its No. 4 armature the ground for locking relays 3P–0 and 3P–5 and relays 3L–1, 3L–2, 3L–3 and 3L–4 but a substitute ground is now furnished at the front contact and armature No. 10 of relay 2Z whereby the operated 3P and 3L relays are maintained locked until the verification signal corresponding to letter K is transmitted back to the dispatcher's office.

Relay 2Z, upon operating, removes ground at its No. 10 armature and back contact from the holding circuit for relay 5TSR and the normally operated relay 5TSR releases for the first time. Relay 5TSR, upon releasing, closes at its No. 3 armature and back contact an operating circuit for relay 4C6B the circuit being traceable from grounded battery, through the winding of relay 4C6B, conductor 407, front contact and armature No. 6 of relay 5CCZ, conductor 525, armature No. 3 of front contact of relay 5CCK, conductor 526, back contact and armature No. 3 of relay 5TSR, conductors 527 and 524, auxiliary contact 1A of relay 5LC, to ground. Relay 4C6B operates and closes armatures Nos. 1 to 10 to their respectively associated front contacts and opens at its No. 11 armature and back contact the original operating circuit for relay 5CCW, which at this time remains locked-operated. Relay 4C6B, upon closing its armatures Nos. 1 to 10 to their respective front contacts, close in conjunction with armatures Nos. 1 to 6 of translating relay 4T–1, armatures Nos. 1 to 7 of relay 4T–2, armatures Nos. 1 to 5 of relay 4T–3 and armatures Nos. 1 to 6 of relay 4T–4, operating circuits for three PR relays of the first group of the idle, or available, permutation link circuit which at this time is circuit No. 1, the PR relays being 6PR3, 6PR4 and 6PR6. Relays 6PR3, 6PR4 and 6PR6 operate. The operating circuit for these three 6PR relays are traceable from ground at armature No. 1 and back contact of relay 5LC, conductor 517 and then over separate parallel paths, (1) the path for operating relay 6PR3 being traceable over conductor 517, armatures Nos. 1, 2, 3, 4, 5, in series, of relay 4C6B, armature No. 5 and contact of relay 4T–3, conductor 4W3, armature No. 3 and contact of relay 5CI–1, conductor 5W3–1, through the winding of relay 6PR3, to grounded battery, (2) the path for operating relay 6PR4 being traceable from conductor 517, over armatures Nos. 1 to 7, in series, of relay 4C6B, No. 5 armature and front contact of relay 4T–4, No. 5 armature and contact of relay 4T–5, conductor 4W4, No. 4 armature and contact of relay 5CI–1, conductor 5W4–1, through the winding of relay 6PR4 to ground at battery, and (3) the path for operating relay 6PR6 being traceable from conductor 517 through the armatures Nos. 1 to 8, in series, armature No. 6 and contact of relay 4T–1, armature No. 7 and contact of relay 4T–2, conductors 406 and 4W6, armature No. 6 and contact of relay 5CI–1, conductor 5W6–1, through the winding of relay 6PR6, to grounded battery. Relays 6PR3, 6PR4 and 6PR6 operate and lock.

If no 4T relays are operated then no 6PR relays are operated whereby relay 5CK–1 will not operate, and under these conditions, when relay 2Z is subsequently released a circuit is closed for operating relay 2LC, the circuit being traceable from ground on No. 10 armature and back contact of relay 2Z, conductors 224 and 404, back contact and inner right-hand armature of each of the 4T relays in released positions, conductor 405, auxiliary contacts No. 1A of relay 5CCK in its operated position, back contact and armature No. 1 of normally operated relay 5TSR, now in its released position, through the lower winding of relay 5LC, to grounded battery.

Relays 6PR3, 6PR4 and 6PR6 upon operating in response to the signal for letter K, (1) close for themselves at their respective No. 2 armatures, a common locking circuit, the locking circuit being traceable over the No. 2 armature and front contact of each of relays 6PR3, 6PR4 and 6PR6, conductor 5L–1, normally closed upper make-before-break contacts of relay 5ASZ, conductor 528, back contact and armature No. 2 of unlock relay 5UL, to ground, and (2) close at their respective No. 1 armatures an operating circuit for relay 5CK–1, the circuit being traceable from ground, No. 1 armature and front contact of each of relays 6PR6, 6PR4 and 6PR3, conductor 5C1–1, back contact and armature No. 6 of relay 5ASZ, conductor 529, through the winding of relay 5CK–1, to grounded battery and relay 5CK–1 operates. Relay 5CK–1, upon operating, closes at its No. 1 armature and front contact, a circuit traceable from grounded battery, through the lower winding of 5LC, armature No. 1 and back contact of relay 5TSR, conductors 518 and 528, front contact and armature No. 1 of relay 5CK–1, conductor 530, contacts and their respective armatures Nos. 10, 9, 8, 7, 6, 5, 4, 3, 2, 1, in series, of relay 46CB, conductor 517, back contact and armature No. 1 of relay 5LC, to ground and relay 5LC operates. Relay 5LC upon operating, locks in a circuit traceable over its No. 3 armature and front contact conductor 519, armature No. 4 and front contact of relay 5CCZ, conductor 508, front contact and armature No. 1 of relay 5CCW, to ground. Relay 5LC is made slow-to-release by closing a circuit extending through its upper winding and armature No. 2 and front contact as shown in the drawing. Relay 5LC upon operating, (1) opens at its auxiliary contact 1A the locking circuit for relay 5CCK which now releases, and opens at its No. 3 armature and front contact the operating circuit for relay 4C6B which also releases, and (2) opens at its No. 1 armature and back the original operating paths for relays 6PR3, 6PR4 and 6PR6 but relays 6PR3, 6PR4 and 6PR6 are locked operated over conductor 5L-1. Relay 5CCK, upon releasing, closes at its No. 2 armature and back contact a circuit for operating relay 5CCX, the circuit being traceable from grounded battery, through the winding of relay 5CCX, lower normally closed make-before-break contacts of relay 5CCX, conductor 536, front contact and armature No. 3 of relay 5CCZ, conductor 507, upper normally closed make-before-break contact of relay 5CCX, conductor 506, No. 2 armature and back contact of relay 5CCK, conductor 403, back contact and armature No. 7 of relay 4C7A, conductor 402, back contact and armature No. 11 of relay 4C6B, conductor 505, front contact and armature No. 1 of relay 5STT, to ground. Relay 5CCX operates and then locks in a circuit traceable over its front contact and No. 4 armature, conductors 531 and 505, front contact and armature No. 1 of relay 5STT, to ground. Relay 5CCX upon operating, closes at its Nos. 1 and 2 armatures and their respective front contacts a circuit traceable from grounded battery 532, conductor 533, front contact and armature No. 2 of relay 5CCZ, conductor 534, front contact closed to its No. 1 armature on relay 5CCZ and armature No. 2 closed to its front contact also of relay 5CCX, conductor 506, armature No. 2 and back contact of relay 5CCK, conductor 403, back contact and armature No. 7 of relay 4C7A, conductor 402, back contact and armature No. 11 of relay 4C6B, conductor 505, front contact and armature No. 1 of relay 5STT, to ground and this circuit when closed shunts the winding of relay 5CCW which now releases. Relay 5CCW upon releasing, opens at its No. 2 armature and front contact the original operating circuit for relay 5CCZ but relay 5CCZ remains operated in a circuit traceable over the normally closed make-before-break contacts of relay 5CCW, conductor 507, No. 3 armature and front contact of relay 5CCZ, conductor 536, armature No. 2 and front contact of relay 5CCX, conductor 506, armature No. 2 and back contact of relay 5CCK, conductor 403, back contact and armature No. 7 of relay 4C7A, conductor 402, back contact and armature No. 11 of relay 4C6B, conductor 505, front contact and armature No. 1 of relay 5STT, to ground. Also relay 5CCW upon releasing, closes at its No. 1 armature and back contact another operating circuit for start magnet 3CL which now operates a fourth time. The circuit for operating magnet 3CL the fourth time is different from the circuits previously serving to operate magnet 3CL and is the third different circuit of its kind, it being traceable from grounded armature No. 1 and back contact of relay 5CCW, conductor 501, front contact and armature No. 5 of relay 5CCZ, conductor 510, front contact and armature No. 1 of relay 3DN, conductor 323, armature No. 6 and front contact of relay 2W, conductor 210, armature No. 7 and front contact of relay 2Z, conductor 211, No. 1 armature and back contact of relay 2Z-2, conductor 304, through the winding of the start magget 3CL, to grounded battery and the start magnet 3CL momentarily operates for the fourth time. The release of relay 5CCW opens the locking circuit for relay 5LC which now releases. Furthermore, when relay 5CCW releases, relay 5LC releases because its locking circuit is opened at armature No. 1 and front contact of relay 5CCW, the locking circuit before being opened, being traceable over the No. 3 armature and front contact of relay 5LC, conductor 519, armature No. 4 and front contact of relay 5CCZ, conductor 508, front contact and armature No. 1 of relay 5CCW, to ground. Relay 5LC, upon releasing, closes at its auxiliary contact 1A the original operating circuit for normally operated relay 5TSR which becomes operated a second time, the circuit being traceable from ground, auxiliary contacts 1A of relay 5LC, conductors 524 and 523, armature No. 1 and back contact of relay 5CCK, conductors 522 and 515, through the winding of relay 5TSR, to grounded battery. Relay 5TSR upon becoming operated the second time, maintains open at its No. 1 armature and back contact the original operating circuit for relay 5LC which has previously been released.

*Fourth revolution of the distributor brush arm to automatically transmit to the dispatcher the second verification signal*

When start magnet 3CL operates for the fourth time, brush arm 305 begins its fourth revolution and as the outer brush on arm 305 moves off rest segments R1 and R2, relay 3DN releases for the third time and connects at its No. 2 armature and back contact a ground connection to a shunt path extending over conductor 319, armature No. 8 and front contact of relay 2Z, conductor 214, resistor 215 and grounded battery 216 whereby the winding of relay 2W is shunted and therefore releases for the second time. When relay 2W releases the second time, it opens at its No. 5 armature and front contact the operating circuit for the operated translating relays 4T-1, 4T-2, 4T-3 and 4T-4 which release. Relay 2Z is maintained operated by the ground connection on the No. 2 armature of relay 3DN, the circuit being traceable over conductor 319, normally closed make-before-break contacts of relay 2W, conductor 206, through the winding of relay 2Z, to grounded battery. The operated 3P and 3L relays such as relays 3P-0, 3P-5, 3L-1, 3L-2, 3L-3 and 3L-4 are held operated by ground on armature No. 4 of relay 3DN during the fourth revolution, there being ground also furnished on armature No. 10 and front contact of relay 2Z. When relay 2W released the second time, relay 2W-1 also released inasmuch as relay 2Z is maintained operated to cause a shunt path around the winding of relay 2W-1 to be closed over the front contact and armature No. 2 of relay 2Z-1, the circuit extending over conductor 219, armature No. 2 and back contact of relay 2W, conductor 218, to ground at armature No. 6 and front contact of relay 2Z. Relay 2Z-1 is held operated when relay 2W-1 released, the holding circuit being traceable over the normally closed make-before-break contact of relay 2W-1, back contact and armature No. 2 of relay 2W, to ground at armature No. 6 and front contact of relay 2Z. When relay 2W-1 released, relay 2W-2 operates and locks, the operating circuit being traceable from ground at the front contact and armature No. 1 of relay 2Z-1, conductor 225, back contact and armature No. 2 of relay 2W-1, normally closed make-before-break contact and the winding of relay 2W-2, to grounded battery 234. Relay 2Z-2 cannot operate at this time because its winding is shunted at its armature No. 2 and back contact, the circuit extending over conductor 232, armature No. 2 and back contact of relay 2W-1, to ground at the front contact and armature No. 1 of operated relay 2Z-1.

The rotation of brush arm 305 through its fourth revolution causes the verification signal identical with the first preset signal to be transmitted to the dispatcher. The verification signal of the preset signal for letter K which is set up by the 3P relays is transmitted as the inner brush on brush arm 305 rotates over segments Nos. 0, 1, 2, 3, 4 and 5 of ring 302, to the circuit traceable over conductor 202, No. 1 armature and front contact of relay 2Z, conductor 213, through the winding of relay 2LS, to grounded battery and the impulses repeated by relay 2LS are transmitted to the dispatcher's teletypewriter to indicate to the dispatcher that the functions required of the first preset signal have been satisfactorily completed at switching center C. When brush arm 305 comes to rest at the termination of its fourth revolution, the outer brush thereof engages rest segments R1 and R2 and relay 3DN reoperates. Relay 3DN, upon becoming operated for the fifth time, removes at its No. 2 armature and front contact, the ground connection from the circuit which held relay 2Z operated and relay 2Z releases. When relay 2Z releases the second time it closes at its No. 10 armature and back contact the circuit for operating relay 5CCK which operates a second time, the circuit being traceable from grounded battery, through the winding of relay 5CCK, conductors 514 and 513, No. 2 armature and front contact of relay 5TSR, now operated for the second time, conductor 512, normally closed auxiliary contacts 1A of relay 5CCK, conductor 405, No. 7 armature and back contact of relay 4T-1, No. 8 armature and back contact of relay 4T-2, armature No. 6 and back contact of relay 4T-3, armature No. 7 and back contact of relay 4T-4, armature No. 8 and back contact of relay 4T-5, conductors 404 and 224, to ground at the No. 10 armature and back contact of relay 2Z. Relay 5CCK locks operated to ground at the auxiliary contacts 1A of relay 5LC. When relay 5CCK operates for the second time, it opens at its No. 2 armature and back contact, the operating circuit for relay 5CCZ which now releases, the circuit thus opened being traceable from grounded battery, through the winding of relay 5CCZ, normally closed make-before-break contacts of relay 5CCW, armature No. 3 and first contact of relay 5CCZ, conductor 536, armature No. 2 and front contact of relay 5CCX, conductor 506, armature No. 2 and back contact of relay 5CCK, conductor 403, back contact and armature No. 7 of relay 4C7A, conductor 402, back contact and armature No. 11 of relay 4C6B, conductor 505, to ground at No. 1 armature and front contact of relay 5STT. Also the operated 3P and 3L relays release when relay 2Z disconnects ground at its No. 10 armature and front contact. Furthermore, relay 2Z upon releasing, causes at its No. 6 armature the release of relay 2Z-1. Relay 2Z-1, upon releasing, removes ground at its No. 1 armature and front contact from the shunt path around the winding of relay 2Z-2 which now operates in the locking circuit of relay 2W-2. At this time, relay 5STT is held operated by the ground on armature No. 4 and front contact of relay 2W-2.

The operated relays in the switching center control circuit, the permutation link control circuit and the permutation link circuit No. 1 at this time are: 3DN, 5STT, 5CI-1, 5ASW, 6PR3, 6PR4, 6PR6, 5CK-1, 5CCX, 2W-2, 2Z-2, 5TSR and 5CCK. Normally operated relay 5TSR has released and reoperated.

*Fifth revolution of the distributor brush arm upon receipt of the second preset signal from the dispatcher*

When the verification of the first preset signal K is recorded at the dispatcher's teletypewriter, the dispatcher transmits the second preset signal which in this case is the signal for letter B and it consists of start, or space, space, mark, space, space, mark, mark and stop, or mark. The start, or space, signal upon being received at switching center C causes line receive relay 2LR to operate its armature to its left-hand position and thereby close a circuit hereinbefore traced for momentarily operating start magnet 3CL in response to the incoming second preset signal. As brush arm 305 begins to rotate, its outer brush moves off rest segments R1 and R2 to open the operating circuit for relay 3DN which now releases for the fourth time. When relay 3DN releases at this time, ground is connected at its No. 2 armature and back contact to a circuit traceable over conductor 319, normally closed make-before-break contacts of relay 2W, through the winding of relay 2W to ground at battery and relay 2W operates for the third time and then locks over its No. 1 armature and front contact in a circuit traceable over conductor 222, front contact and armature No. 1 of relay 2W-2, conductor 229, back contact and armature No. 3 of relay 2Z-1 which at this time is released. Relays 2W-2 and 2Z-2 are held operated, relay 2W-2 being operated at the beginning of the fourth revolution of brush arm 305 and relay 2Z-2 being operated at the conclusion of the fourth revolution. As brush arm 305 continues rotating and its inner brush engages, in turn, segments 0, 1, 2, 3, 4 and 5 of ring 302, relays 3P-0, 3P-2 and 3P-3 become operated and lock to ground at the back contact and armature No. 4 of relay 3DN. Accordingly, since relays 3P-1, 3P-4 and 3P-5 remain unoperated, relays 3L-1, 3L-4 and 3L-5 become operated and lock to ground also at armature No. 4 of relay 3DN. When relays 3L-1, 3L-4 and 3L-5 operated, they closed at their respective middle right-hand armature paths for operating translating relays 4T-1, 4T-4 and 4T-5, these paths being connected in parallel to a circuit traceable over conductor 321, No. 5 armature and front contact of relay 2W, conductor 205, armature No. 4 and back contact of relay 5CCZ, conductor 501, back contact and armature No. 1 of relay 5CCW, to ground.

When brush arm 305 completes its fifth revolution, its outer brush reengages rest segments R1 and R2 to close the operating circuit for relay 3DN which becomes operated for the sixth time, to remove ground at its No. 2 armature and back contact from the shunt path which extends over armature No. 8 and back contact of relay 2Z. Relay 2Z operates for the third time, the operating circuit being traceable over conductor 206, front contact and armature No. 1 of relay 2W, conductor 222, front contact and armature No. 1 of relay 2W-2, conductor 229, back contact and armature No. 3 of relay 2Z–1 to ground. Relay 2Z–1 is in a released condition at this time.

Relay 2W remains locked operated in a circuit traceable over its No. 1 armature and front contact, conductor 222, front contact and armature No. 1 of relay 2W–2, conductors 223 and 229, back contact and armature No. 3 of relay 2Z–1, to ground its shunt path over armature No. 8 and front contact of relay 2Z being opened at the time by the removal of ground at the No. 2 armature of relay 3DN. Relays 3P–0, 3P–2 and 3P–3 and 3L–1, 3L–4 and 3L–5 are held locked operated over conductor 322, to ground at the front contact and armature No. 10 of relay 2Z.

Relay 2Z upon operating for the third time, removes ground at its No. 10 armature and back contact from the holding circuit of relay 5TSR which now releases for the second time. When relay 5TSR releases for the second time, it closes at its No. 3 armature and back contact an operating circuit for relay 4C7A which operates to prepare the permutation link control circuit for the second preset signal representing letter B. The operating circuit for relay 4C7A is traceable from grounded battery, through the winding of relay 4C7A, conductor 408, back contact and armature No. 6 of relay 5CCZ, conductor 525, armature No. 3 and front contact of relay 5CCK, conductor 526, back contact and armature No. 3 of relay 5TSR, conductors 527 and 524, normally closed auxiliary contacts 1A of relay 5LC, to ground. Relay 4C7A operates to close in conjunction with translating relays 4T–1, 4T–4 and 4T–5, three paths extending from ground at the No. 1 armature and back contact of relay 5LC, conductor 517, to armatures Nos. 1, 4 and 5, in parallel, of relay 4C7A to their respective conductors 4W7, 4W–10 and 4W–11, their respectively associated armatures Nos. 11, 8 and 7 of operated relay 2CI–1, 5W7–1, 5W–10–1 and 5W–11–1, through the winding of respective relays 7PR7, 7PR–10 and 7PR–11, to grounded battery and relays 7PR7, 7PR–10 and 7PR–11 operate in response to the second preset signal for the letter B. Relays 7PR7, 7PR–10 and 7PR–11 upon operating, connect ground at their respective outer left-hand armatures Nos. 1 and contacts to a circuit extending over conductor 5C2–1, back contact and armature No. 5 of relay 5ASZ, conductor 537, through the winding of relay 5CK–2, to grounded battery and relay 5CK–2 operates. Also, relays 7PR7, 7PR–10 and 7PR–11 upon operating, close at their respective inner left-hand armatures Nos. 2 and front contacts, a locking circuit for themselves extending over conductor 5L–1, upper normally closed make-before-break contacts of relay 5ASZ, conductor 528, to ground at the back contact and armature No. 2 of relay 5UL. Relay 5CK–2, upon operating, closes at its No. 1 armature and front contact an operating circuit for again operating relay 5LC, the circuit being traceable from grounded battery, through the lower winding of relay 5LC, No. 1 armature and back contact of relay 5TSR, conductors 518 and 538, front contact and armature No. 1 of relay 5CK–1, conductor 539, front contact and their respective armatures Nos. 6, 5, 4, 3, 2 and 1 of relay 4C7A, conductor 517 to ground at the back contact and armature No. 1 of relay 5LC. Relay 5LC operates. Relay 5LC, upon operating, locks in a circuit traceable over its No. 3 armature and front contact, conductor 519, No. 4 armature and back contact of relay 5CCZ, conductor 501, back contact and No. 1 armature of relay 5CCW, to ground and opens at its auxiliary contacts 1A the operating circuit for relay 4C7A, the latter circuit being traceable from grounded battery, through the winding of relay 4C7A, conductor 408, back contact and armature No. 6 of relay 5CCZ, conductor 525, No. 3 armature and front contact of relay 5CCK, conductor 526, back contact and armature No. 3 of relay 5TSR, conductors 527 and 528, to the normally closed auxiliary contacts 1A now open, to ground. Relay 4C7A releases. Also relay 5LC, upon operating, opens the locking circuit for relay 5CCK which releases a second time.

When relay 4C7A releases after relay 5CCK has released, relay 5AV operates, the circuit being traceable from grounded battery, through the winding of relay 5AV, No. 1 armature and back contact of relay 5CCZ, armature No. 3 and front contact of relay 5CCX, conductor 506, armature No. 2 and back contact of relay 5CCK, conductor 403, back contact and armature No. 7 of relay 4C7A, conductor 402, back contact and armature No. 11 of relay 4C6B, conductor 505, front contact and armature No. 1 of relay 5STT to ground. Relay 5AV upon operating, closes at its No. 2 armature and front contact a circuit for momentarily operating start magnet 3CL for the sixth time, the circuit being traceable from ground at No. 2 armature and front contact of relay 5AV, conductors 520 and 510, front contact and armature No. 1 of relay 3DN, conductor 323, armature No. 6 and front contact of relay 2W, conductor 210, armature No. 7 and front contact of relay 2Z, conductor 211, No. 1 armature and back contact of relay 2Z–2, conductor 304, through the winding of start magnet 3CL, to grounded battery and start magnet 3CL operates to start the sixth revolution of distributor brush arm 305. It will be noted that the circuits used for operating start magnet 3CL to cause the transmission of each of the verification signals to the dispatcher's office is different from the other. However, the circuit for operating magnet 3CL in response to each of the signals incoming from the dispatcher's office is the same in each case, although, different from any of those used to cause transmission of the verification signals.

*Sixth revolution of the distributor brush arm to automatically transmit to the dispatcher the third verification signal*

When brush arm 305 starts to rotate for the purpose of transmitting to the dispatcher's teletypewriter a verification signal corresponding to the second preset signal, that is, the signal for letter B, its outer brush moves off rest segments R1 and R2 to open the operating circuit for relay 3DN which now releases for the sixth time to connect at its No. 2 armature and back contact a ground connection to a shunt path closed at armautre No. 8 and front contact of relay 2Z for shunting the winding of relay 2W. Relay 2W releases for the third time and opens at its No. 5 armature and front contact the operating circuit for the operated translating relays 4T–1, 4T–4 and 4T–5 which now release, the circuit thus opened being traceable from grounded battery, through the winding of each of relays 4T–1, 4T–4 and 4T–5 over the corresponding middle right-hand armature of relays 4L–1, 4L–4 and 4L–5, conductor 321, armature No. 5 and front contact of relay 2W (which has just released), conductor 205, No. 4 armature and back contact of relay 5CCZ, conductor 501, back contact and armature No. 1 of relay 5CCW, to ground. Also, relay 3DN upon releasing, connects ground at its No. 2 armature and back contact to a circuit for holding relay 2Z operated for the duration of the sixth revolution of brush arm 305. As brush arm 305 continues to rotate, the inner brush engages each of segments Nos. 1, 2, 3, 4 and 5, in turn, and transmits the impulses of the second preset signal for letter B set up by the operated and unoperated 3P relays in a circuit traceable over conductor 202, armature No. 1 and front contact of relay 2Z, conductor 213, through the winding of relay 2LS, to grounded battery and relay 2LS repeats the signal to the dispatcher's teletypewriter whereat the letter B is recorded to indicate that the function of the second preset signal has performed its functions at switching center C satisfactorily. The operated 3P relay and 3L relay at this time are held operated by ground on armature No. 4 and back contact of relay 3DN during the sixth revolution, ground also being furnished at armature No. 10 and front contact of relay 2Z. When relay 2W releases at the beginning of the sixth revolution, as hereinbefore described, relay 2W-1 operates a second time and locks, the operating circuit being traceable from grounded battery, through the winding of relay 2W-1, normally closed make-before-break contacts of relay 2W-1, conductor 217, armature No. 2 and back contact of relay 2W, conductor 218, No. 6 armature and front contact of relay 2Z, to ground. Relay 2Z-1 at this time remains unoperated because of the closed shunt path around its winding, the shunt path being closed over back contact and No. 2 armature of relay 2Z-1, conductor 219, No. 2 armature and back contact of relay 2W, to ground and No. 6 armature and front contact of relay 2Z.

When brush arm 305 concludes its sixth revolution and its outer brush reengages rest segments R1 and R2, the operating circuit for relay 3DN is closed and relay 3DN reoperates for the sixth time. When relay 3DN reoperates, it removes ground at its No. 2 armature and back contact to open the operating circuit for relay 2Z which now releases. Relay 2Z, upon releasing, opens at its No. 10 armature and front contact the locking circuit for the operated 3P and 3L relays and relays 3P-0, 3P-2 and 3P-3, 3L-1, 3L-4 and 3L-5 release. When relay 2Z releases, it disconnects ground at its No. 6 armature and front contact from the shunt path around the winding of relay 2Z-1, the shunt path being hereinbefore described, and relay 2Z-1 operates for the second time. Also, when relay 2Z releases, it closes at its No. 4 armature and back contact a circuit for operating relay 2AMC which operates in a circuit traceable over conductor 253, front contact and armature No. 4 of relay 2W-1, conductor 254, front contact of relay 2W-2, conductor 255, through the winding of relay 2AMC, to grounded battery, and then locks to ground over its front contact and No. 2 armature, conductors 209 and 208, to ground at the front contact and No. 4 armature of relay 2W-2.

Relays 2W-1, 2Z-1, 2W-2 and 2Z-2 remain operated until the time arrives for making the desired changes in the programs at which time the master cue signal is received at the switching center C to complete the connections that are preset, or conditioned, for completion by the operated PR relays such as relays 6PR3, 6PR4, 6PR6, 7PR7, 7PR-10 and 7PR-11 all of which are locked operated in the circuit traceable to ground and the No. 2 armature and back contact of relay 5UL as hereinbefore described. Other relays in the switching center control circuit, permutation control circuit and permutation link circuit No. 1 that are operated at this time are: 3DN, 5STT, 5CI-1, 5ASW, 5LC, 5CK-1, 5CCX, 5CK-2, 5AV and 2AMC.

*Seventh revolution of the distributor brush arm upon the receipt of the master cue signal from the dispatcher*

Now that the desired connections at switching center C have been preset and await the arrival of the time when the programs will be changed, the dispatcher checks the verification signals with the prearranged schedule to determine whether or not the connections so preset are correct. When the time for changing the program arrives, the dispatcher upon being satisfied with the preset connections, transmits a master cue signal which is common to all the switching centers included in the dispatcher's control circuit. The master cue signal consists of start, or space, mark, mark, mark, mark, mark, mark and stop, or mark, impulses. In response to the start, or space, impulse received by line receive relay 2LR, the relay is allowed to move to its left-hand contact whereby the start magnet 3CL operates momentarily for the seventh time in a circuit as hereinbefore described. When the brush arm 305 begins to rotate, its outer brush moves off the rest segments R1 and R2 to open the operating circuit for relay 3DN which now releases for the seventh time. Relay 3DN, upon releasing, closes at its No. 2 armature and back contact the operating circuit for relay 2W and relay 2W operates for the fourth time and then locks to ground on the No. 3 armature and back contact of relay 3DN. Brush arm 305 continues to rotate over segments ST, 0, 1, 2, 3, 4 and 5, in turn, and its lower brush in passing over selecting segments 0 to 5 do not cause any of the 3P relays to operate inasmuch as all the selecting impulses of the master cue signal are marking and the armature of relay 2LR therefore remains in its right-hand position so that no operating circuits for the 3P relays are closed. With the 3P relays in their unoperated position, all the 3L relays operate as soon as relay 3DN releases, that is, relays 3L-0, 3L-1, 3L-2, 3L-3, 3-L4 and 3L-5 operate in a circuit traceable to ground at the No. 4 armature and back contact of relay 3DN and lock in a circuit traceable over conductor 322, to ground at the No. 4 armature and front contact of relay 2W. When relays 3L-0, 3L-1, 3L-2, 3L-3, 3L-4 and 3L-5 operate they close a circuit traceable from ground at the No. 4 armature and back contact of relay 3DN, conductor 318 in a path extending over the operated middle-right-hand armatures of relays 3L-0, 3L-1, 3L-2, 3L-3, 3L-4 and 3L-5, conductors 332 and 237, armature No. 5 and front contact of relay 2AMC, conductor 238, through the winding of master cue relay 2MC, to grounded battery. Relay 2MC operates and then locks in a circuit traceable over its armature and front contact, conductors 209 and 208, to ground at the front contact and armature No. 4 of relay 2W-2. When relay 2MC operates, it opens at its armature and back contact the locking circuit for relays 5STT and 5CI-1 which now release.

Relay 5STT upon releasing (1) opens at its No. 1 armature and front contact the locking circuit for relay 5CCX and the operating circuit for relay 5AV to cause relays 5AV and 5CCX to release; and (2) opens at its No. 2 armature and front contact a circuit traceable over conductors 511 and 542, armature No. 1 and back contact of relay 5ASZ, to grounded battery. The latter circuit which serves as a shunt path around relay 5ASZ, upon being opened, removes such shunt to permit relay 5ASZ to operate in a circuit traceable from grounded battery, through the winding of relay 5ASZ, conductor 543, front contact and armature of relay 5ASW, conductor 251, back contact and armature No. 4 of relay 2RLS, to ground. Relay 5ASZ operates to (1) substitute a ground connection at its armature No. 2 for the ground connection at armature No. 2 of relay 5UL to maintain relays 6PR3, 6PR4, 6PR6, 7PR7, 7PR-10 and 7PR-11 operated; (2) substitute at its No. 3 armature the ground connection at armature No. 2 of relay 5UL for the ground connection at its normally closed make-before-break contacts to maintain the operated 8PR and 9PR relays of permutation link circuit No. 2 operated until relay 5UL is subsequently operated; (3) transfers the ground connection at its No. 4 armature from a back to a front contact whereby the operating circuit including conductor 5SW2 for switch-over relay 8SW of permutation link circuit No. 2 is opened to release relay 8SW and the operating circuit including conductor 5SW-1 for switch-over relay 6SW of permutation link circuit No. 1 is closed to operate relay 6SW; (4) transfers at its armature No. 5 the winding of check relay 5CK-2 from the path including conductor 5C2-1 which is holding relay 5CK-2 operated, to another path including conductor 5C2-2 whereby relay 5CK-2 is maintained operated; (5) transfers at its armature No. 6 the winding of check relay 5CK-1 from the path including conductor 5C1-1 which is holding relay 5CK-1 operated, to another path including conductor 5C1-2 which maintains relay 5CK-1 operated; (6) transfers at its No. 7 armature, ground conductor 236 from the operating circuit including conductor 521 for relay 5CI-1 to the operating circuit including conductor 544 for relay 5CI-2; and (7) supplement at armature No. 8 a ground connection to the ground conductor 251, and serves as a holding ground for maintaining relay 5ASZ operated. Relay 5CI-1 was released when relay 2MC operated as hereinbefore described, and inasmuch as the locking ground was removed from conductor 236 at the time relay 2MC operated, relay 5CI-2, although now connected to conductor 236, cannot operate until another change of programs is preset. It will be noted, therefore, that relay 5ASZ, upon operating indirectly in response to the master cue signal, completes the switch-over from permutation link circuit No. 2 which as hereinbefore stated, was in an operated condition since transmitting the previous set of programs, to permutation link circuit No. 1 which now begins to transmit the new set of programs for which link circuit No. 1 was prepared by the preset signals for letters KB. The premature release of the PR relays of permutation link circuit No. 2 and the check relays 5CK-1 and 5CK-2 are prevented by the substitute ground connections furnished at armatures No. 6 and 5, respectively, of relay 5ASZ in its operated condition, their release depending upon the operation of relay 5UL as hereinafter described.

When brush arm 305 completes its seventh revolution, its outer brush comes to rest on segments R1 and R2 to close the operating circuit for relay 3DN which again reoperates to remove ground at its Nos. 2, 3 and 4 armatures. Operated relays 3L-0, 3L-1, 3L-2, 3L-3, 3L-4 and 3L-5 are maintained locked operated in the circuit traceable over conductors 308 and 322, to ground at the No. 4 armature and front contact of relay 2W. Relay 2W is held locked operated in a circuit traceable over its No. 1 armature and front contact, conductor 222, front contact and No. 1 armature of relay 2AMC, conductor 332, operated innermost righthand armature of relays 3L-5, 3L-4, 3L-3, 3L-2, 3L-1, conductors 318 and 322, to ground at the No. 4 armature and front contact of relay 2W. Relay 3DN upon operating for the eighth time removes at its No. 2 armature and back contact the ground connection from the shunt path around the winding of relay 2Z and relay 2Z operates for the fourth time in the locking circuit for relay 2W which was just described. Relay 2Z, upon operating, connects at its No. 1 armature and front contact the winding of relay 2LS; (2) supplements at its armature No. 10 and front contact, the ground connected at armature No. 4 and front contact of relay 2W for holding relays 3L-0, 3L-1, 3L-2, 3L-3, 3L-4 and 3L-5 operated; and (3) supplements and its armature No. 4 and front contact, the ground connected at armature No. 5 and front contact of relay 2W-1 and armature No. 4 and front contact of relay 2W-2 to conductor 209 for holding relay 2MC operated.

When relay 2AMC operated as hereinbefore described, ground was removed from the upper winding of relay 2TM and a second ground was substituted at the No. 3 armature and back contact of relay 2Z in its released position. However, at the end of the reception of the master cue signal when relay 2Z operates to remove this substitute ground, grounded condenser 235 which is connected in a circuit traceable from grounded battery 249, resistor 241, adjustable resistor 242, and through the upper winding of relay 2TM, begins charging. Condenser 235 has a capacity that is individual to the selected switching center C and at the end of the interval required to completely charge condenser 235, the current in the upper winding of the relay 2TM ceases and thereby allows the weaker current flowing through the lower winding of relay 2TM to operate relay 2TM to its left-hand position whereby a new circuit, that is, the fifth different circuit, is closed for momentarily operating start magnet 3CL, for the eighth time, the circuit at this time being traceable from grounded battery, through the winding of start magnet 3CL, conductor 230, contact and armature of relay 2TM, conductor 256, front contact and No. 1 armature of relay 3DN, conductor 323, No. 6 armature and front contact of relay 2W, conductor 210, armature No. 7 and front contact of relay 2Z, conductor 211, armature No. 1 and front contact of relay 2Z-2, conductor 225 to ground. Start magnet 3CL operates to start distributor brush arm 305 on its eighth revolution.

*Eighth revolution of the distributor brush arm to automatically transmit to the dispatcher the final verification signal*

When brush arm 305 begins its eighth revolution its outer brush moves off the rest segments R1 and R2 to open the operating circuit for relay 3DN which releases for the eighth time. Relay 3DN upon releasing, connects ground at its No. 2 armature and back contact for shunting relay 2W in a path traceable over armature No. 8 and front contact of relay 2Z, and relay 2W releases. Relay 2W upon releasing, closes at its No. 7 armature and back contact an operating circuit for relay 3SC and relay 3SC operates, the circuit being traceable from grounded battery, through the winding of relay 3SC, conductor 333, armature No. 3 and front contact of relay 2AMC, conductor 243, front contact and armature No. 5 of relay 2Z, conductor 244, to the back contact and armature No. 7 of relay 2W. Relay 2Z at this time is held operated by ground on armature No. 2 of relay 3DN. Operated relays 3L–0, 3L–1, 3L–2, 3L–3, 3L–4 and 3L5 are held operated by ground on armature No. 4 and back contact of relay 3DN during the eighth revolution of brush arm 305. When relay 2W released for the fourth time a path is closed from ground at the front contact and armature No. 6 of relay 2Z, conductor 218, back contact and armature No. 2 of relay 2W, conductors 217 and 219, armature No. 3 and front contact of relay 2Z–1, conductor 228, resistor 227, to grounded battery 226 and this circuit shunts the winding of relay 2W–1 which now releases. Relay 2W–1 upon releasing, closes at its normally closed make-before-break contacts the holding path of relay 2Z–1, and relay 2Z–1 is maintained operated, the holding path forming a part of the circuit hereinbefore traced over conductor 217, No. 2 armature and back contact of relay 2W, conductor 218, to ground at armature No. 6 and front contact of relay 2Z. Also relay 2W–1 upon releasing, closes at its No. 2 armature and back contact a circuit for shunting the winding of relay 2W–2 which now releases, the shunting circuit being traceable from grounded battery 234, conductor 233, front contact and No. 2 armature of relay 2Z–2, conductors 232 and 231, armature No. 2 and back contact of relay 2W–1, conductor 225, No. 1 armature and front contact of relay 2Z–1, to ground. Relay 2W–2 upon releasing, transfers the operating circuit for relay 2Z–2 from the ground connection at the No. 2 armature and front contact of relay 2W–2, to the ground connection present in the path traceable over the normally closed make-before-break contacts of relay 2W–2, conductor 231, No. 2 armature and back contact of relay 2W–1, conductor 225, to No. 1 armature and front contact of relay 2Z–1, and relay 2Z–2 is therefore maintained in an operated condition after relay 2W–2 releases. When relay 2W–1, releases, it does not effect the operation of relay 2TM inasmuch as the lower winding of the latter relay is held energized in a circuit closed to ground at armature and front contact of relay 2Z.

The capacity of condenser 235 determines the duration of the interval following the operation of relay 2Z at the beginning of the eighth revolution of the distributor brush before brush arm 305 begins to rotate and this interval is different from the corresponding intervals at all other switching centers, each switching center having its own predetermined timed interval before transmitting to the dispatcher's teletypewriter the code signal corresponding to the calling cue signal for the switching center.

The return, or check, signals verify that the common master cue signal has satisfactorily performed its functions at all the selected switching centers including switching center C and are transmitted from their respective switching centers to the dispatcher's teletypewriter over a special circuit comprising six parallel paths certain ones of which contain gaps corresponding to the space impulses of the calling cue signal which was first transmitted to select the switching center. These parallel paths at switching center C are represented by conductors 325, 326, 327, 328, 329 and 330, respectively, which are connected through contacts and armature of relay 2SC, conductor 335, to ground at armature No. 4 and back contact of relay 3DN. As brush arm 305 rotates over segments ST, 0, 1, 2, 3, 4, 5, in turn, seven circuits are successively involved in transmitting back to the teletypewriter at the dispatcher's office the code signal for No. 3, which is the calling cue signal for switching center C, to indicate to the dispatcher, as hereinbefore stated, that the master cue signal has performed its functions at switching center C in a satisfactory manner. These seven circuits are as follows: (1) grounded batter, through the winding of relay 2LS, armature No. 1 and front contact of relay 2Z, conductor 202, solid ring 301, inner brush on arm 305, start segment ST, conductor 212, front contact and armature No. 9 of relay 2Z, to ground and relay 2LS operates to open the dispatcher's control circuit to thereby transmit the first, or start, impulse of the verification signal to the dispatcher's teletypewriter; (2) over the same path extending through the winding of relay 2LS but this time, over segment 0 when engaged by the inner brush on arm 305, conductor 306, open gap 3C–0, conductors 325 contact and armature No. 1 of relay 3SC, conductor 335, back contact and armature No. 4 of relay 3DN, to ground but inasmuch as gap 3C–0 in circuit (2) is open, no operating current flows through the winding of relay 2LS and the dispatcher's control circuit remains closed to transmit a mark for the zero selecting impulse to the dispatcher's teletypewriter; (3) over conductor 202, distributor ring 301 and segment No. 1 of ring 302, conductor 307, open gap 3C–1, conductor 326 contact and armature No. 2 of relay 3SC, conductor 335, to ground at the No. 4 armature and back contact of relay 3DN, and circuit (3) also because open gap 3C–1 is provided therein, has no current flowing through the winding of relay 2LS and a mark for the No. 1 selecting impulse is therefore again transmitted over the control circuit to the dispatcher's teletypewriter; (4) over conductor 202 to the No. 2 segment of ring 302, conductors 308 and 327 contact and armature No. 3 of relay 3SC, conductor 335, to ground at the No. 4 armature and back contact of relay 3DN, and inasmuch as no open gap is provided in circuit (4), current flows to operate relay 2LS whereby the dispatcher's control circuit is opened to transmit a space for the No. 2 selecting impulse to the teletypewriter at the dispatcher's office: (5) over conductor 202, segment No. 3 of ring 302, conductors 309 and 328, contact and armature No. 4 of relay 3SC, conductor 335, to ground at the No. 4 armature and back contact of relay 3DN, and inasmuch as no open gap is provided in circuit (5), relay 2LS again operates to transmit a space for the No. 3 selecting impulse to the dispatcher's teletypewriter; (6) over conductor 202, the No. 4 segment on ring 302, conductors 310 and 329, contact and armature No. 5 of relay 3SC, conductor 335, to ground at the No. 4 armature and back contact of relay 3DN, and inasmuch as no open gap is provided in circuit (6), relay 2LS again operates to transmit a space for the No. 4 selecting impulse to the dispatcher's teletypewriter and (7) over conductor 202, segment No. 5 of ring 302, conductors 311, and 330, contact and armature No. 6 of relay 3SC, conductor 335, to ground at the No. 4 armature and back contact of relay 3DN, and circuit (7) likewise is not provided with an open gap and consequently relay 2LS operates to transmit to the dispatcher's teletypewriter a space for the No. 5 selecting impulse. The distributor brush arm 305 now comes to rest with its outer brush engaging rest segments R1 and R2 to close the operating circuit for relay 3DN which again reoperates to remove ground from its No. 4 armature and back contact whereby relay 2LS becomes deenergized to close the dispatcher's control circuit for transmitting to the dispatcher's teletypewriter a stop, or mark, impulse. The character now recorded on the tape at the dispatcher's teletypewriter is No. 3 corresponding to the calling cue signal for switching center C indicating to the dispatcher that the preset connections at switching center C have been completed satisfactorily. Each of the other switching centers whereat connection have been preset for the next change of programs transmits, in turn, depending on the predetermined timed interval assigned to it, a verification signal corresponding to its selecting signal and each of these signals is recorded, one after the other, on the dispatcher's teletypewriter tape, the intervals of space between adjacent verification characters depending upon the capacity of the condenser and the resistance value of the variable resistor at each of the switching centers. Condenser 235 and variable resistor 242 as hereinbefore described, determines the duration of the interval following the receipt of the master cue signal before the final verification signal is transmitted from switching center C.

Relay 3DN, upon reoperating at the end of the eighth revolution of distributor brush arm 305, removes ground at its No. 2 armature and back contact to open the operating circuit for relay 2Z and relay 2Z releases for the fourth time. Relay 2Z upon releasing, removes at its No. 10 armature and front contact a ground connection from the holding circuit for relays 3L-0, 3L-1, 3L-2, 3L-3, 3L-4, and 3L-5, all of which being operated in response to the common master cue signal, now released. Also, when relay 2Z released, it disconnected ground at its No. 6 armature and front contact from the operating circuit for relay 2Z-1, which was traceable over conductor 218, back contact and armature No. 2 of relay 2W, normally closed make-before-break contacts of relay 2W-1, conductor 221, through the winding of relay 2Z-1, to grounded battery 220, and relay 2Z-1 releases for the second time. Relay 2Z-1, upon releasing, disconnects at its No. 1 armature and front contact the ground connection from the operating circuit for relay 2Z-2, which was traceable over conductor 225, back contact and No. 2 armature of relay 2W-1, conductors 231, normally closed make-before-break contacts of relay 2W-2, conductor 245, through the winding of relay 2Z-2, to grounded battery and relay 2Z-2 releases.

When relay 2Z released at the end of the eighth revolution of distributor brush arm 305, a ground connection at armature No. 7 and back contact of relay 2W was disconnected at No. 5 armature and front contact of relay 2Z from the locking circuit for relay 2AMC and relay 2AMC releases. Relay 2AMC upon releasing (1) opens at its No. 3 armature and front contact the operating circuit for relay 35c which releases; and (2) connects ground at its No. 4 armature and back contact to the upper winding of relay 2TM whereby condenser 235 is discharged, and a relatively strong current is again allowed to flow in the upper winding of relay 2TM whereby relay 2TM operates to its opened position. Relay 2Z, upon releasing, disconnects at its No. 5 armature and front contact the ground connection from the locking circuit of relay 2MC and relay 2MC releases.

*Change of connections between stations and radio wire networks*

The detailed description hereinbefore given is directed to connection settings established at switching center C by the operation of relays 6PR3, 6PR4 and 6PR6 of the first group and relays 7PR7, 7PR-10 and 7PR-11 of the second group of the permutation link circuit No. 1 in response to the signals for letters KB. These settings established connections between the local stations and the radio wire networks in the following arrangement:

| Stations | Radio Wire Networks |
|---|---|
| Nos. 1 and 3 connected to | No. 1. |
| Nos. 2 and 4 connected to | No. 2. |
| No. 5 connected to | No. 3. |
| No. 6 connected to | No. 4. |

Should the next connection settings be established in response to "space" and letter O these connections would be established at permutation link circuit No. 2 and the relays thereof operated in response to "space" and letter O would be 8PR3 of the first group and 9PR-10 and 9PR-11 of the second group. Accordingly the connections between the local stations and the radio wire networks would be as follows:

| Stations | Radio Wire Networks |
|---|---|
| Nos. 1 and 5 connected to | No. 1. |
| Nos. 2 and 4 connected to | No. 2. |
| No. 3 connected to | No. 3. |
| No. 6 connected to | No. 4. |

Therefore, in making this change the connections of stations Nos. 1, 2, 4 and 6 to their respective radio wire networks as listed above for the letters KB, would remain unchanged and those of stations Nos. 3 and 5 would change. This permits of a continuation of programs to or from each of stations Nos. 1, 2, 4 and 6 and a change of programs to or from stations Nos. 3 and 5 over their respectively connected networks.

*Transmission direction control arrangements between stations and wire networks*

Each of the stations Nos. 1 to 6 is normally connected to one of the four radio wire networks No. 1 to 4. Each station may be arranged to transmit a program or it may receive a program originating at a station connected to the same or another of the switching centers connected to the dispatcher's teletypewriter control circuit. Normally all stations are arranged for receiving, but should it be desired to originate a program at any stations a microphone key at that station, such as key 1004 at station No. 1, would be operated to cause the receiving circuit thereat to be disconnected and the microphone circuit connected in its place for the purpose of transmitting the program to one or more wire networks for transmission to stations locally connected to the other switching centers. The transmitting circuit at the station whereat the program originates may also be connected to its associated receiving circuit for broadcasting the program directly from the originating station by adapting the arrangement disclosed in Bachelet et al. Patent 2,110,284, supra.

Inasmuch as there are six stations shown locally connected at switching center C and these stations are served by only four radio wire networks, four stations only can be arranged to originate programs simultaneously and the two remaining stations being in their normal condition at the time, will receive the programs from their respectively connected stations at which the programs originate. In other words, the program received by each of the two remaining stations depends on which of the radio wire networks each remaining station is connected to in response to the preset signals transmitted to switching center C by the dispatcher. It was hereinbefore assumed that in selecting the desired connections in the permutation link circuit at switching center C, the preset signals were those corresponding to letters KB and these signals caused to be operated relays 6PR3, 6PR4, 6PR6, 7PR7, 7PR-10 and 7PR-11. Each of the operated relays of groups 6PR and 7PR simultaneously operate four sets of contacts 600, 601, 602 and 603, respectively corresponding to the tip, the ring, the sleeve and the sleeve prime conductors for interconnecting each of the six stations to the radio wire networks in accordance with the code combinations of the two preset signals, the actual interconnection being effected by switchover relay 6SW which operates in response to the master cue signal transmitted at the time of change of the programs. Stations Nos. 1 to 6 may be arranged to receive programs from any one or all the radio wire networks Nos. 1 to 4. Should however any of the stations be selected to originate a program the microphone key at that station is operated, as hereinbefore stated, and that station is then capable of transmitting to the radio wire network with which it is associated by the connection established through the operated relays of groups 6PR and 7PR relays. At all other switching centers connected to the dispatcher's control circuit the dispatcher will cause to be established by means of preset signal pairs respectively transmitted to each, connections that will connect for reception only one or more stations at each of such other switching centers, as desired, to the particular selected wire networks.

Arrangements for effectively connecting each of the stations locally connected to a switching center to one or more wire networks for transmitting programs in either or both of two opposite directions over one or more of the radio wire networks are well known in the art. The service line and radio wire network direction control arrangements shown in the drawings hereof are disclosed in Bachelet Patent 2,198,360 supra, as hereinbefore stated. These arrangements will be described herein briefly.

Figure 12:
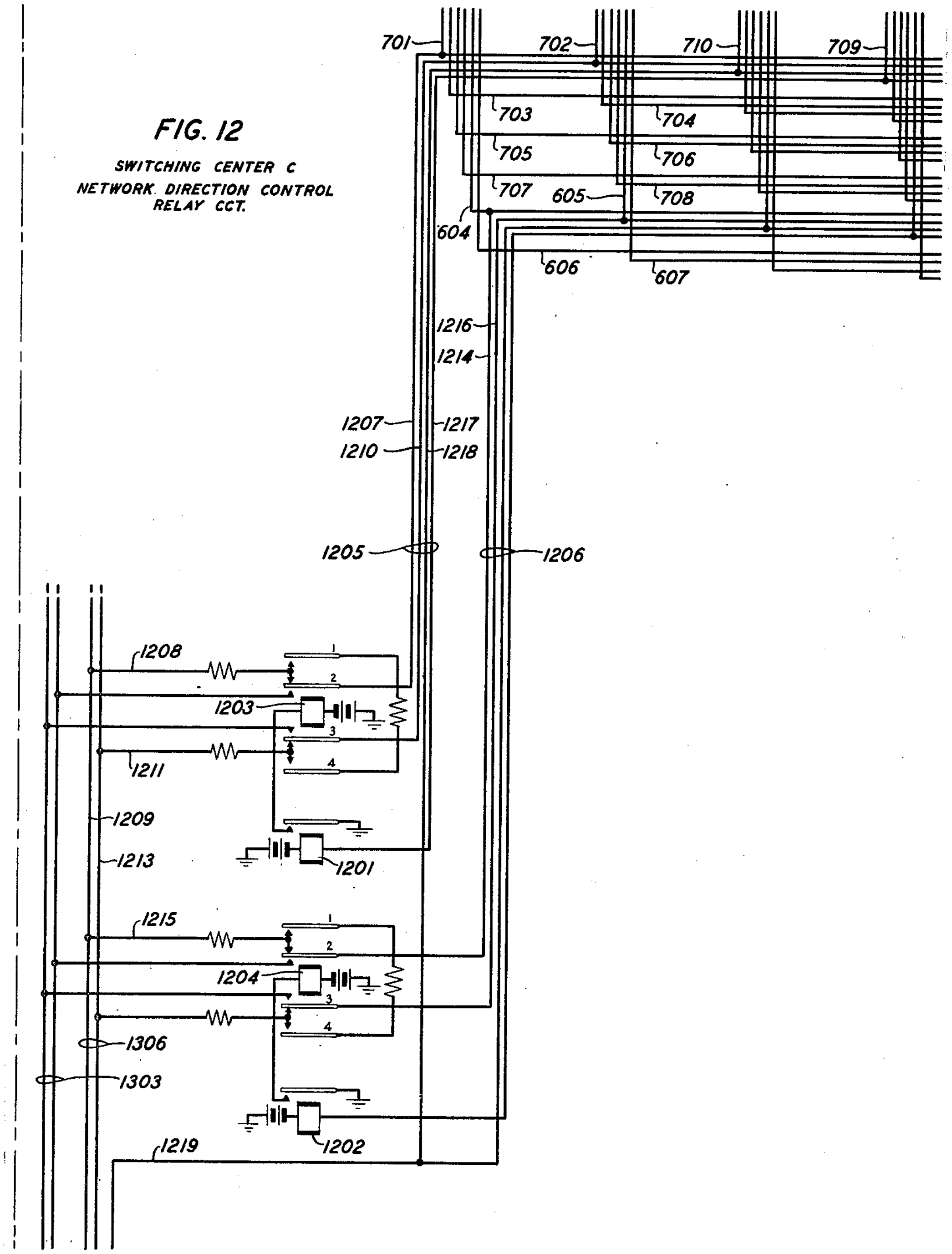
Figure 13:
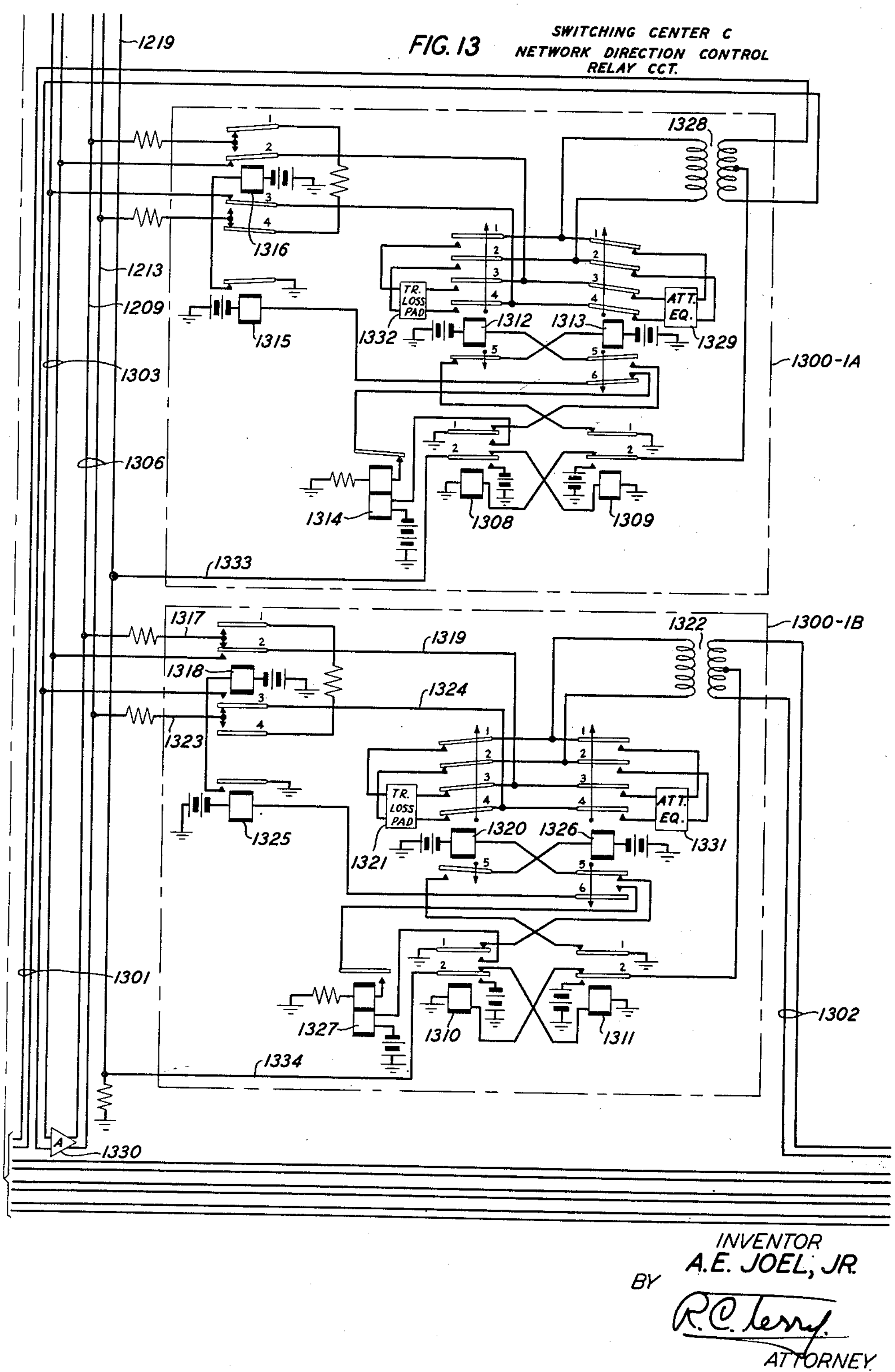
Figure 14:
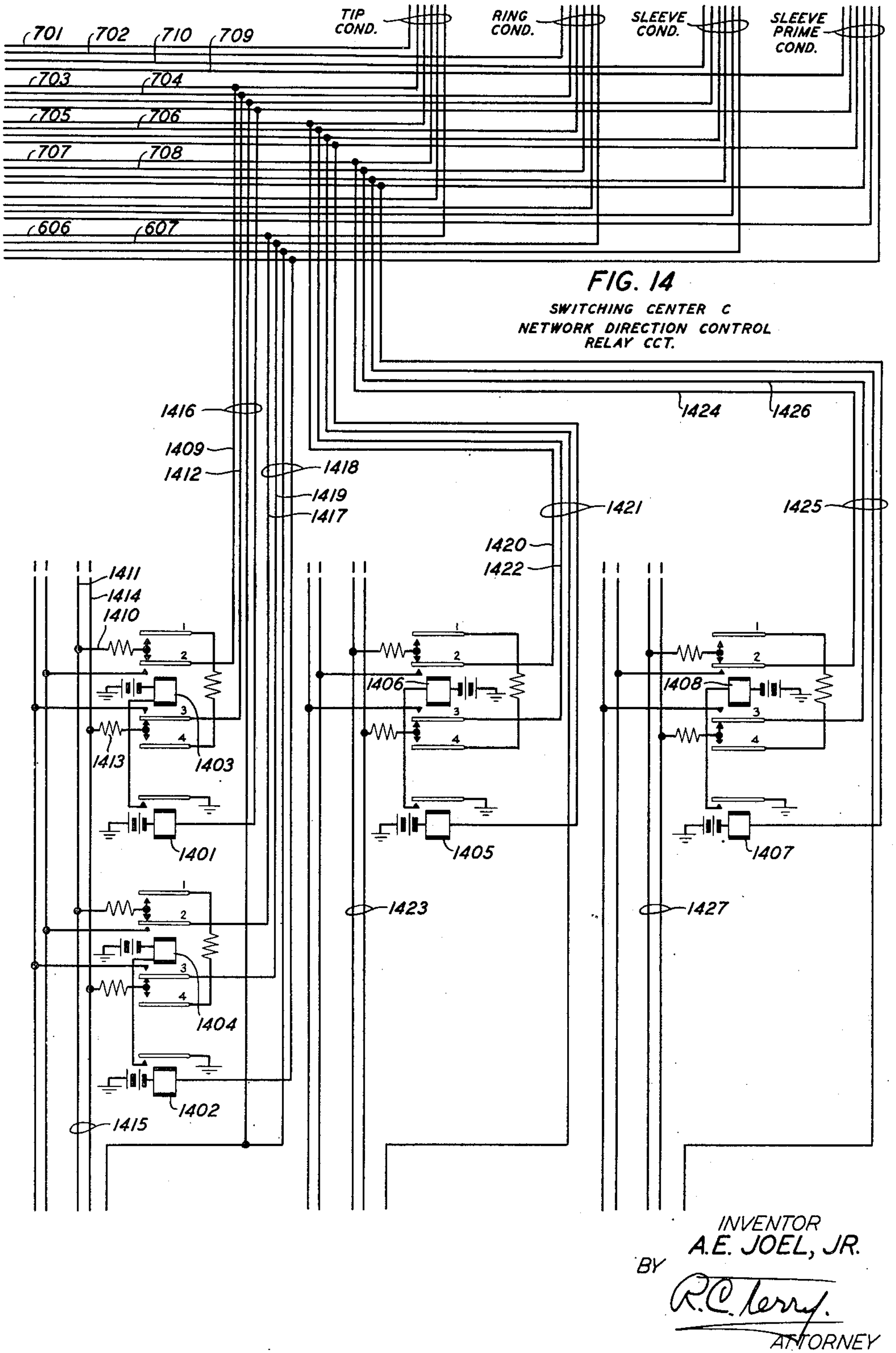
Figure 15:
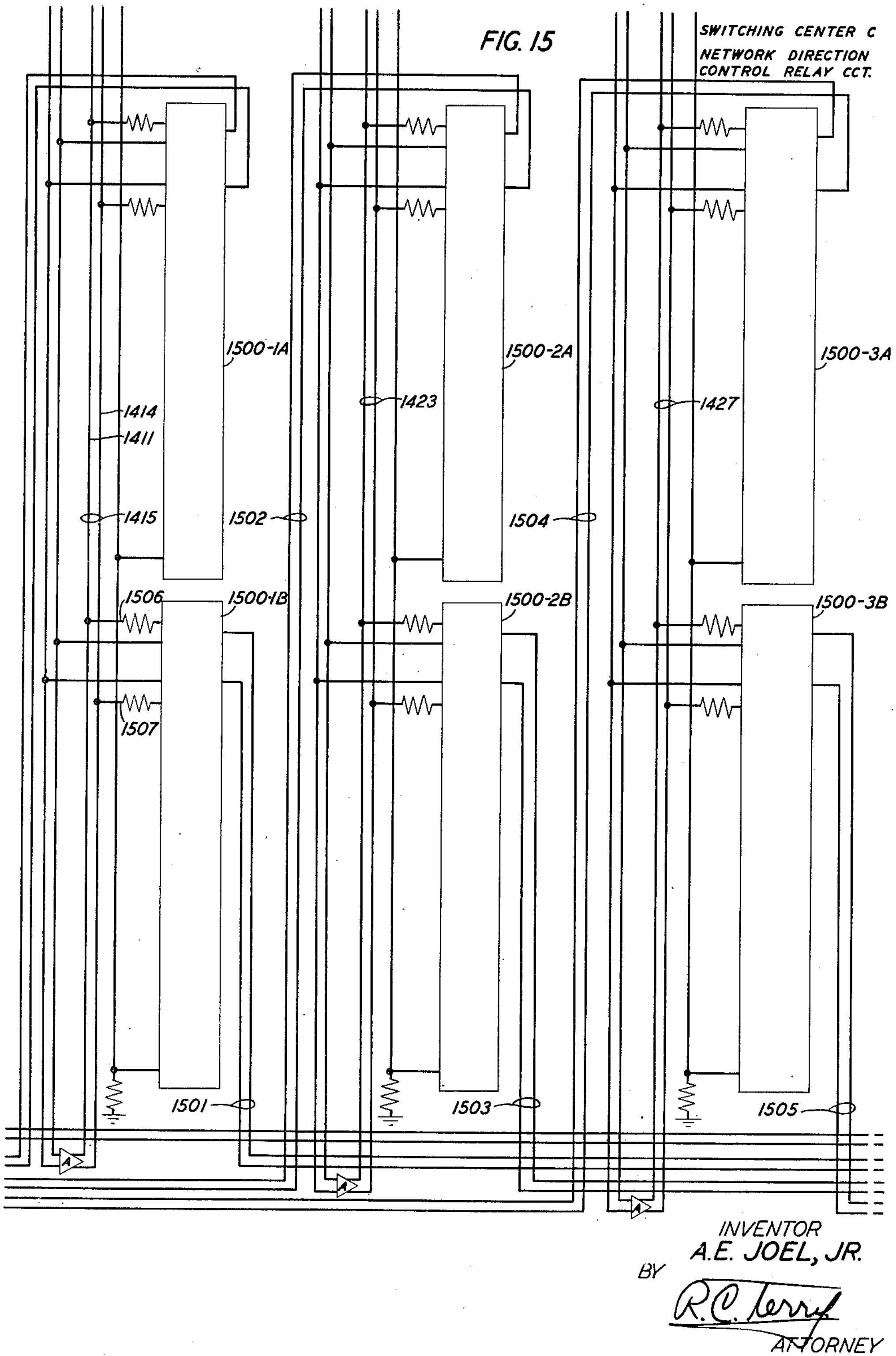

In the service line direction control circuit 1000-1 for station No. 1, relay pairs 1002 and 1007, and 1005 and 1006, and relay 1008 respectively correspond to relay pairs 601 and 602, and 606 and 607, and relay 605 of the Bachelet Patent 2,198,326. Microphone key 1004 corresponds to key 617, also of Patent 2,198,326. Similar apparatus for stations Nos. 2 to 6 inclusive, are respectively provided in other service line direction control circuits 1000-2, 1100-3, 1100-4, 1100-5 and 1100-6, all of which are represented diagrammatically. In the radio wire network direction control circuit shown in Figs. 12 and 13 certain relays correspond to certain relays of Bachelet Patent 2,198,326 as follows: relays 1201 and 1302 respectively correspond to relays 506 and 505; relays 1315 and 1316 respectively correspond to relays 508 and 507; relays 1308, 1309, 1312, 1313 and 1314 respectively correspond to relays 609, 610, 603, 604 and 608; relays 1325 and 1318 respectively correspond to relays 502 and 501; and relays 1310, 1311, 1320, 1326 and 1327 respectively correspond to relays 706, 707, 701, 702 and 705.

Transmitted programs incoming in a west-to-east direction, that is, from the left-hand side of the drawings showing switching center C, are received over conductor pair 1301 of radio wire network No. 1 and are impressed over transformer 1328. Since bridging device 1300-1A is in a receiving condition for west-to-east transmission, the program is received over armatures Nos. 1 and 2 of relay 1313, attenuation equalizer 1329, armatures Nos. 3 and 4 of relay 1313, armatures Nos. 2 and 3 and their respective contacts of relay 1316, conductor pair 1303, amplifier 1330, conductor pair 1306 then in parallel paths. One path extends over back contacts and their respective armatures Nos. 2 and 3 of each of relays 1203 and 1204 to two of the stations Nos. 1 to 6 which according to the coded signals for letters KB are stations Nos. 1 and 3. The other path extends over the back contacts and their respective armatures Nos. 2 and 3 of relay 1318 of bridging device 1300-1B which is also in a receiving condition, armatures Nos. 3 and 4 and their respective front contacts of relay 1320, transmission loss pad 1321, front contacts and their respective armatures Nos. 1 and 2 of relay 1320, through transformer 1322, to conductor pair 1302 of wire network No. 1, to other switching centers, not shown, connected to the east portion of the dispatcher's teletypewriter control circuit.

Transmitted programs incoming from the west over radio wire networks Nos. 2, 3 and 4 are respectively received in a similar manner in bridging devices 1500-1A and 1500-1B, bridging devices 1500-2A and 1500-2B, and bridging devices 1500-3A and 1500-3B. At switching center C when connected in accordance with coded signals for letters KB the programs incoming over wire network No. 3 are received at stations Nos. 2 and 4, the programs incoming over radio wire networks Nos. 3 and 4 are respectively received at stations Nos. 5 and 6.

When transmission over wire networks Nos. 1 to 4 is in an east-to-west direction, the bridging devices for each wire network are operated in a reverse manner to that shown in bridging devices 1300-1A and 1300-1B for radio wire network No. 1. For example, should it be assumed that a program is incoming at switching center C in an east-to-west direction over radio wire network No. 1, the current received over conductor pair 1302 would be impressed on the right-hand coil of transformer 1322 and this current would in addition to being induced in the left-hand coil of the transformer, be effective to operate relay 1310. Relay 1310 upon operating, transfers its No. 2 armature from its back to its front contact to prevent the operation of relay 1311 should an attendant at either of stations Nos. 1 and 3 attempt to originate a program during the time another program is incoming over radio wire network No. 1 in an east-to-west direction. Also, relay 1310, upon operating, transfers its No. 1 armature from its back to its front contact to (1) open the operating circuit for slow-to-release relay 1320 which slowly releases and (2) close the operating circuit for relay 1327 which operates. Relay 1320, upon releasing, closes at its No. 5 armature and back contact an operating circuit for slow-to-release relay 1326 which now operates to close at its No. 6 armature and contact a locking circuit for relay 1327 which locks operated and an operating circuit for relay 1325 which also now operates. Relay 1325, upon operating, closes at its armature and contact an operating circuit for relay 1318 which also now operates. Relay 1326 upon operating, connects (1) at its armatures Nos. 1 and 2 and their respective front contacts the left-hand coil of transformer 1322 to attenuation equalizer 1311, and (2) at its armatures Nos. 3 and 4 and their respective front contacts equalizer 1331 to conductors 1319 and 1324. Relay 1320, upon releasing had disconnected conductors 1319 and 1324 from the left-hand coil of transformer 1322, through transmission loss pad 1321. Relays 1320 and 1326 are made sufficiently slow-to-release to prevent them from responding to "hits" incoming over wire network No. 1. Relay 1318 upon operating, closes the east-to-west communication circuit of radio wire network No. 1 which now extends over the operated armatures Nos. 1 to 4 and their respective front contacts of relay 1326, conductors 1319 and 1324, armatures Nos. 2 and 3 and their respective front contacts of relay 1318, conductor pair 1303, amplifier 1330 and conductor pair 1306. Conductor pair 1306 at this time extends over three parallel paths, one extending over the back contacts and their respectively associated armatures Nos. 2 and 3 of relay 1204, to station No. 3, the second extending over the back contacts and their respectively associated armatures Nos. 2 and 3 of relay 1203, to station No. 1 and the third extending over the front contacts and their respectively associated armatures Nos. 2 and 3 of relay 1316, armatures Nos. 3 and 4 and their respectively associated front contacts of slow-to-release relay 1313. attenuation equalizer 1329, front contacts and their respectively associated armatures Nos. 1 and 2 of relay 1313, transformer 1328, conductor pair 1301 of radio wire network No. 1 in an east-to-west direction to switching centers A and B.

Each of the other pairs of bridging devices 1500-1A and 1500-1B, 1500-2A and 1500-2B and 1500-3A and 1500-3B are operable in the same manner as the bridging device pair 1300-1A and 1300-1B except that the other pairs operate in response to communication currents transmitted to or received over wire networks Nos. 2, 3 and 4 respectively.

Should the schedule of programs call for originating a program at one of the stations locally connected at switching center C, say, station No. 1, the dispatcher would accordingly preset the desired connections at the available permutation link circuit, say, link circuit No. 1. Just prior to the moment when the program at station No. 1 is to start, the attendant at station No. 1 operates a microphone key associated with the studio or pick-up point at station No. 1 at which the program originates. It is assumed that microphone key 1004 is the key to be operated and therefore relay 1005 becomes operated. Relay 1005 upon operating, operates relays 1002 and 1008. Relay 1002 upon operating, operates relay 1007. Relay 1007 upon operating, closes a locking circuit for relay 1008 which locks and prepares a circuit which will be effectively closed when switch-over relay 6SW operates. Relay 6SW upon operating, closes the operating circuit for relay 1201 which operates. Relay 1201 upon operating, operates 1203. Relay 1203 upon operating, connects at its armatures Nos. 2 and 3 and their respective front contacts the tip conductor 1207 and ring conductor 1210 now extending to station No. 1, to conductor pair 1303. When relay 6SW operated it completed in its entirety the operating circuit of two relays connected in parallel, namely, relays 1309 and 1311 which are respectively provided in bridging devices 1300-1A and 1300-1B for preparing radio wire network No. 1 for transmitting the program originating at station No. 1 in opposite directions, that is, to switching centers B and/or A in a westwardly direction and to other selected switching centers, not shown, in an eastwardly direction. Relay 1309, upon operating, connects at its No. 2 armature and front contact grounded battery to the midtap of the right-hand coil of transformer 1328 in a parallel circuit extending westwardly to a transformer at switching center B whereat a relay corresponding to relay 1310, operates. That relay at switching center B, upon operating, (1) prepares the bridging device of which it constitutes a part, for receiving the program from switching center C and (2) causes the operation of a relay corresponding to relay 1006, which is located at a station connected to switching center B, providing switching center B is among those selected to receive the program, and is connected at the time through the available permutation link circuit at switching center B, to radio wire network No. 1. Relay 1311, upon operating, connects at its No. 2 armature and front contact grounded battery to the midtap of the right-hand coil of transformer 1322 in a parallel circuit extending eastwardly to a transformer at the next switching center, not shown, whereat a relay corresponding to relay 1308 operates. That relay at such next switching center upon operating, (1) prepares the bridging device of which it is a part, for receiving the program from switching center C, and (2) causes the operation of a relay corresponding to relay 1006, which is located at a station connected to such next switching center, providing the latter switching center is among those selected to receive the program, and is connected at the time through the available permutation link circuit at the latter switching center, to radio wire network No. 1. Also, relay 1309, upon operating, (1) prevents relay 1308 from operating, whereby a program incoming over radio wire network No. 1 in a west-to-east direction is prevented from being transmitted to station No. 1 at switching center C when station No. 1 is transmitting to radio wire network No. 1; (2) releases relay 1313; and (3) operated relay 1312. Relay 1313, upon releasing, releases relays 1314 and 1316. The joint operation resulting from the release of relay 1313, the operation of relay 1312 and the release of relay 1316, completes the communication circuit hereinbefore conditioned from station No. 1 to conductor pair 1303, but which now is extended through amplifier 1330 over conductor pair 1306, armatures Nos. 2 and 3 and their respectively associated back contacts of relay 1316, armatures Nos. 3 and 4 and their respectively associated front contacts of relay 1312, transmission loss pad 1332, armatures Nos. 1 and 2 and their respectively associated front contacts of relay 1312, transformer 1328, conductor pair 1301 of radio wire network No. 1 to switching centers B and A. Bridging device 1300-1A is therefore operated to transmit the program originating at station No. 1 in a westwardly direction. Also, relay 1311, upon operating, prevents relay 1310 from operating for the same reason as relay 1308 as hereinbefore described. No further functions are performed in bridging device 1300-1B at this time inasmuch as this device is in a position to transmit the program originating at station No. 1 in an eastwardly direction because the communication circuit from station No. 1, including conductor pair 1393 was hereinbefore described as extending through amplifier 1330 over back contacts and their respectively associated armatures Nos. 2 and 3 of relay 1318, armatures Nos. 3 and 4 and their respectively associated front contacts of relay 1320, transmission loss pad 1321, front contacts and their respectively associated armatures Nos. 1 and 2 of relay 1320, transformer 1322, conductor pair 1302 of wire network No. 1 to the switching centers, not shown, in an eastwardly direction from switching center C. Bridging device 1300-1B in the position shown, is conditioned to transmit the program originating at station No. 1 in an eastwardly direction over radio wire network No. 1.

*Connections established in permutation link circuit No. 1 for program reception*

Permutation link circuit No. 1 upon being conditioned by preset signals corresponding to letters KB, prepare paths whereby each of the six stations Nos. 1 to 6 may upon the operation of switch-over relay 6SW in response to the master cue signal, be connected to radio wire networks Nos. 1 to 4, one or more of the stations as desired, being connected to a single radio wire network. When signals corresponding to letters KB are transmitted to switching center C stations Nos. 1 and 3 are conditioned for connection to radio wire network No. 1, stations Nos. 2 and 4 are conditioned for connection to wire network No. 2, and stations Nos. 5 and 6 are conditioned for connection to wire networks Nos. 3 and 4, respectively. In order to describe the communication circuits conditioned for connecting the stations to the wire networks these circuits are herein presumed to be prepared to receive programs from stations connected to other switching centers. These circuits are therefore referred to herein as being in their receiving condition for the purpose of broadcasting the incoming programs.

Station No. 1 has its receiving circuit 1001 which comprises transformer 1009, transmission loss pad 1010, conductor pair 1011, armatures Nos. 1 and 2 and their respective front contacts of relay 1002 and conductor pair 1014 which consists of tip conductor 1012 and ring conductor 1013, normally in readiness to receive a program over selectable paths (tip and ring) prepared in the connections established in permutation link circuit No. 1. The path for tip conductor 1012 extends from armature No. 1 of switch-over relay 6SW, normally closed make-before-break contacts of each of relays 6PR-1 and 6PR2, front contact and armature No. 3 of relay 6PR3, armature No. 5 and front contact of relay 6PR4, armature No. 4 and back contact of relay 6PR5, armature No. 4 and front contact of relay 6PR6, armature No. 5 and front contact of relay 7PR7, armature No. 4 and back contact of relay 7PR8, back contact and armature No. 3 of relay 7PR-9, normally open make-before-break contacts, now closed, of relay 7PR-10, armature No. 4 and front contact of relay 7PR-11, tip conductor 701, and tip conductor 1207 of conductor group 1205 for station No. 1. The path for ring conductor 1013 extends over the ring armatures and contacts in a manner similar to that described above for the path for tip conductor 1012 (the ring armatures and contacts are represented diagrammatically as box 601), ring conductor 702 and ring conductor 1210 of conductor group 1205. At this time tip conductor 1207 and ring conductor 1210 are connected over armatures Nos. 2 and 3, respectively, of relay 1203 (in its released condition), conductor pair 1306 which is also at this time connected to receive a program incoming from the west or the east over radio wire network No. 1 as hereinbefore described.

Station No. 2 has its receiving circuit included in the station equipment represented diagrammatically in box 1000-2. This circuit likewise is normally in readiness to receive a program in a manner similar to that hereinbefore described of station No. 1. The selectable path for tip conductor 1015 extends from armature No. 2 of switch-over relay 6SW, armature No. 4 and back contact of relay 6PR-1, armature No. 4 and back contact of relay 6PR2, armature No. 4 and front contact of relay 6PR3, armature No. 6 and front contact of relay 6PR4, armature No. 5 and back contact of relay 6PR5, armature No. 5 and front contact of relay 6PR6, armature No. 6 and front contact of relay 7PR7, armature No. 5 and back contact of relay 7PR8, armature No. 4 and back contact of relay 7PR9, armature No. 4 and front contact of relay 7PR-10, armature No. 4 and front contact of relay 7PR-11, tip conductor 703, and tip conductor 1409 of conductor group 1415 for station No. 2. The selectable path for ring conductor 1016 extends over the ring armatures and contacts in a manner similar to that hereinbefore described of the path for tip conductor 1015 (the ring armatures and contacts are represented diagrammatically in box 601), then over ring conductor 704 and ring conductor 1412 of conductor group 1416. At this time tip conductor 1409 and ring conductor 1412 are connected over armatures Nos. 2 and 3 respectively, of relay 1403 (in its released position), conductor pair 1415 which is, also at this time, connected to receive a program incoming from the west or east over radio wire network No. 2 in a manner similar to that hereinbefore described of radio wire network No. 1.

Station No. 3 has its receiving circuit included in the station equipment represented diagrammatically in box 1100-3. This circuit also is in readiness to receive a program in a manner similar to that hereinbefore described of station No. 1. The selectable path for tip conductor 1101 extends from armature No. 3 of switch-over relay 6SW, armature No. 5 and back contact of relay 6PR-1, armature No. 5 and back contact of relay 6PR2, armature No. 5 and front contact of relay 6PR3, armature No. 7 and front contact of relay 6PR4, armature No. 6 and back contact of relay 6PR5, armature No. 6 and front contact of relay 6PR6, tip conductor 604, tip conductor 1204 of conductor group 1206 for station No. 3. The selectable path for ring conductor 1102 extends over the ring armatures and contacts in a manner similar to that hereinbefore described of the path of tip conductor 1101 (the ring armature and contacts are represented within box 601), then over ring conductor 605, ring conductor 1216 of conductor group 1206. At this time tip conductor 1214 and ring conductor 1216 are connected over armatures Nos. 2 and 3 respectively, of relay 1204 (in its released position), conductor pair 1303 which is also at this time, like station No. 1, connected to receive a program incoming from the west or east over radio wire network No. 1 in a manner as hereinbefore described of radio wire network No. 1.

Station No. 4 has its receiving circuit included in the station equipment represented diagrammatically in box 1100-4. This circuit also is in readiness to receive a program in a manner similar to that hereinbefore described of station No. 1. The selectable path for tip conductor 1103 extends from armature No. 4 of switch-over relay 6SW, armature No. 6 and back contact of relay 6PR1, armature No. 6 and back contact of relay 6PR2, armature No. 6 and front contact of relay 6PR3, conductor 606, tip conductor 1417 of conductor group 1418 for station No. 4. The selectable path for ring conductor 1104 extends over the ring armatures and contacts in a manner similar to that hereinbefore described of the path for tip conductor 1103 (the ring armatures and contacts are represented within box 601), then over ring conductor 607, ring conductor 1419 of conductor group 1418. At this time tip conductor 1417 and ring conductor 1419 are connected over armatures Nos. 2 and 3, respectively of relay 1404 (in its released position), conductor pair 1415 which is also at this time, like station No. 2, connected to receive a program incoming from the west or east over radio wire network No. 2 in a manner similar to that hereinbefore described of radio wire network No. 1.

Station No. 5 has its receiving circuit included in the station equipment represented diagrammatically in box 1100-5. This circuit also is in readiness to receive a program in a manner similar to that hereinbefore described of station No. 1. The selectable path for tip conductor 1105 extends from armature No. 5 of switch-over relay 6SW, armature No. 7 and back contact of relay 6PR-1, armature No. 7 and back contact of relay 6PR2, armature No. 7 and front contact of relay 6PR3, armature No. 3 and front contact of relay 6PR4, armature No. 7 and back contact of relay 6PR5, armature No. 7 and front contact of relay 6PR6, armature No. 3 and front contact of relay 7PR7, armature No. 6 and back contact of relay 7PR8, normally closed make-before-break contacts of relay 7PR9, front contact and armature No. 5 of relay 7PR-10, tip conductor 705, tip conductor 1420 of conductor group 1421 for station No. 5. The selectable path for ring conductor 1106 extends over the ring armatures and contacts in a manner similar to that hereinbefore described of tip conductor 1105 (the ring armatures and contacts are represented within box 601), then over ring conductor 706, ring conductor 1422 of conductor group 1421. At this time tip conductor 1420 and ring conductor 1422 are connected over armatures Nos. 2 and 3, respectively, of relay 1406 (in its released position), conductor pair 1423 which is also at this time connected to receive a program incoming from the west or east over radio wire network No. 3 in a manner similar to that hereinbefore described of radio wire network No. 1.

Station No. 6 has its receiving circuit included in the station equipment represented diagrammatically in box 1100-6. This circuit also is in readiness to receive a program in a manner similar to that hereinbefore described of station No. 1. The selectable path for tip conductor 1107 extends from armature No. 6 of switch-over relay 6SW, normally closed make-before-break contacts of each of relays 6PR-1 and 6PR2, front contact and armature No. 8 of relay 6PR3, armature No. 4 and front contact of relay 6PR4, armature No. 3 and back contact of relay 6PR5, armature No. 3 and front contact of relay 6PR6, armature No. 4 and front contact of relay 7PR7, armature No. 3 and back contact of relay 7PR8, tip conductor 707, tip conductor 1424 of conductor group 1425 for station No. 6. The selectable path for ring conductor 1108 extends over the ring armatures and contacts in a manner similar to that hereinbefore described of tip conductor 1107 (the ring armatures and contacts being represented with box 601), then over ring conductor 708, ring conductor 1426 of conductor group 1425. At this time tip conductor 1424 and ring conductor 1426 are connected over armatures Nos. 2 and 3, respectively, of relay 1408 (in its released position), conductor pair 1427 which is, also at this time, connected to receive a program incoming from the west or east over radio wire network No. 4 in a manner similar to that hereinbefore described of radio wire network No. 1.

*Connections established in permutation link circuit No. 1 for program transmission*

When transmission from one or more of stations Nos. 1 to 6 to one or more of radio wire networks Nos. 1 to 4 is desired, the attendants at such one or more stations operate the microphone keys at their respective stations. When two or more stations are associated with a single wire network only one of such two or more stations may transmit at a time, for example, when a program originates at one of such stations, no program may simultaneously originate at another of such stations because the permutation link circuit which has been operated at preset signals, terminates paths prepared by these preset signals, from each of such stations to a single wire network, say network No. 1, over conductor pair 1303 which is used for transmitting programs originating at any one of such stations to network No. 1 in both westwardly and eastwardly directions simultaneously. The connections prepared by the preset signals, as hereinbefore described, remain the same for both reception at and transmission from stations Nos. 1 to 6, the only difference being that when transmitting from a local station, such as station No. 1, microphone key 1004 is operated by an attendant to connect the transmission circuit 1001, in place of normally connected receiving circuit 1011, to communication conductor pair 1014. When microphone key 1004 is operated it causes (1) relay 1005 to operate, (2) relay 1002 to release, (3) relay 1008 to operate, (4) relay 1007 to operate and (5) relay 1008 to become locked-operated. Relays 1007 and 1008, upon operating, connect ground to a circuit traceable over conductors 1017 and 1018, to the front contact for the sleeve prime armature, not shown but corresponding to tip armature No. 1 of relay 6SW; the tip armatures of the permutation link circuit No. 1 are designated 600. The sleeve prime armatures and contacts, not shown but represented as box 603, are similar to the tip armatures and contacts of group 600 shown in detail in Fig. 6. The path for the sleeve prime conductor 1018 extends over the sleeve prime armatures and contacts represented as box 603 and operated under the control of operated relays 6SW, 6PR3, 6PR4, 6PR6, 7PR7, 7PR-10 and 7PR-11, over sleeve prime conductors 709 and 1217, through the winding of relay 1201, to grounded battery. Relay 1201 operates and, in turn, operates relay 1203. Relay 1203, upon operating, connects the communication conductors 1207 and 1210 to conductor pair 1303 for transmitting the program from the originating station to radio wire network No. 1. Relay 1005 upon operating, connects ground battery at its No. 2 armature and front contact to sleeve conductor 1019 which extends to the front contact for the sleeve armature, not shown but corresponding to tip armature No. 1 of relay 6SW; the tip armatures of permutation link circuit No. 1, as hereinbefore stated, are designated 600. The sleeve armatures and contacts, not shown but represented as box 602, are similar to the tip armatures and contacts of group 600. The path for the sleeve conductor 1019 extends over the sleeve armatures and contacts represented as box 602 and operated under the control of operated relays 6SW, 6PRS, 6PR4, 6PR6, 7PR7, 7PR–10 and 7PR–11, over sleeve conductors 710, 1218 and 1219 then in parallel paths to their respective relays. One path extends over conductor 1333, armature No. 2 and back contact of relay 1308, through the winding of relay 1309 to ground, and the other path extends over conductor 1334, armature No. 2 and back contact of relay 1310, through the winding of relay 1311 to ground. Relays 1310 and 1311 operate to prevent a program incoming at either of bridging devices 1300–1A and 1300–1B from controlling the apparatus at the program originating station locally connected to switching center C. Each of the remaining stations of those associated with a single radio wire network may be arranged to receive the program originating at its station so associated by providing relay connecting means such as disclosed in Fig. 5 of Bachelet et al. Patent 2,110,284, supra.

When two or more stations are connected through a permutation link circuit to a single radio wire network and one of them is transmitting to that network, the stations connected to the other networks through the same permutation link circuit at that time may be simultaneously transmitting to or receiving from their respective networks other programs.

In cases where the programs are to be changed at certain stations only, that is, certain stations at each of the selected switching centers, and the programs at the remaining stations at each of the selected switching centers are to remain unchanged a suitable combination of two characters each may be selected from 30 × 24, or 720, possible permutations. Of the code combinations necessary for each of the two preset signals thirty are selectable for the first and twenty-four for the second as hereinbefore shown in the lists of character code combinations for operating the translating relays T in different arrangements for selecting the desired radio wire networks. However, any of the 720 possible permutations of connections in a permutation link circuit such as shown at switching center C may be obtained by using the proper permutations of preset signals to establish the desired connections between the locally connected stations and the radio wire networks. It is obvious that the number of stations locally connected to a switching center is not limited to six and the number of radio wire networks is not limited to four.

Stations Nos. 1 to 6 may control the service line direction control equipment and the radio network direction control equipment in a manner hereinbefore described regardless of which one of permutation link circuits Nos. 1 and 2 is employed.

*Preparing connections for transmission over permutation link circuit No. 2*

During the time when a group of programs are being transmitted over the connections just described as being established at permutation link circuit No. 1 relays 5ASW, 5ASZ, 6SW, 6PRS, 6PR4, 6PR6, 7PR7, 7PR–10 and 7PR–11 and normally operated relay 5TSR are the only relays that remain operated. However, before the time of transmitting the group of programs over the connections at present established at permutation link circuit No. 1, has expired, the connections for the next group of programs may be preset at permutation link circuit No. 2 to wait for the next broadcast period. When switching center C is selected during the transmission and/or reception of programs over permutation link circuit No. 1 to prepare for the group of programs that are to be transmitted and/or received during the next program interval of time which is to follow that is, to be transmitted and/or received over permutation link circuit No. 2, relays 2W and 2Z operate and release in response to each of the first three signals, that is, the calling cue and two preset signals, incoming over the dispatcher's teletypewriter control circuit to switching center C, as hereinbefore described. Also, as hereinbefore described, relays 5STT and 5CI–2 operate when relay 2Z releases for the first time and relay 5ASW releases when relay 5STT operated at this time, but relay 5ASZ remains operated. After the third incoming signal, that is, the second of the two new preset signals, is received, certain relays of each of the 8PR and 9PR groups of permutation link circuit No. 2 will be in operated positions in accordance with the code combinations of each of the two net preset signals. When relays 2W and 2Z release for the third time the 3P, 3L and 4T relays which operated in response to the second of the new preset signals, also release; relays 5STT, 5CI–2, 5ASZ and 2W1 remain operated; relays 2Z–1 and 2AMC operated when relay 2Z released for the third time; and relays 5CK–1, 5CCX, 2W–2, 2Z2, 5CK–2 and 5AV remain operated. When the master cue signal is received to complete at the desired time, the connections preset at permutation link circuit No. 2, relay 2W operates for the fourth time, all the 3L and the 4T relays operate because all the selecting impulses of the master cue signal are marking. When all the 3L relays operate, relay 2MC operates to release relays 5STT and 5CI–2. Relay 5STT upon releasing, causes the release of relay 5CCX and 5AV. When relay 2W–1 releases immediately following the receipt of the master cue signal, a shunt circuit around the winding of relay 2W–2 is closed and relay 2W–2 releases. Also, relay 5STT upon releasing, removes ground at its armature No. 2 and front contact from the holding circuit of relay 5ASZ and relay 5ASZ therefore releases. Relay 5ASZ upon releasing, effects (1) the release of switch-over relay 6SW which upon releasing, disconnects the established connections of permutation link circuit No. 1 from stations Nos. 1 to 6, and (2) the operation of switch-over relay 8SW which upon operating, connects the preset connections in permutation link circuit No. 2. However, relays 6PR3, 6PR4, 6PR6, 7PR7, 7PR–10 and 7PR–11 are held locked-operated over the released armatures Nos. 2 and 3 of relay 5ASZ until permutation link circuit No. 1 is again prepared for a program time interval. When relay 2Z releases for the fourth time, that is, immediately following the transmission of the verification signal for the master cue signal to the dispatcher's teletypewriter, relays 2AMC and 2MC release. When the next calling cue signal is received at switching center C and relay 2Z operates the ground connection at armature No. 4 and front contact of relay 2Z is connected to a circuit traceable over conductors 207, 208 and 209, armature and back contact of relay 2MC, conductors 236 and 501 armature No. 2 and front contact of relay 5CK-1 which is an operated position because of the locked operated relays 6PR3, 6PR4, 6PR6, 7PR7, 7PR-10 and 7PR-11, conductor 546, back contact and armature No. 5 of relay 5STT, conductor 547 through the winding of relay 5UL, to grounded battery. Relay 5UL operates to open at its No. 1 armature the operating circuit of relay 5STT which at this time is prevented from operating, and at its No. 2 armature the locking circuit for relay 6PR3, 6PR4, 6PR6, 7PR7, 7PR-10 and 7PR-11 which now release to receive the preset signals for the next change of programs. The release of the operated relays in the 6PR and 7PR groups cause relays 5CK-1 and 5CK-2 to release. Relay 5CK-1 upon releasing, releases relay 5UL and relay 5STT is again ready to operate when relay 2Z operates in response to the first preset signal of those signals that prepare permutation link circuit No. 1 for the next change of programs.

*Correction of errors in connections established in permutation link circuits*

In the event that the dispatcher discovers an error in the connections preset at any of the switching centers prior to the transmission of the common master cue signal he may wipe out the connection established at all such switching centers after the first preset signal or the second preset signal by transmitting a release signal consisting of start, or space, mark, space, space, space, space, mark and stop, or mark, whereof the first, or additional, selecting impulse is a mark for the purpose of completing a path established by the six L relays at each of the selected switching centers, the path so completed at each switching center being traceable over the outer right-hand armatures and their respective contacts of the L relays.

A description of the operation resulting from the reception of the release signal of each of the selected switching centers will be described with reference to switching center C. The same circuit action occurs on each release signal at each switching center. In response to the first, or start, impulse of the release signal received by relay 2LR, a circuit is closed for operating relay 3CL in the manner as hereinbefore described, and as distributor brush arm 305 begins rotating, its outer brush moves off rest segments R1 and R2 to open the operating circuit of relay 3DN. Relay 3DN releases to connect ground at its No. 2 armature and back contact to conductor 319 of the circuit extending over the normally closed make-before-break contacts of relay 2W, through the winding of relay 2W, resistor 215 and grounded battery 216. Relay 2W operates. As the distributor brush arm 305 continues to rotate over segments ST, 0, 1, 2, 3, 4 and 5 in timed relation with response of relay 2LR to the impulses of the incoming release signal, relay 2LR is allowed to operate to its left-hand position for the incoming space impulses and accordingly relays 3P-1, 3P-2, 3P-3 and 3P-4 operate. Inasmuch as relays 3P-0 and 3P-5 remain unoperated at the conclusion of the revolution of brush arm 305 the corresponding L relays such as relays 3L-0 and 3L-5 operate to close a path at their respective outermost right-hand armatures and respective contacts. In this case, that is, in response to a release signal, the path is actually closed when the inner brush of brush arm 305 engages segment No. 4 of ring 302 which engagement causes relay 3P-4 to operate and relay 3L-4 to therefore release as will now be described. It will be noted that when relay 3DN released at the start of rotation of brush arm 305, the ground connection at armature No. 4 and back contact of the relay was effective to operate all the 3L relays and as the inner brush engaged each of the selecting segments Nos. 0, 1, 2, 3, 4 and 5, in turn, and the 3P relays corresponding to the selecting space impulses of the released signal operated, the 3L relays corresponding to the operated ones of the 3P relays released and therefore in the code combination of the release signal, relay 3L-4 is the last of the 3L relays to release and the path thereby closed is traceable from grounded battery, through the winding of relay 2RLS, conductor 247, front contact and armature No. 4 of relay 3L5 back contact and armature No. 4 of relay 3L-4, back contact and armature No. 4 of relay 3L-3, back contact and armature No. 4 of relay 3L-2, back contact and armature No. 4 of relay 3L-1, front contact and armature No. 3 of relay 3L-0, conductor 318, to ground at the back contact and armature No. 4 of relay 3DN. Release relay 3RLS operates and then locks-operated in a circuit traceable over conductors 248 and 322, to ground at armature No. 4 and front contact of relay 2W. Relay 2W at this time is held operated in a circuit traceable from grounded battery 216, resistor 215, through the winding of relay 2W, front contact and armature No. 1 of relay 2W, conductor 222, front contact and armature No. 1 of relay 2W-1, conductor 229 to ground at the back contact and No. 3 armature of relay 2Z-1 to ground. When distributor brush arm 305 completes its revolution after receiving the release signal, its outer brush comes to rest on rest segments R1 and R2 to close the operating circuit for relay 3DN. Relay 3DN reoperates and removes at its No. 2 armature and back contact the ground connection from the shunt path around the winding of relay 2Z and relay 2Z operates to substitute a ground connection at its No. 2 armature and front contact for the locking circuit of relay 2RLS. Relay 2RLS upon operating, removes at its No. 3 armature and back contact, the ground connection from the locking circuit for relays 2W-1 and 2W-2 should either or both be operated at the time and relays 2W-1 and/or 2W-2 release to cause the release of relays 2Z-1 and/or 2Z2 if either or both are operated. Also, relay 2RLS upon operating, opens at its No. 4 armature and back contact, the operating circuit for relay 5ASW, and at its No. 1 armature and back contact the shunting circuit for relay 5ASW. If relay 5ASZ is normal relay 5ASW releases. In the event that relay 5ASZ is operated, relay 5ASW is allowed to reoperate. When relay 2Z releases at the end of the fourth or sixth revolution depending upon whether the connection is being wiped out after the first or the second preset signal, release relay 2RLS releases and the selected switching center C is thereby restored to normal. In like manner, all the other switching centers that have been selected for operation at this time are restored to normal by transmitting the single release signal. The dispatcher must now repeat the sending of correct preset signals to all selected switching centers on the same dispatcher's control line before sending the master cue signal.

What is claimed is:

1. A switching device comprising a signaling channel, a plurality of incoming line circuits, a plurality of outgoing line circuits, means responsive to one or more code signals of a telegraphically transmissible code of selectively different signals incoming over said channel for presetting individual circuit connections or group circuit connections between said incoming and said outgoing line circuits, permuting means controlled by said presetting means for arranging the preset connections in any desired combination, and means responsive to another of said code signals incoming over said channel subsequently to the presetting signals for simultaneously completing said preset circuit connections between said incoming line circuits and said outgoing line circuits.

2. A switching device comprising a signaling channel, a plurality of incoming line circuits, a plurality of outgoing line circuits, electromagnetic means responsive to a plurality of code signals of a telegraphically transmissible code of selectively different signals incoming successively over said channel for presetting individual circuit connections or group circuit connections between said incoming and said outgoing line circuits, permuting means controlled by said preset connections for arranging the preset connections in any desired combination, and means operated independently of said presetting and said permuting means and responsive to another of said code signals incoming over said channel subsequently to said presetting signals for simultaneously completing said preset circuit connections between said incoming and said outgoing line circuits.

3. In a signaling system, a plurality of switching centers, a transmission channel interconnecting said centers, a switching device at each of said centers comprising a plurality of incoming line circuits and a plurality of outgoing line circuits, means at each of said centers responsive to one or more code signals of a telegraphically transmissible code of selectively different signals incoming over said channel for presetting individual circuit connections or group circuit connections between said incoming and said outgoing line circuits, permuting means at each of said centers controlled by its associated presetting means for arranging the preset connections at a switching center in any desired combination, and means responsive to another of said code signals incoming over said channel subsequently to the presetting signals at all said plurality of switching centers for simultaneously completing said preset connections between said incoming line circuits and said outgoing line circuits at all said plurality of switching centers.

4. In a signaling system, a plurality of switching centers, a transmission channel interconnecting said centers, a switching device at each of said centers comprising selectable means, a plurality of incoming line circuits, a plurality of outgoing line circuits and connectable means for interconnecting said incoming and said outgoing line circuits, means included in each of said selectable means responsive to a distinctive start-stop code signal for selecting one of said switching centers, means included in each of said connectable means responsive to a plurality of start-stop code signals incoming successively over said channel for presetting individual connections or group circuit connections between said incoming line and said outgoing line circuits at each of said centers, permuting means at each of said switching centers controlled by its associated presetting means for arranging the preset connections at its switching center in any desired combination, and means responsive to another start-stop code signal incoming over said channel subsequently to the preset signals at all said plurality of switching centers for simultaneously completing said preset connections between said incoming and said outgoing line circuits at all said plurality of centers.

5. In a signaling system according to claim 4 wherein the switching device includes means immediately operative in response to each of the distinctive and the preset signals incoming over said channel at each of said switching centers to automatically transmit back over said channel a signal identical with the corresponding signals and operative in response to said other start-stop code signal incoming over said channel at each of said switching centers to automatically transmit back over said channel after an interval of time distinctive for its switching center a signal identical with the first-mentioned signal distinctive of its switching center.

6. In a signal transmission system, a switching center, a control channel and a plurality of other channels connected to said center, a plurality of stations, a line circuit connecting each of said stations to said center, selectable means at said center responsive to a distinctive signal incoming over said control channel for effectively connecting said center to said control channel, connectable means at said center responsive to other signals subsequently incoming over said control channel for preparing at said center connections between said line circuits and said plurality of said other channels in any desired arrangement, and other means at said center responsive to still another distinctive signal incoming over said control channel subsequently to said first-mentioned distinctive signal and said other signals for completing the prepared connections at said center.

7. In a signal transmission system, a plurality of switching centers, a control channel and a plurality of other channels connected to each of said centers, groups of stations and a line circuit for each station, each of said groups connected to one of said centers, selectable means at each of said centers responsive to a distinctive signal incoming over said control channel for selecting and effectively connecting one of said centers to said control channel, connectable means at each of said centers, means included in said connectable means at a selected center only and responsive to other signals incoming over said control channel for preparing at the selected one of said centers connections between said line circuits and said plurality of other channels in any desired arrangement, and other means at each of one or more selected centers responsive to still another distinctive signal incoming over said control channel subsequently to the first-mentioned distinctive signal and said other signals at each of the selected centers for simultaneously completing the connections prepared at the connectable means at each of said selected centers.

8. In a signal transmission system, a switching center, a control channel and a plurality of other channels connected to said center, a plurality of stations, a line circuit connecting each of said stations to said center, selectable means at said center responsive to a distinctive signal incoming over said control channel for selecting and effectively connecting said center to said control channel, connectable means at said center responsive to other signals subsequently incoming over said control channel for preparing at said center connections between said line circuits and said plurality of other channels in any desired arrangement, other means at said center responsive to still another distinctive signal incoming over said control channel subsequently to the first-mentioned distinctive signal and said other signals for completing the prepared connections at said center, and transmitting means at said center automatically operative in response to each of said signals incoming over said control channel for transmitting after each incoming signal a corresponding signal outgoing over said control channel.

9. In a signal transmission system, a plurality of switching centers, a control channel and a plurality of other channels interconnecting said centers, groups of stations and a line circuit for each station, each of said groups connected to one of said centers, selectable means at each of said centers responsive to a distinctive signal incoming over said control channel for selecting and effectively connecting one only of said centers to said control channel, connectable means at each of said centers, said connectable means at a selected center only responsive to other signals incoming over said control channel for preparing at the selected one of said centers connections between said line circuits connected to said selected center and said plurality of other channels in any desired arrangement and other means at each of said selected centers responsive to still another signal incoming over said control channel subsequently to said distinctive signal and said other signals at each of two or more selected ones of said centers for simultaneously completing the prepared connections at said two or more selected centers.

10. In a signal transmission system, a plurality of switching centers, a control channel and a plurality of other channels interconnecting said centers, groups of stations and a line circuit for each station, each of said groups connected to one of said centers, selectable means at each of said centers responsive to a distinctive signal incoming over said control channel for selecting and effectively connecting one of said centers to said control channel, connectable means at each of said centers, said connectable means at a selected center only responsive to other signals incoming over said control channel for preparing at the selected one of said centers connections between said line circuits connected to said selected center and said plurality of other channels in any desired arrangement, other means at each of said selected centers responsive to another distinctive signal incoming over said control channel subsequently to said distinctive signal and said other signals at each of two or more selected ones of said centers for simultaneously completing the prepared connections at said two or more selected centers, transmitting means in each of said centers automatically operative in response to the first-mentioned distinctive signal and each of said other signals for immediately transmitting a signal identical with its corresponding signal, outgoing over said control channel and in response to the second-mentioned distinctive signal for transmitting a signal identical with the first-mentioned distinctive signal outgoing over said control channel, and timing means at each of the selected centers automatically operative in response to the second-mentioned distinctive signal incoming over said control channel for delaying the transmission of the signal corresponding to the second-mentioned distinctive signal but identical with the first-mentioned distinctive signal, at a distinctive interval of time for each selected center.

11. In a signal transmission system, a plurality of switching centers, a control channel and a plurality of other channels interconnecting said centers, groups of stations and a line circuit for each station, each of said groups connected to one of said centers, selectable means at each of said centers responsive to a distinctive signal incoming over said control circuit for selecting and effectively connecting one only of said centers to said control channel, a plurality of alternately responsive connectable means at each of said centers, one of said connectable means at a selected center is responsive to other signals subsequently incoming over said control channel for preparing at the selected one of said centers connections between said line circuits and said plurality of other channels in any desired arrangement, other means at each of one or more selected centers responsive to still another distinctive signal incoming over said control channel subsequently to the first-mentioned distinctive signals and said other signals at each of the selected centers for simultaneously completing the connections prepared at one connectable means at each of said selected centers, means for maintaining connections previously completed on another of said connectable means until said other distinctive signal completes the prepared connections on said one connectable means.

12. In a signal transmission system, a control channel, a switching center connected to said control channel, a plurality of stations and a line circuit for each connected to said center, a plurality of transmission channels connected to said center, a plurality of connectable means at said center alternately connectable for operation automatically and one adapted, when available, to automatically prepare connections between each of said stations and one or more of said transmission channels in any desired arrangement in response to signals incoming over said control channel when said connectable means is established in completed connections between said stations and said transmission channels, means in each of said connectable means operative in response to another signal subsequently incoming over said control channel for automatically opening at said other connectable means any connections between said stations and said transmission channels previously completed and for automatically completing said prepared connections, and means for holding said opened connections at said other connectable means in their previously prepared condition until still other signals are subsequently received over said control circuit.

13. In a signal transmission system, a control channel, a plurality of switching centers connected to said control channel, groups of stations and a line circuit for each station, each of said groups connected to one of said centers, a plurality of transmission channels interconnecting said centers, a plurality of connectable means at each of said centers, selectable means at each of said centers responsive to a distinctive signal incoming over said channel, said selectable means at a selected center including means responsive to other signals subsequently incoming over said control channel for automatically preparing at one or another of said plurality of connectable means connections between each of said stations and one or more of said transmission channels in any desired arrangement when the alternate one of said plurality of connectable means is established in completed connections between said stations and said transmission channels, means in each of said connectable means operative in response to another distinctive signal subsequently incoming over said control channel and effective at all the selected ones of said centers for automatically opening simultaneously any connections between said stations and said transmission channels that were previously completed at any of said centers and for automatically completing simultaneously said prepared connections at each of the selected ones of said centers, and means for holding said opened connections in their prepared conditions until still another distinctive signal subsequently incoming over said control channel again selects said selected centers.

14. In a signal transmission system, a control channel, a switching center connected to said control channel, a plurality of stations and a line circuit for each, connected to said center, a plurality of transmission channels connected to said center, a plurality of connectable means in said center alternately selectable for operation automatically and one adapted, when available, to automatically prepare connections between each of said stations and one or more of said transmission channels in any desired arrangement in response to a plurality of signals incoming over said control channel, means for maintaining one of said connectable means established in completed connections between said stations and said transmission channels until the prepared connections at the other of said connectable means are completed, release means responsive to a distinctive signal incoming over said control channel subsequently to any one signal previously received to prepare said prepared connections for automatically restoring to normal the connections prepared or being prepared at said one connectable means.

15. In a switching system, a master office, a switching center, a control circuit interconnecting said office and said switching center, a plurality of incoming and outgoing lines terminating at said switching center, switching means for interconnecting any two or more of said lines in any combination, means responsive to code signals of a telegraphically transmissable code of selectively different signals received at said switching center over said control circuit for selectably preparing said switching means to interconnect lines, and means responsive to a specifically assigned code signal for simultaneously operating all said prepared switching means to complete said interconnections.

16. In a signal transmission system, a plurality of switching centers, a control channel therefor, selectable means at each of said centers responsive to a distinctive code signal and a plurality of other code signals incoming over said control channel, electromagnetic devices included in said selectable means and operable in response to each of the above-mentioned signals according to its corresponding code combination, transmitting means at each of said centers for automatically sending outgoing over said control channel upon the receipt of each of said incoming signals, a signal identical with each of its corresponding incoming signals, means for maintaining said electromagnetic devices operated in response to each of the above-mentioned incoming signals until the corresponding identical outgoing signal is completely transmitted to said control channel, said electromagnetic devices at each of said centers comprising circuit means responsive to a signal incoming subsequently to the last of said other code signals incoming over said control channel and effective at each of said centers to cause said transmitting means at each of said centers to automatically send outgoing over said control channel a signal identical with the distinctive code signal of its switching center, and timing means at each of said centers for determining a time interval different from the corresponding time interval at each of the other of said switching centers, before the last mentioned outgoing signal is automatically transmitted back over the control channel.

17. In a signal transmission system, a plurality of switching centers, a control channel for connecting said switching centers in series, groups of stations and a line circuit for each station, each of said groups connected to one of said centers, selectable means at each of said centers responsive to a distinctive signal incoming over said control channel for selecting and effectively connecting one of said centers to said control channel, connectable means at each of said centers, means included in said connectable means at said one center and responsive to other signals subsequently incoming over said channel immediately after the distinctive signal for its center for preparing at the selected one of said centers connections between said line circuits and said plurality of other channels in any desired arrangement, and means at each of said centers operated independently of its associated connectable means and responsive to a signal common to all switching centers and incoming over said channel after the desired connection at all said centers have been prepared for completing the prepared connection at all said switching centers.

References Cited in the file of this patent

UNITED STATES PATENTS

| Number | Name | Date |
|---|---|---|
| Re. 20,463 | Kleinschmidt | Aug. 3, 1937 |
| 1,607,868 | Chauveau | Nov. 23, 1926 |
| 1,871,762 | White | Aug. 16, 1932 |
| 1,900,095 | Brownstein | Mar. 7, 1933 |
| 2,059,204 | Boswau | Nov. 3, 1936 |
| 2,483,281 | Herr | Sept. 27, 1949 |
| 2,543,050 | Oberman | Feb. 27, 1951 |